(12) United States Patent
Maeda

(10) Patent No.: US 8,368,922 B2
(45) Date of Patent: Feb. 5, 2013

(54) JOB PROCESSING SYSTEM AND METHOD THEREOF AND STORAGE MEDIUM, AND PROGRAM

(75) Inventor: Yuuki Maeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1151 days.

(21) Appl. No.: 12/243,935

(22) Filed: Oct. 1, 2008

(65) Prior Publication Data

US 2009/0103128 A1 Apr. 23, 2009

(30) Foreign Application Priority Data

Oct. 23, 2007 (JP) ................................. 2007-275671

(51) Int. Cl.
*G06F 3/12* (2006.01)
(52) U.S. Cl. .......................... 358/1.15; 358/1.1; 358/401
(58) Field of Classification Search .................. 358/1.1, 358/1.15, 400, 401, 468, 500, 501
See application file for complete search history.

(56) References Cited

U.S. PATENT DOCUMENTS

| | | | |
|---|---|---|---|
| 6,076,817 A | 6/2000 | Kobayashi et al. | |
| 2004/0190057 A1 | 9/2004 | Takahashi et al. | |
| 2004/0239956 A1* | 12/2004 | Araumi | 358/1.1 |
| 2005/0213144 A1 | 9/2005 | Uejo | |
| 2006/0092457 A1 | 5/2006 | Rhim et al. | |

FOREIGN PATENT DOCUMENTS

| | | |
|---|---|---|
| CN | 1770090 A | 5/2006 |
| JP | 10-194571 A | 7/1998 |
| JP | 2001-138611 A | 5/2001 |
| JP | 2005-271264 A | 10/2005 |
| JP | 2007-076123 A | 3/2007 |
| JP | 2007-081970 A | 3/2007 |

OTHER PUBLICATIONS

Japanese Office Action dated Jan. 13, 2012 issued in corresponding Japanese Patent Application No. 2007-275671.
Chinese Office Action dated May 8, 2010 concerning the corresponding Chinese Patent Application No. 200810171372.5.

* cited by examiner

*Primary Examiner* — Thomas D Lee
(74) *Attorney, Agent, or Firm* — Fitzpatrick, Cella, Harper & Scinto

(57) ABSTRACT

It is confirmed whether or not a job that instructs the execution of multiple processes using the XML language includes a process that cannot be executed by a job processing unit, and in the case where it has been confirmed that the job includes a process that cannot be executed by the job processing unit, the job processing unit is caused to execute a process that the job processing unit is capable of executing from among the multiple processes. Processes that cannot be executed by the job processing unit are ignored, cancelled, or processed according to a pre-set specification.

18 Claims, 37 Drawing Sheets

FIG. 8

SELECT TYPE OF SHEET PROCESS

PLEASE SELECT THE TYPE OF SHEET PROCESS TO EXECUTE ON THE JOB.

| STAPLING | PUNCHING | TRIMMING |
| SHIFT DISCHARGE | SADDLE STITCHING | FOLDING |
| GLUE BINDING (1) (CASE BINDING) | | LARGE-VOLUME STACKING |
| GLUE BINDING (2) (PAD BINDING) | | |

CANCEL  OK

FIG. 9

✱ SYSTEM SETTINGS

PLEASE REGISTER THE TYPES AND THE ORDER OF SHEET PROCESSING APPARATUSES TO BE CONNECTED TO THE PRINTING APPARATUS. YOU CAN CONNECT UP TO 5 APPARATUSES. HOWEVER, PLEASE CONNECT THE SADDLE-STITCHING APPARATUS AS THE FINAL APPARATUS.

| 1 | LARGE-VOLUME STACKER | ▶ PREFERENCES |
| 2 | GLUE-BINDING APPARATUS | ▶ PREFERENCES |
| 3 | SADDLE-STITCHING APPARATUS | ▶ PREFERENCES |
| 4 | | ▶ PREFERENCES |

REGISTER  CLOSE

| | |
|---|---|
| BOOT LOADER | ~3101 |
| OPERATING SYSTEM | ~3102 |
| DATA TRANSMISSION/RECEPTION PROGRAM | ~3103 |
| DEVICE MANAGEMENT PROGRAM | ~3104 |
| COPY PROGRAM | ~3105 |
| SCANNING PROGRAM | ~3106 |
| PDL PRINT PROGRAM | ~3107 |
| JDF PRINT PROGRAM | ~3108 |
| BOX PROGRAM | ~3109 |
| UI CONTROL PROGRAM | ~3110 |
| OTHER CONTROL PROGRAMS | ~3111 |
| DEVICE CAPABILITY TABLE | ~3112 |

FIG. 12

| | |
|---|---|
| DEVICE MANAGEMENT INFORMATION | ~3301 |
| PROCESSING RULE TABLE | ~3302 |
| STORED DOCUMENT DATA | ~3303 |
| STORED DOCUMENT DATA MANAGEMENT TABLE | ~3304 |
| SPOOL AREA | ~3305 |
| EMPTY AREA | ~3306 |

FIG. 13

| | |
|---|---|
| MIME DATA | ~3501 |
| JMF PART | ~3502 |
| JDF PART | ~3503 |
| PDL FILE 1 | ~3504 |
| PDL FILE 2 | ~3506 |
| PDL FILE 3 | ~3506 |

FIG. 14

```
<?xml version="1.0" encoding="UTF-8"?>
<JDFxmlns="http://www.CIP4.org/JDFSchema_1_1" xmlns:xsi="http://www.w3.org/2001/XMLSchema-instance"
 xmlns:cj="http://www.xxxxx.com/ns/Xxxxx.JDF JobID="func-033" JobPartID="1112" Category="DigitalPrinting"
 ID="ICSIDP_Example1_Root" Status="Ready" MaxVersion="1.2" Version="1.2" ICSVersions="Base_L0-1.0IDP_L1-1.0"
 Activation="Active" DescriptiveName="DocumentTest00001" Type="Combined"
 Types="LayoutPreparation Imposition Interpreting Rendering DigitalPrinting Stitching" >       ⎫
 <AuditPool>                                                                                    ⎬ 3701
  <Created AgentName="softname1" AgentVersion="1.11" TimeStamp="2004-12-23T10:16:00Z"/>         ⎭
  <Modified AgentName="softname2" AgentVersion="2.22" TimeStamp="2005-02-05T03:01:59+03:00"/>   ⎫
 </AuditPool>                                                                                   ⎬ 3702
 <ResourceLinkPool>                                                                             ⎭
  <RunListLink rRef="LinkRunList" Usage="Input" CombinedProcessIndex="0 1"/>                    ⎫
  <LayoutPreparationParamsLink rRef="LinkLayoutPreparationParams" Usage="Input" CombinedProcessIndex="0"/>
  <InterpretingParamsLink rRef="LinkInterpretingParams" Usage="Input" CombinedProcessIndex="2"/>⎬ 3703
  <RenderingParamsLink rRef="LinkRenderingParams" Usage="Input" CombinedProcessIndex="3"/>
  <DigitalPrintingParamsLink rRef="LinkDigitalPrintingParams" Usage="Input" CombinedProcessIndex="4"/>
  <StitchingParamsLink rRef="LinkStitchingParams" Usage="Input" CombinedProcessIndex="5"/>
  <ComponentLink rRef="LinkComponent" Usage="Output" CombinedProcessIndex="5"/>                 ⎭
 </ResourceLinkPool>
 <ResourcePool>
  <LayoutElement Class="Parameter" ID="LinkLayoutElement" Status="Available">
   <FileSpec Compression="None" URL="cid:0000" MimeType="application/postscript"/>
  </LayoutElement>
  <RunList Class="Parameter" ID="LinkRunList" Status="Available">
   <LayoutElementRef rRef="LinkLayoutElement"/>
  </RunList>
  <LayoutPreparatioinParams Class="Parameter" ID="LinkLayoutPreparationParams" Status="Available" NumberUp="2 1"
 "2 4 4 800 500.5"/>
   <InterpretingParams Class="Parameter" ID="LinkInterpretingParams" Status="Available" PrintQuality="High"/>
   <RenderingParams Class="Parameter" ID="LinkRenderingParams" Status="Available"/>              ⎬ 3704
   <Media Class="Consumable" ID="LinkMedia2" Status="Available" Dimention="842 1191"/>
   <DigitalPrintingParams Class="Parameter" ID="LinkDigitalPrintingParams" Status="Available" PartIDKeys="RunIndex">
    <MediaRef rRef="LinkMedia2"/>
   </DigitalPrintingParams>
   <StitchingParams Class="Parameter" ID="LinkStitchingParams" Status="Available" StitchType="Saddle"/>
   <Component Class="Quality" ID="LinkComponent" ComponentType="FinalProduct" Status="Unavailable"/>
  </ResourcePool>
</JDF>
```

FIG. 15

| DEVICE TYPE | CATEGORY | FUNCTION | SUPPORT STATUS |
|---|---|---|---|
| MULTI-FUNCTION PERIPHERAL | PRINTING APPARATUS | DOUBLE-SIDED PRINTING | OK |
| | | PAGE PRINTING | OK |
| | | PAPER MIXING | OK |
| LARGE-VOLUME PAPER TRAY | TRAY | PLAIN PAPER | OK |
| | | HEAVY PAPER | OK |
| | | TABBED PAPER | OK |
| LARGE-VOLUME STACKER | STACKER | SHIFT STACKING | OK |
| | | ROTATED STACKING | NG |
| | | SHIFT STACKING - SPECIFIED NUMBER | OK |
| GLUE-BINDING APPARATUS | FINISHER | CASE BINDING | OK |
| | | SADDLE STITCHING | NG |
| | | ONE-WAY TRIMMING PROCESS | OK |
| | | THREE-WAY TRIMMING PROCESS | OK |
| | | SADDLE STITCH | NG |
| | | PUNCHING | NG |
| | | FOLDING | NG |
| SADDLE-STITCHING APPARATUS | FINISHER | CASE BINDING | NG |
| | | SADDLE STITCHING | OK |
| | | ONE-WAY TRIMMING PROCESS | OK |
| | | THREE-WAY TRIMMING PROCESS | NG |
| | | FOLDING | OK |
| | | SADDLE STITCH | OK |
| | | PUNCHING | OK |

FIG. 16

| DEVICE NAME | DEVICE TYPE | CONNECTION STATUS |
|---|---|---|
| MULTI-FUNCTION PERIPHERAL | MULTI-FUNCTION PERIPHERAL | OK |
| LARGE-VOLUME PAPER TRAY 1 | TRAY | NG |
| LARGE-VOLUME PAPER TRAY 2 | TRAY | NG |
| PAPER TRAY | TRAY | NG |
| SCANNER | MULTI-FUNCTION PERIPHERAL | OK |
| LARGE-VOLUME STACKER 1 | STACKER | OK |
| LARGE-VOLUME STACKER 2 | STACKER | NG |
| LARGE-VOLUME STACKER 3 | STACKER | NG |
| GLUE-BINDING APPARATUS 1 | FINISHER | NG |
| GLUE-BINDING APPARATUS 2 | FINISHER | NG |
| SADDLE-STITCHING APPARATUS | FINISHER | NG |

| FUNCTION | NON-SUPPORT OPERATION SPECIFICATION | DEFAULT VALUE |
|---|---|---|
| DOUBLE-SIDED PRINTING | OPERATE WITH DEFAULT VALUE | ONE-SIDED PRINTING |
| PAGE PRINTING | IGNORE | |
| PAPER MIXING | CANCEL JOB | |
| PLAIN PAPER FEED | CANCEL JOB | |
| HEAVY PAPER FEED | CANCEL JOB | |
| TABBED PAPER | CANCEL JOB | |
| SHIFT STACKING | IGNORE | |
| ROTATED STACKING | OPERATE WITH DEFAULT VALUE | NO SORTING OPERATION |
| SHIFT STACKING - SPECIFIED NUMBER | IGNORE | |
| CASE BINDING | CANCEL JOB | |
| SADDLE STITCHING | CANCEL JOB | |
| ONE-WAY TRIMMING PROCESS | CANCEL JOB | |
| THREE-WAY TRIMMING PROCESS | CANCEL JOB | |
| FOLDING | CANCEL JOB | |
| SADDLE STITCH | IGNORE | |
| PUNCHING | IGNORE | |

| FUNCTION | ANALYSIS RESULT | EXECUTION OK? |
|---|---|---|
| DOUBLE-SIDED PRINTING | DOUBLE-SIDED | OK |
| PAGE PRINTING | NO | N/A |
| PAPER MIXING | NO | N/A |
| PLAIN PAPER FEED | YES | OK |
| HEAVY PAPER FEED | NO | N/A |
| TABBED PAPER | NO | N/A |
| SHIFT STACKING | NO | N/A |
| ROTATED STACKING | NO | N/A |
| SHIFT STACKING - SPECIFIED NUMBER | NO | N/A |
| CASE BINDING | NO | N/A |
| SADDLE STITCHING | YES | NG |
| ONE-WAY TRIMMING PROCESS | NO | N/A |
| THREE-WAY TRIMMING PROCESS | NO | N/A |
| FOLDING | YES | NG |
| SADDLE STITCH | YES | NG |
| PUNCHING | NO | N/A |

4501  4502  4503

F I G. 21
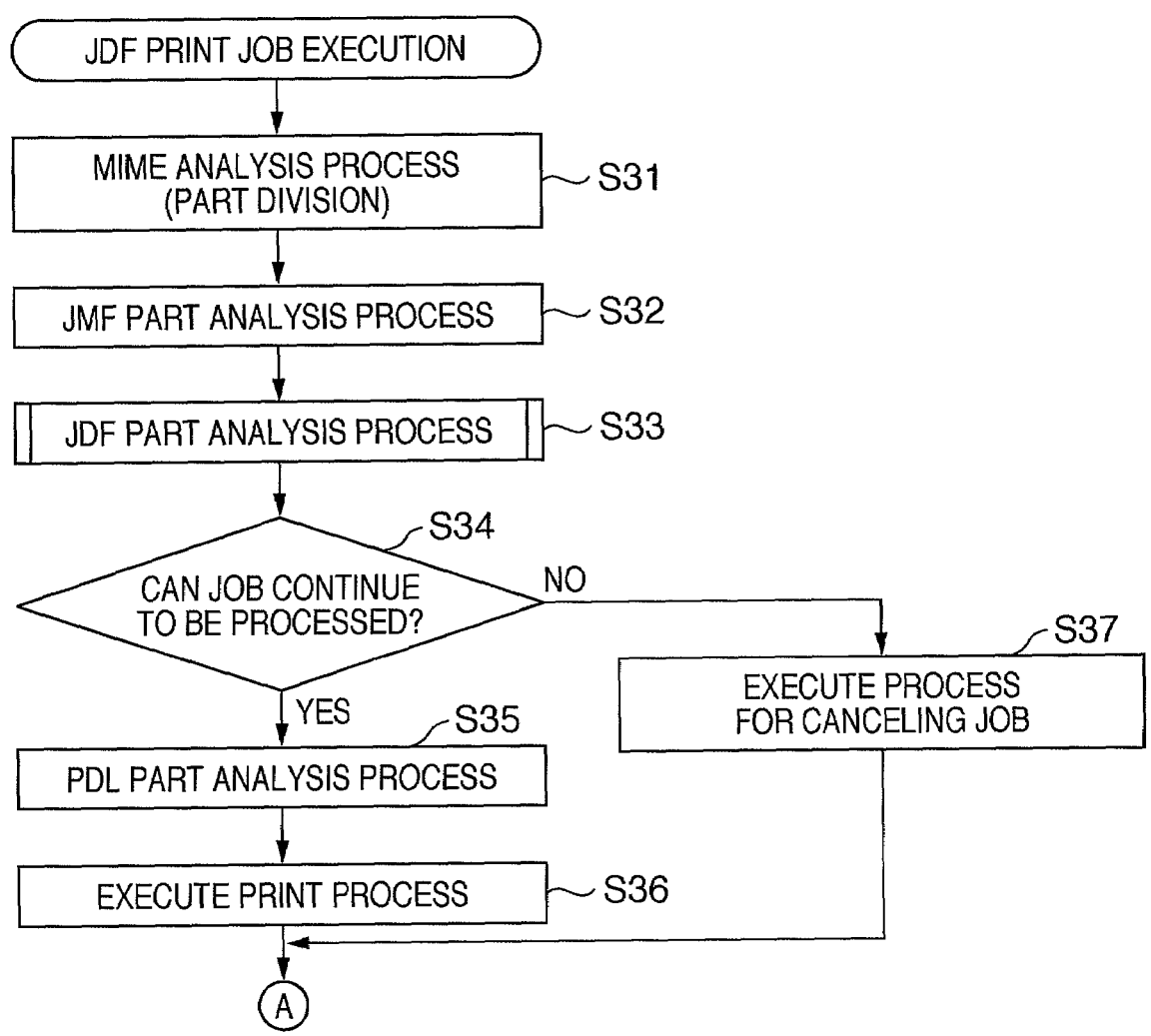

FIG. 26

| FUNCTION | NON-SUPPORT OPERATION SPECIFICATION | DEFAULT VALUE |
|---|---|---|
| DOUBLE-SIDED PRINTING | IGNORE | |
| PAGE PRINTING | IGNORE | |
| PAPER MIXING | IGNORE | |
| PLAIN PAPER FEED | IGNORE | |
| HEAVY PAPER FEED | IGNORE | |
| TABBED PAPER | IGNORE | |
| SHIFT STACKING | IGNORE | |
| ROTATED STACKING | IGNORE | |
| SHIFT STACKING - SPECIFIED NUMBER | IGNORE | |
| CASE BINDING | IGNORE | |
| SADDLE STITCHING | IGNORE | |
| ONE-WAY TRIMMING PROCESS | IGNORE | |
| THREE-WAY TRIMMING PROCESS | IGNORE | |
| FOLDING | IGNORE | |
| SADDLE STITCH | IGNORE | |
| PUNCHING | IGNORE | |

FIG. 27

| FUNCTION | NON-SUPPORT OPERATION SPECIFICATION | DEFAULT VALUE |
|---|---|---|
| DOUBLE-SIDED PRINTING | CANCEL JOB | |
| PAGE PRINTING | CANCEL JOB | |
| PAPER MIXING | CANCEL JOB | |
| PLAIN PAPER FEED | CANCEL JOB | |
| HEAVY PAPER FEED | CANCEL JOB | |
| TABBED PAPER | CANCEL JOB | |
| SHIFT STACKING | CANCEL JOB | |
| ROTATED STACKING | CANCEL JOB | |
| SHIFT STACKING - SPECIFIED NUMBER | CANCEL JOB | |
| CASE BINDING | CANCEL JOB | |
| SADDLE STITCHING | CANCEL JOB | |
| ONE-WAY TRIMMING PROCESS | CANCEL JOB | |
| THREE-WAY TRIMMING PROCESS | CANCEL JOB | |
| FOLDING | CANCEL JOB | |
| SADDLE STITCH | CANCEL JOB | |
| PUNCHING | CANCEL JOB | |

| PRINT STATUS | | CHECK SUPPLIES | | OTHER STATUS |

| JOB STATUS | JOB HISTORY |

■ TOTAL WAIT TIME : LESS THAN ONE MINUTE

| NUMBER | TIME | JOB NAME | USERNAME | STATUS | WAIT TIME |
|---|---|---|---|---|---|
| 0007 | 17:48 | COPY | COPY USER | PRINTING | LESS THAN ONE MINUTE |
| 0008 | 17:48 | CASE BINDING JOB (NEEDS TRIMMING) | COPY USER | FOR REDUCTION | LESS THAN ONE MINUTE |

1/1

| PRIORITY PRINT | DETAILS ▲ | STOP | BATCH PRINT △ | PRINT △ | CLOSE |

| PAUSE PRINT | | | | |

0007 COPY  0099/0100

FIG. 37

| PRINT STATUS | CHECK SUPPLIES | | OTHER STATUS |
|---|---|---|---|
| JOB STATUS | JOB HISTORY | | |

■ TOTAL WAIT TIME : LESS THAN ONE MINUTE

| NUMBER | TIME | JOB NAME | USERNAME | STATUS | WAIT TIME |
|---|---|---|---|---|---|
| 0007 | 17:48 | CASE BINDING JOB (NEEDS TRIMMING) | COPY USER | STANDING BY | LESS THAN ONE MINUTE |
| 0008 | 17:48 | COPY | COPY USER | PRINTING | LESS THAN ONE MINUTE |
| 0009 | 17:48 | CASE BINDING JOB (NEEDS TRIMMING) | COPY USER | FOR REDUCTION | LESS THAN ONE MINUTE |
| 0010 | 17:48 | COPY | COPY USER | WAITING FOR PRINTING | LESS THAN ONE MINUTE |
| 0011 | 17:48 | CASE BINDING JOB (NEEDS TRIMMING) | COPY USER | FOR REDUCTION | LESS THAN ONE MINUTE |

PRIORITY PRINT | DETAILS ▲ | STOP | BATCH PRINT | PRINT △ | CLOSE

PAUSE PRINT    0099/0100

0007 COPY

FIG. 39

| PRINT STATUS | | CHECK SUPPLIES | | OTHER STATUS |
|---|---|---|---|---|

| JOB STATUS | JOB HISTORY |
|---|---|

■ TOTAL WAIT TIME : LESS THAN ONE MINUTE

| NUMBER | TIME | JOB NAME | USERNAME | STATUS | WAIT TIME |
|---|---|---|---|---|---|
| 0007 | 17:48 | CASE BINDING JOB (NEEDS TRIMMING) | COPY USER | PRINTING | LESS THAN ONE MINUTE |
| 0008 | 17:48 | COPY | COPY USER | WAITING FOR PRINTING | LESS THAN ONE MINUTE |
| 0009 | 17:48 | CASE BINDING JOB (NEEDS TRIMMING) | COPY USER | WAITING FOR PRINTING | LESS THAN ONE MINUTE |
| 0010 | 17:48 | COPY | COPY USER | WAITING FOR PRINTING | LESS THAN ONE MINUTE |
| 0011 | 17:48 | CASE BINDING JOB (NEEDS TRIMMING) | COPY USER | WAITING FOR PRINTING | LESS THAN ONE MINUTE |

| PAUSE PRINT | PRIORITY PRINT | DETAILS | STOP | BATCH PRINT | PRINT | CLOSE |
|---|---|---|---|---|---|---|

0007 COPY 0099/0100

JOB PROCESSING SYSTEM AND METHOD THEREOF AND STORAGE MEDIUM, AND PROGRAM

BACKGROUND OF THE INVENTION

1. Field of the Invention

The present invention relates to a job processing system that processes jobs, a job processing method, a program that executes the job processing, and a storage medium on which the program is stored.

2. Description of the Related Art

Hitherto, in the printing industry, publications are published by carrying out various steps. These steps include receiving manuscripts, applying a design to the manuscripts, editing the layout, comps (presentations based on printing), proofing (layout corrections and color corrections), press proofs (proof printing), plate making, printing, post-processing tasks, delivery, and so on.

Thus far, in the printing industry, offset plate printing presses have been used in the printing process, making the plate making process necessary. However, it is not easy to perform corrections on such plates once they have been created, and such corrections also incur significant expense. Therefore, careful proofing (that is, work involving careful layout checks and color confirmations) is essential when creating plates. For this reason, it has taken considerable time in order to publish such publications.

Furthermore, the devices used in each step are often large-scale devices, requiring expert knowledge to operate, and thus the expertise of an experienced operator has been essential.

In response to this situation, a POD (Print-on-Demand) system that uses electrophotographic printing apparatuses, inkjet printing apparatuses, and so on has recently been proposed (see US Pre-Grant Publication No. 2004/0190057). With such a POD system, the abovementioned creation of plates and other complicated procedures are rendered unnecessary. Note that in recent years, JDF-compliant devices are increasingly being used as printing apparatuses aimed at the POD market. "JDF" is a digital format managed by CIP4 that is common across the entire printing process (also called "instructions" or a "job ticket"), and is garnering attention in systems aimed at the POD market. "JDF" is an acronym for "Job Definition Format". "CIP4", meanwhile, is an acronym for "Cooperation for the Integration of Processes in Prepress, Press and Postpress". The JDF format uses XML, a basic format used for web pages. Using the characteristics of XML is expected to result in advantages in terms of management of the entire printing process, by confirming, through a web site, the state of production management, the operational states of printing apparatuses, binding devices, and so on.

Furthermore, using instructions in the JDF format makes it possible to write instructions for a serial workflow that links multiple devices from the loading step to the delivery step, resulting in the printed material that is the final result, rather than the process simply ending with a single device. By using this characteristic, it is possible to manage a serial workflow composed of multiple steps and that uses multiple devices with a single set of instructions. This provides advantages in terms of linking multiple devices involved in the overall printing process to each other, and in terms of the automation of various devices.

Based on such a background, considerations are currently being made with an eye for the actual implementation of JDF-compliant printing apparatuses capable of exploiting the advantages of JDF to the maximum level, for use as printing systems aimed at the POD market.

However, when, for example, a digital multi-function peripheral is to have JDF support, it is necessary to enable print settings through job tickets. The job ticket differs from a printer driver in that it can be created even without knowing the device specifications, configuration information, and so on. This is a particular advantage of the JDF format, which is a common format independent of individual devices and which aims to enable job processing in as many different devices as possible.

However, taking such a situation into consideration, new issues and user needs, hitherto non-existent but which need to be addressed, arise when actually constructing a printing apparatus, a system, or the like. For example, depending on the operational environment (the capabilities of the device, the accessories provided therein, and so on), cases can arise where the printing apparatus (printing system) cannot execute all operations instructed in the job ticket. Furthermore, from the standpoint of the user, there may be cases where the printing apparatus (printing system) cannot carry out printing exactly as instructed, when, for example, printing is instructed using a job ticket. In such a case, it is preferable to make it possible for the user to cancel the processing of the job. For example, it is highly likely that printed materials created in a POD-market printing environment are to be handled as commercial products delivered to the customer. With a printing system operating in such a printing environment, printed materials that cannot be delivered to the customer are treated as wasteful output, and are thus wasteful expenses that are to be avoided as much as possible. Therefore, it is also necessary to tackle such issues in order for users (operators) in the POD environment to eliminate wasteful printed materials and reduce costs.

Meanwhile, even if a printing apparatus (printing system) cannot carry out all items that have been set, there are nevertheless cases where the user wishes to print using that printing apparatus. In the printing environment (printing site) mentioned earlier, a case where a certain job cannot be processed using the finisher provided in the printing apparatus but can be processed if another finisher is used can be considered as an example of this. In such a case, the printed material is first obtained using the printing apparatus, and the user then sets the printed material in the finisher to obtain the desired result.

Accordingly, data in the JDF format is advantageous in terms of flexibility and ease of instructions for automating devices, linking devices, and managing devices. However, because JDF data is not data prepared specifically for a single device of for a specific type of device, cases that cannot easily be addressed simply by providing a JDF-compliant printing apparatus or printing system in the aforementioned printing environment can arise.

At present, because the actual implementation of such products and systems is still in the planning stages, considerations for addressing various situations and user needs have not yet been addressed.

SUMMARY OF THE INVENTION

An aspect of the present invention is to eliminate the abovementioned conventional problems.

The present invention provides a job processing system, job processing method, storage medium, and program that enable the execution of flexible processing according to multiple processes, even in the case where a job that instructs the execution of the multiple processes using the XML language is executed.

It is an aspect of the present invention to enable the execution of flexible processing according to multiple processes even in the case where, for example, a job that instructs the execution of multiple processes using the XML language includes a process that cannot be executed by a job processing unit.

According to an aspect of the present invention, there is provided a job processing system for causing a job processing unit to execute a job that instructs execution of a plurality of processes using an XML language, the system comprises:

a confirmation unit configured to confirm whether or not the plurality of processes instructed by the job can be processed by the job processing unit; and a control unit configured to causes the job processing unit to execute a process that the job processing unit is capable of executing from among the plurality of processes, in the case where the confirmation unit has confirmed that the job includes a process that the job processing unit is not capable of executing.

According to another aspect of the present invention, there is provided a job processing method of causing a job processing unit to execute a job that instructs the execution of a plurality of processes using the XML language, the method comprises the steps of:

confirming whether or not the plurality of processes instructed by the job can be processed by the job processing unit; and controlling the job processing unit to execute a process that the job processing unit is capable of executing from among the plurality of processes, in the case where it has been confirmed that the job includes a process that the job processing unit is not capable of executing.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a diagram illustrating a setting screen by which a user selects the type of sheet process to be executed for a sheet printed by the printing apparatus according to the embodiment of the present invention.

FIG. 9 is a diagram illustrating an example of a system setting screen displayed in a console unit.

FIG. 10 is a diagram illustrating an example of a setting screen displayed in a display unit of an external apparatus in the case where the printing system is remotely operated using the external apparatus.

FIG. 11 is a diagram illustrating an example of various programs stored in a ROM of a printing apparatus according to the embodiment of the present invention as well as data used by those programs.

FIG. 12 is a diagram illustrating an example of the storage states of various data stored in an HDD and read out or written by a controller of the printing system.

FIG. 13 is a diagram illustrating an example of the structure of job data that is to be processed by a JDF print function implemented by a JDF print function program.

FIG. 14 is a diagram illustrating a specific example of JDF written content in the JDF part included in a MIME package according to the embodiment of the present invention.

FIG. 15 is a diagram illustrating a specific example of information stored and managed in a device capability table according to the embodiment of the present invention.

FIG. 16 is a diagram illustrating the content of a device configuration table according to the embodiment of the present invention.

FIG. 17 is a diagram illustrating a detailed example of the content of information stored in a processing rule table (FIG. 12) according to the embodiment of the present invention.

FIG. 18 is a diagram illustrating the details of a JDF analysis result table generated upon the completion of analysis of a JDF part portion of the job ticket shown in FIG. 13, when a JDF print job has been loaded using the job ticket shown in FIG. 13.

FIG. 21 is a flowchart illustrating details of a printing process included in a JDF print job loaded into the printing system in step S9 of FIG. 19, the process executed by a controller.

FIG. 26 is a diagram illustrating an example of information stored in a processing rule table corrected through control performed by a controller after an ignore button has been selected in the JDF setting screen illustrated in FIG. 25.

FIG. 27 is a diagram illustrating information stored in a processing rule table corrected through control performed by a controller after a cancel button has been selected in the JDF setting screen illustrated in FIG. 25.

FIG. 36 is a diagram illustrating an example of the display of a job status screen when an incomplete match-type JDF job is loaded during the printing shown in FIG. 35 and is registered as queued for printing in the HDD as a target for reduction.

FIG. 37 is a diagram illustrating an example of a screen displaying a job status prior to the occurrence of an event that influences an incomplete match-type job.

FIG. 39 is a diagram illustrating an example of a certain job status screen.

DESCRIPTION OF THE EMBODIMENTS

Numerous embodiments of the present invention will now herein be described below in detail with reference to the accompanying drawings. The following embodiments are not intended to limit the claims of the present invention, and not all combinations of features described in the embodiments are essential to the solving means of the present invention.

<First Embodiment>

Figure 1:
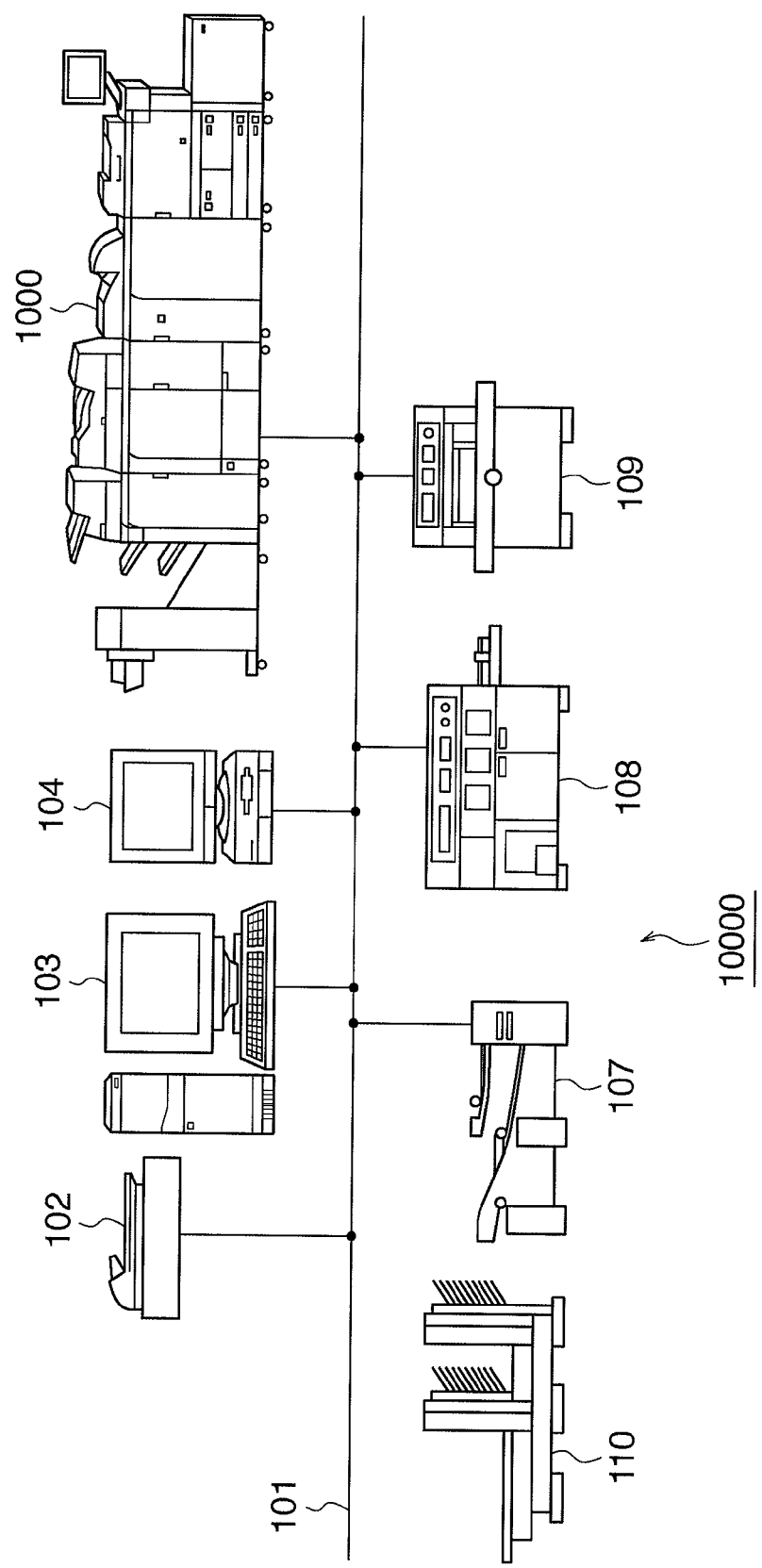
FIG. 1 is a diagram illustrating the overall configuration of a POD system including a printing system according to an exemplary embodiment of the present invention.

(POD System 10000 Including Printing System 1000)
FIG. 1 is a diagram illustrating the overall configuration of a POD system including a printing system according to an exemplary embodiment of the present invention.

The POD system 10000 includes a printing system 1000, a scanner 102, a server PC 103 (PC 103), a client PC 104 (PC 104), which are connected via a network 101. The POD system 10000 also includes a paper folding apparatus 107, a case binding apparatus 108, a trimmer 109, a saddle stitching apparatus 110, and so on.

The server PC 103 manages the transmission and reception of data of the various devices connected to the network 101. The client PC 104 transmits printing instructions for image data as a job to a printing apparatus 100 (FIG. 2) of the printing system 1000, the server PC 103, or the like, via the network 101. Furthermore, the server PC 103 manages the entirety of all jobs to be processed by the POD system 10000 by, for example, transmitting and receiving data to and from other devices through network communication. To rephrase, the server PC 103 functions as a computer that centrally controls all the steps in a serial workflow made up of multiple processing steps. Based on the instructions in a job received from an operator, the server PC 103 determines the conditions of post-processing by which the POD system 10000 can perform finishing. Furthermore, the server PC 103 instructs a post-processing (finishing process) step as requested by an end-user (in this case, the customer who has requested the creation of the print). At this time, the server PC 103 uses an information exchange tool such as JDF (Job Definition Format) to exchange information among various post-processing devices using commands and statuses internal to postpress.

The paper folding apparatus 107 performs a process for folding sheets printed by the printing apparatus 100. The case binding apparatus 108 performs a process for case-binding sheets printed by the printing apparatus 100. The trimmer 109 performs a cutting process on a batch of sheets, made up of multiple sheets, printed by the printing apparatus 100. The saddle stitching apparatus 110 performs a saddle stitching process on sheets printed by the printing apparatus 100. When the paper folding apparatus 107, case binding apparatus 108, trimmer 109, and saddle stitching apparatus 110 are used, a user takes the sheets printed by the printing apparatus 100 from the printing system 1000, sets the sheets in the device to be used, and uses that device to execute the appropriate process. Meanwhile, the multiple devices included in the POD system 10000 are, with the exception of the saddle stitching apparatus 110, connected to the network 101, and are configured so as to be capable of data communication with one another.

(Internal Configuration of Printing System 1000 (Software Configuration))

Figure 2:
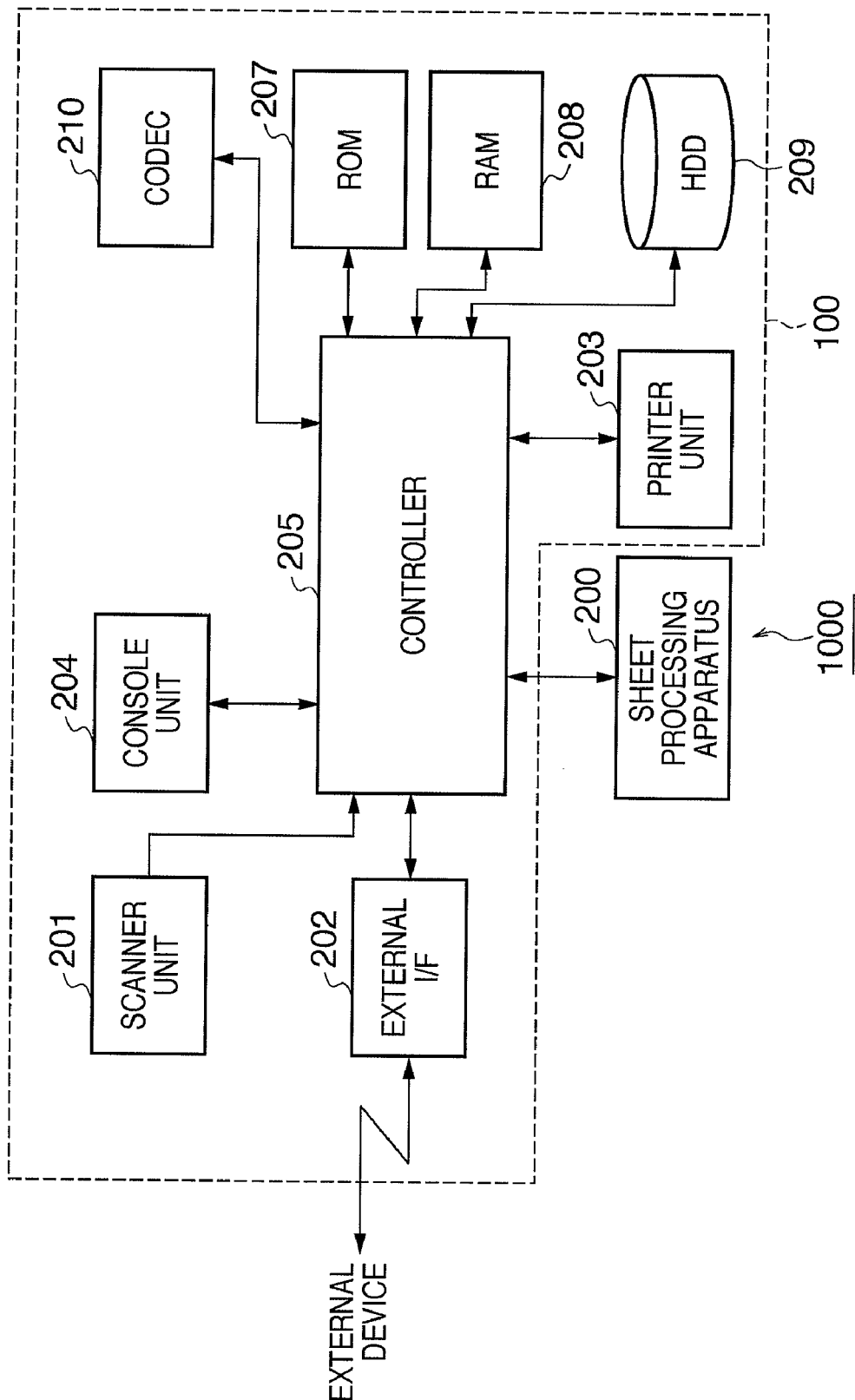
FIG. 2 is a block diagram illustrating the configuration of the printing system according to the embodiment of the present invention.

FIG. 2 is a block diagram illustrating the configuration of the printing system 1000. The units present in the printing system 1000 and illustrated in FIG. 2 are included in the printing apparatus 100, with the exception of a sheet processing apparatus 200.

This system 1000 has multiple types of devices, such as the printing apparatus 100, the sheet processing apparatus 200, and so on. It should be noted that in the present embodiment, a multi-function peripheral having multiple functions such as a copying function, a printing function, and so on is used as an example of the printing apparatus 100. However, the printing apparatus 100 may be a printing device that has only a copy function or only a printing function.

Figure 7:
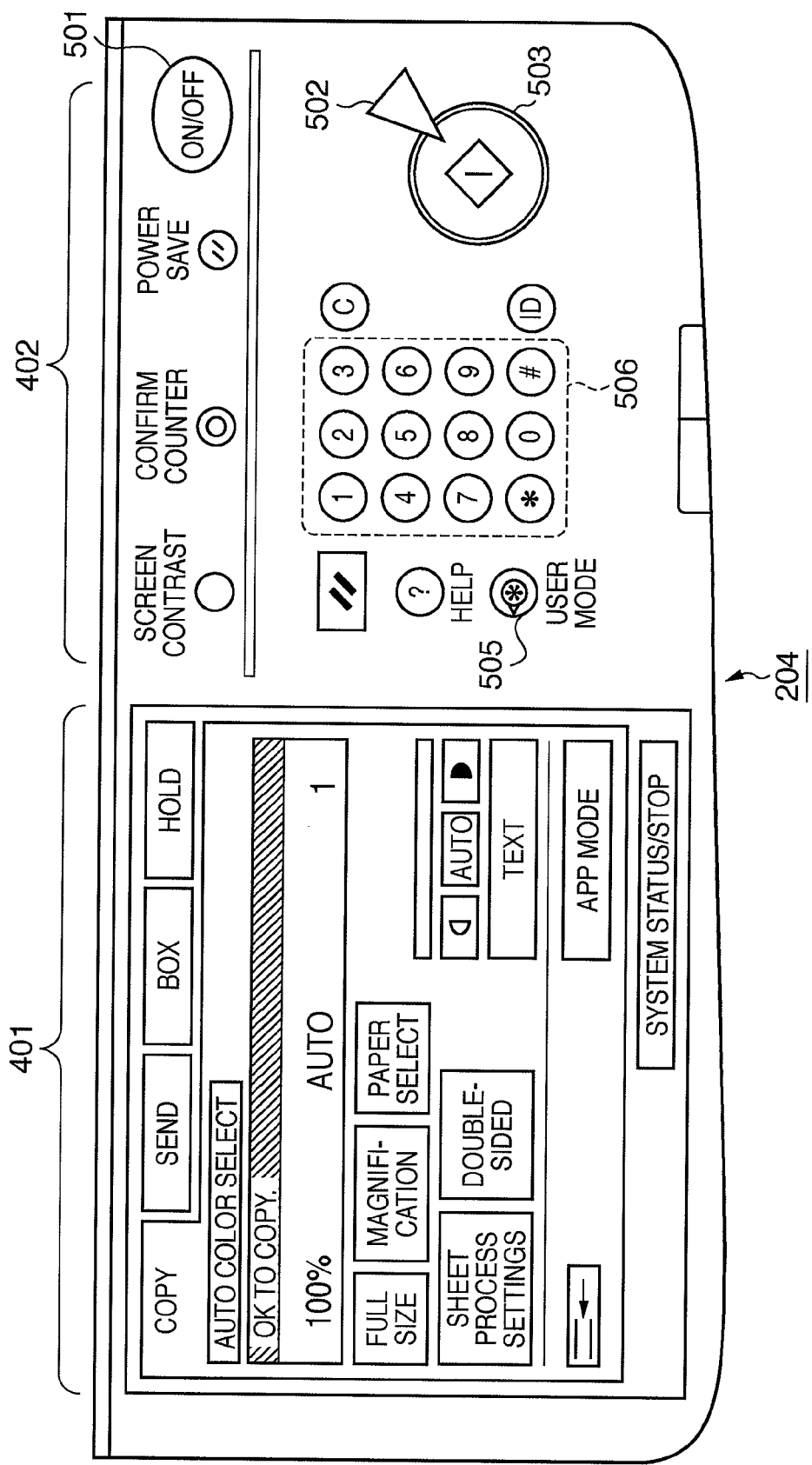
FIG. 7 depicts an external view of a console unit of a printing apparatus according to the embodiment of the present invention.

The printing apparatus 100 can connect any number of sheet processing apparatuses 200. This printing system 1000 is configured so that sheet processing performed on sheets printed by the printing apparatus 100 is executed by the sheet processing apparatus 200 connected to the printing apparatus 100. The sheet processing apparatus 200 is configured to be capable of communication with the printing apparatus 100, and can receive instructions from the printing apparatus 100 and execute sheet processing, which shall be discussed later. A scanner unit 201 scans an image of an original document, converts this into image data, and transfers the image data to other units. An external interface unit 202 transmits and receives data to and from other devices connected to the network 101. A printer unit 203 prints images based on inputted image data onto sheets. A console unit 204 includes, as shown in FIG. 7, a hard-key input unit 402, a touch panel 401, and so on, and accepts instructions from the user therethrough. The console unit 204 also performs various displays in the touch panel that the console unit 204 includes. A controller 205 centrally controls the processes, operations, and so on of the various units included in the printing system 1000. In other words, the controller 205 also controls the operations of the printing apparatus 100 and the sheet processing apparatus 200 connected to the printing apparatus 100. A ROM 207 stores various programs executed by the controller 205.

For example, the ROM 207 stores a program for executing the various processes in the flowcharts discussed later, a display control program for displaying various setting screens, and so on. Furthermore, the ROM 207 stores a program for the controller 205 to execute operations for interpreting PDL (Page Description Language) code data received from the server PC 103, the client PC 104, and the like, to expand the code data into raster image data. The ROM 207 also stores various programs such as programs for a boot sequence, font information, and so on. A RAM 208 stores image data sent from the scanner unit 201, the external interface unit 202, and so on, various programs and setting information stored in the ROM 207, and the like. The RAM 208 also stores information regarding the sheet processing apparatus 200 (information regarding the number (0 to n) of sheet processing apparatuses 200 connected to the printing apparatus 100 and the functions of the sheet processing apparatus 200, as well as the connection sequence of the sheet processing apparatuses 200, and so on). An HDD (hard disk) 209 is configured of a hard disk, a driving portion that reads and writes data to and from the hard disk, and so on. The HDD 209 is a large-capacity storage device that stores image data inputted from the scanner unit 201, the external interface unit 202, and so on and compressed by a codec 210. Based on instructions from the user, the controller 205 can print image data stored in the HDD 209 using the printer unit 203. Furthermore, based on instructions from the user, the controller 205 can transmit image data stored in the HDD 209 to an external apparatus such as the server PC 103 via the external interface unit 202. The codec 210 compresses/decompresses image data and the like stored in the RAM 208 and the HDD 209 using various compression schemes, such as JBIG, JPEG, and so on.

(Device Configuration of Printing System 1000 (Mechanical Configuration))

Figure 3:
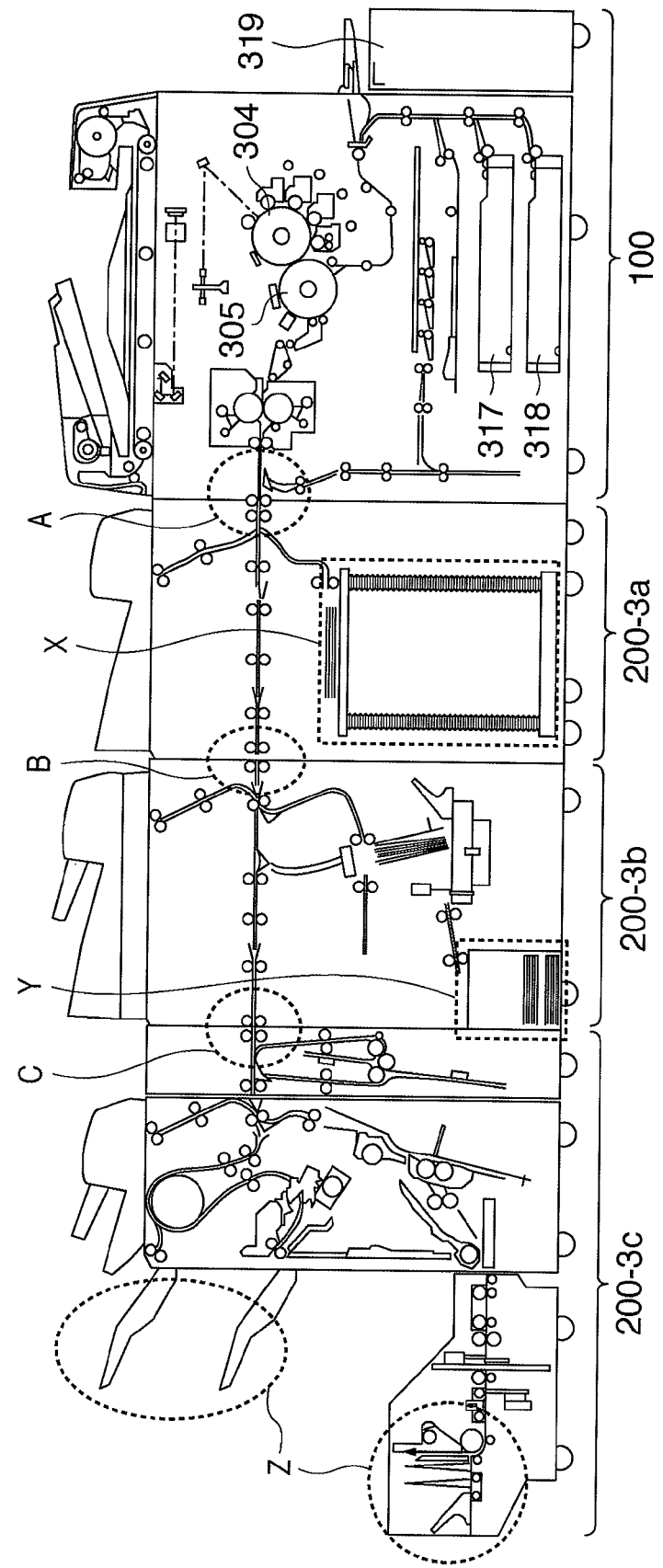
FIG. 3 is a diagram illustrating the hardware configuration of the printing system according to the embodiment of the present invention.

FIG. 3 is a diagram illustrating the hardware configuration of the printing system 1000.

The sheet processing apparatus 200 in the printing system 1000 according to the present embodiment can link any number of any type of device as long as sheets can be fed along a sheet feeding path from an upstream device to a downstream device. For example, as shown in FIG. 3, a large-volume stacker 200-3a, a glue binding apparatus 200-3b, and a saddle stitching apparatus 200-3c can be linked, in that order starting from the printing apparatus 100. Each sheet processing apparatus 200 is provided with a sheet discharge unit, and the user can retrieve a sheet on which sheet processing has been performed from the sheet discharge units of each sheet processing apparatus 200. Based on instructions received from the user, the aforementioned controller 205 performs the following processes with respect to the sheet processing apparatuses 200 connected to the printing apparatus 100.

For example, assume that a user has used the console unit 204 to instruct a large-volume sheet stacking process for a certain printing job. In this case, the controller 205 causes the printing apparatus 100 to execute the sheet printing process of that print job, and then causes the large-volume stacker 200-3a connected to the printing apparatus 100 to execute the large-volume stacking process for the printed sheets.

On the other hand, assume that the user has used the console unit 204 to instruct a case binding process for a certain printing job. In this case, the controller 205 causes the printing apparatus 100 to execute the sheet printing process of that print job, and then causes the glue binding apparatus 200-3b connected to the printing apparatus 100 to execute the case binding process for the printed sheets.

Alternatively, assume that the user has used the console unit 204 to instruct a pad binding process for a certain printing job. In this case, the controller 205 causes the printing apparatus 100 to execute the sheet printing process of that print job, and then causes the glue binding apparatus 200-3b connected to the printing apparatus 100 to execute the pad binding process for the printed sheets.

Finally, assume that the user has used the console unit 204 to instruct a saddle stitching process for a certain printing job. In this case, the controller 205 causes the printing apparatus 100 to execute the sheet printing process of that print job, and then causes the saddle stitching apparatus 200-3c connected to the printing apparatus 100 to staple the printed sheets. Similarly, when the user has used the console unit 204 to instruct a punching process, a cutting process, a folding process, or a saddle stitching process, the controller 205 causes the saddle stitching apparatus 200-3c connected to the printing apparatus 100 to perform the instructed sheet process.

In this manner, the controller 205 accepts, via the console unit 204, a request to execute the type of sheet process desired by the user from the candidates for types of sheet processing executable by the sheet processing apparatuses 200 connected to the printing apparatus 100, along with the print execution request. Then, in response to the print execution request for that job accepted from the user, the controller 205 causes the printer unit 203 to perform the printing process required by that job. The controller 205 then causes the sheets of the job on which the printing process has been performed to be fed, via the sheet feeding path, to the sheet processing apparatus 200 capable of executing the sheet process desired by the user, whereupon that sheet processing apparatus 200 is caused to execute the instructed sheet process.

For example, in the case where the job to be processed as per the print execution request from the user is a job in which a large-volume stacking process has been instructed to be carried out by the large-volume stacker 200-3a, that job is called a "stacker job". In the case where the stacker job is to be processed by the system shown in FIG. 3, the controller 205 causes the sheets of this job printed by the printing apparatus 100 to be fed to the large-volume stacker 200-3a, passing through point A in FIG. 3. After this, the controller 205 causes the large-volume stacker 200-3a to execute the stacking process for that job. The controller 205 then causes the printed material of this job on which the stacking process has been performed by the large-volume stacker 200-3a to be held at a discharge destination X within the large-volume stacker 200-3a, rather than being fed to another device (for example, the device in the next stage). Next, the user can remove the printed materials of the stacker job held at the discharge destination X directly from the area of the discharge destination X. Through this, the series of device processes and user operations, from feeding the sheets in the sheet feeding direction shown in FIG. 3 to the lowermost discharge destination Z and removing the printed materials of the stacker job from the discharge destination Z, is rendered unnecessary.

Next, it is assumed that the job to be processed as per the print execution request from the user is a job in which sheet processing is carried out by the glue binding apparatus 200-3b (for example, a glue binding process such as either a case binding process or a pad binding process). This job is called a "glue binding job". In the case where the glue binding job is to be processed by the system shown in FIG. 3, the controller 205 causes the sheets of this job printed by the printing apparatus 100 to be fed to the glue binding apparatus 200-3b, passing through points A and B in FIG. 3. After this, the controller 205 causes the glue binding apparatus 200-3b to execute the glue binding process for that job. The controller 205 then causes the printed material on which the glue binding process has been performed by the glue binding apparatus 200-3*b* to be held at a discharge destination Y of the glue binding apparatus 200-3*b* as-is, rather than being fed to another device (for example, the device in the next stage).

Furthermore, for example, the job to be processed by the system shown in FIG. 3 as per the print execution request from the user is assumed to be a job in which a sheet process has been instructed to be carried out by the saddle stitching apparatus 200-3*c*. Saddle stitching, a punching process, a cutting process, a shift discharging process, a folding process, and so on are examples of the sheet process performed by the saddle stitching apparatus 200-3*c*. Here, this job is called a "saddle stitching job". In the case where the saddle stitching job is to be processed, the controller 205 causes the sheets of this job printed by the printing apparatus 100 to be fed to the saddle stitching apparatus 200-3*c*, passing through points A, B, and C. After this, the controller 205 causes the saddle stitching apparatus 200-3*c* to execute the saddle stitching process. The controller 205 then causes the printed materials of the saddle stitching job on which the sheet process has been performed by the saddle stitching apparatus 200-3*c* to be held in the discharge destination Z of the saddle stitching apparatus 200-3*c*. Note that multiple discharge destination candidates are present in the discharge destination Z. This is used when the saddle stitching apparatus 200-3*c* can execute multiple types of sheet processes, discharge destinations are separated by sheet process.

The printer unit 203 of the printing apparatus 100 according to the present embodiment forms a toner image on a photosensitive member 304 based on an image signal, which is then transferred onto a transfer roller 305, forming a YMCK color image; the color image is then transferred onto a sheet and thus printed. This printer unit 203 is commonly known and thus detailed descriptions thereof shall be omitted.

The printing system 1000 of the present embodiment described above can connect multiple sheet processing apparatuses 200 to a printing apparatus 100. The multiple sheet processing apparatuses 200 can connect to the printing apparatus 100 in any combination. Furthermore, the connection order of the multiple sheet processing apparatuses 200 can be freely altered as long as the sheet feeding path is maintained between the apparatuses. Multiples types of sheet processing apparatuses 200 are present as candidates capable of connecting to the printing apparatus 100.

Figure 4:
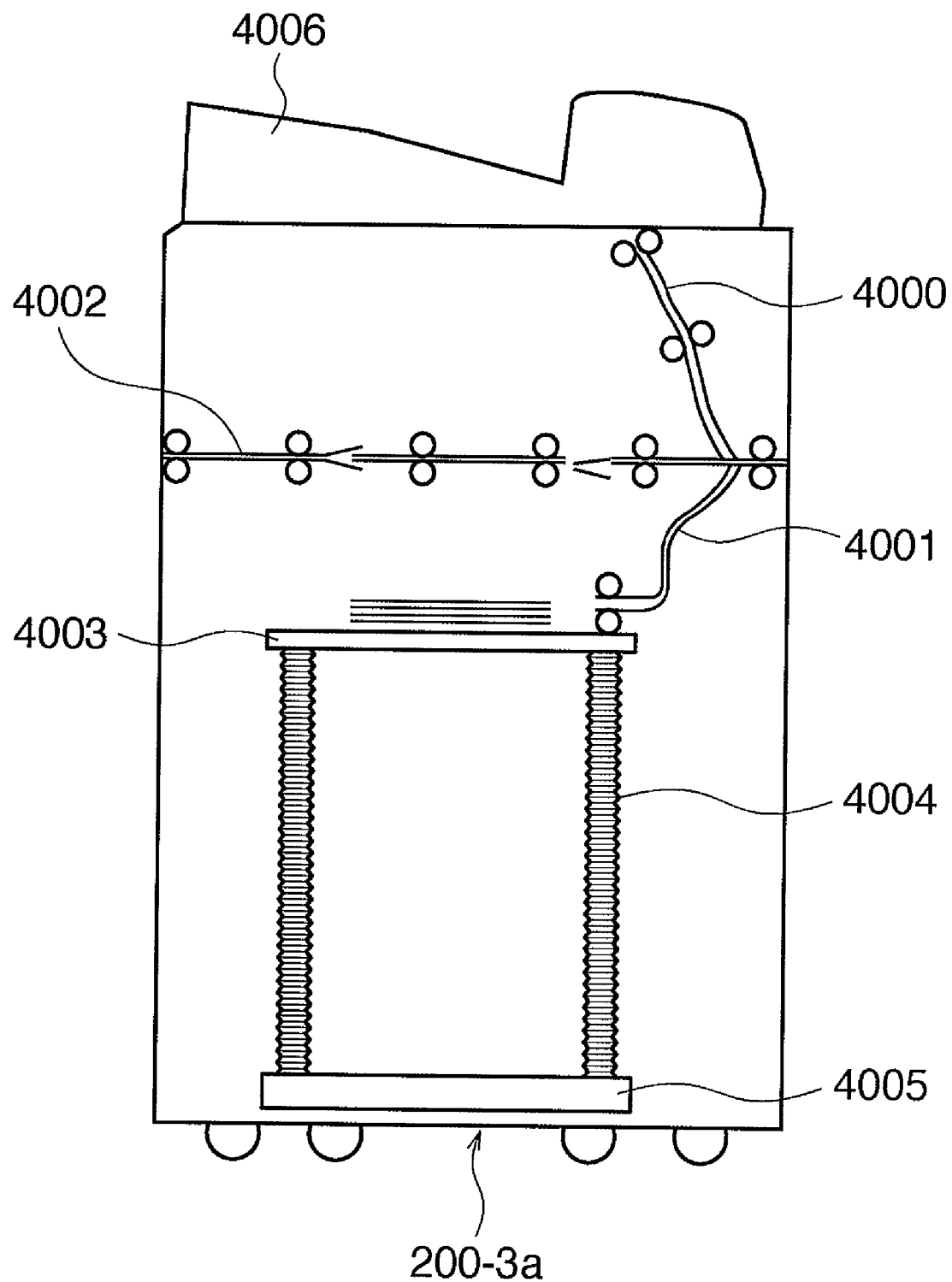
FIG. 4 depicts a cross-sectional view illustrating a large-volume stacker according to the embodiment of the present invention.
Figure 5:
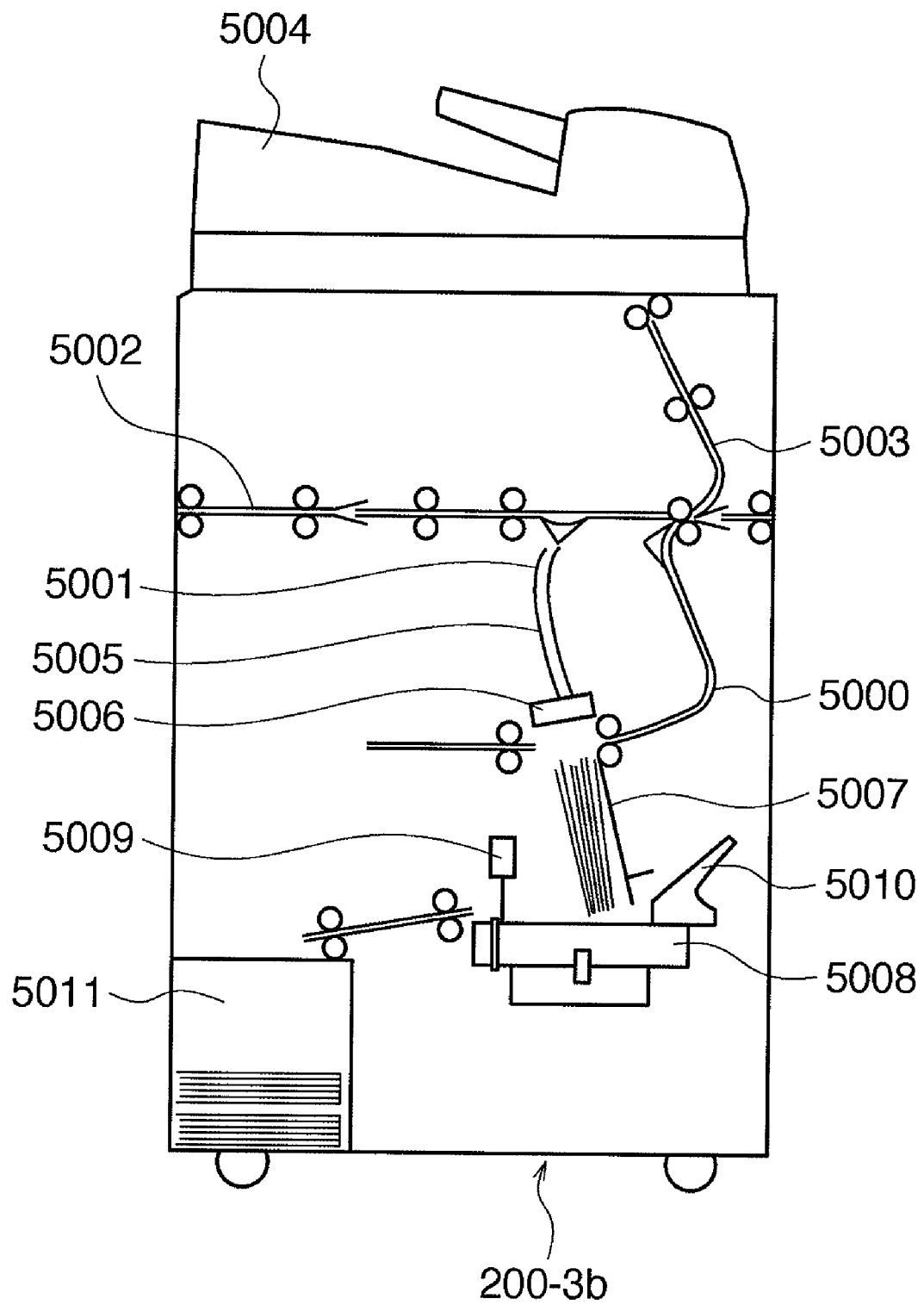
FIG. 5 depicts a cross-sectional view illustrating the internal configuration of a glue binding apparatus according to the embodiment of the present invention.
Figure 6:
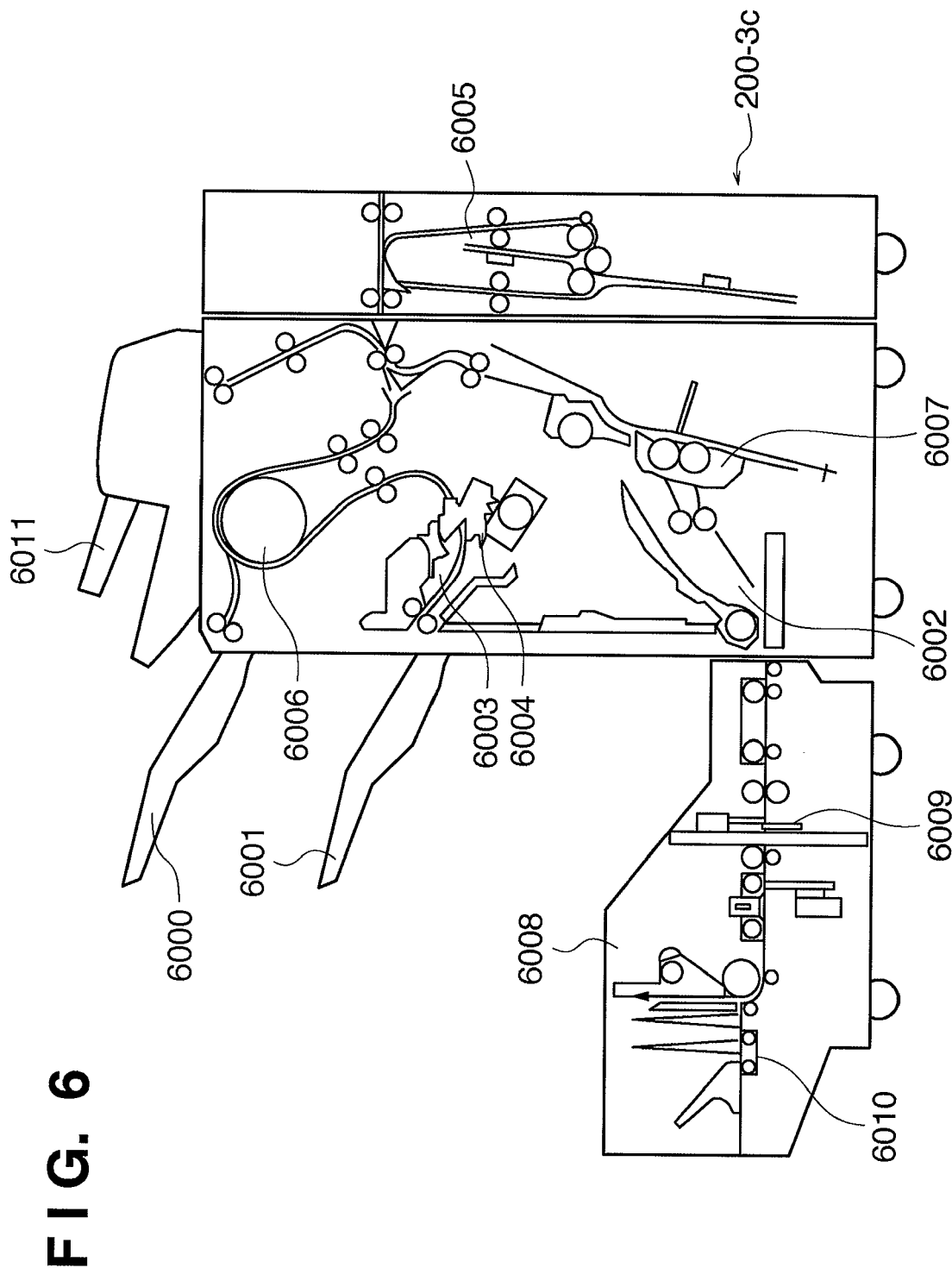
FIG. 6 depicts a cross-sectional view illustrating the configuration of a saddle stitching apparatus according to the embodiment of the present invention.

Next, the internal configurations of the sheet processing apparatuses 200 capable of connecting to the printing apparatus 100 shall be described, by type, with reference to FIGS. 4 through 6.

FIG. 4 depicts a cross-sectional view illustrating the large-volume stacker 200-3*a*.

The large-volume stacker 200-3*a* selectively feeds sheets fed from the printing apparatus 100 located upstream along three feeding paths. One is a sample tray path 4000 that discharges sheets to a sample tray. Another is a stack path 4001 that sends sheets to a stacker tray, and the last is a straight path 4002 that simply passes the sheets on. A stack tray 4003 is a stacking unit that stacks sheets upon a compressible stay 4004. A removable carriage 4005 is provided underneath the compressible stay 4004. Using the carriage 4005, the sheets stacked on the stack tray 4003 can be removed and fed by an operator to another location. Assume that a request to execute a job that is set so that the large-volume stacker 200-3*a* stacks sheets is inputted by the user via the console unit 204. In this case, the controller 205 feeds the sheets printed by the printing apparatus 100 to the stack path 4001 provided in the large-volume stacker 200-3*a*, discharges the sheets to the stack tray 4003 and stacks the sheets on it. The straight path 4002 is a sheet feeding path for simply feeding sheets to the next stage of the system, without performing the sheet stacking processing using the stack tray 4003 in the large-volume stacker 200-3*a*.

Furthermore, the sample tray path 4000 is a sheet feeding path for discharging sheets to a sample tray 4006. This is used to simplify the removal of materials outputted from the stack tray 4003 when performing operations that require the output to be confirmed. For example, in this case, the controller 205 discharges the sheets printed by the printing apparatus 100 to the sample tray 4006 via the sample tray path 4000. Note that each sheet feeding path in the large-volume stacker 200-3*a* is provided with multiple sheet detection sensors for detecting the feed status of sheets, paper jams, and the like. The large-volume stacker 200-3*a* also includes a CPU (not shown), which communicates sheet detection information from the sensors to the controller 205 via a signal line. The controller 205 ascertains the feed status of sheets, paper jams, and so on based on the information from the large-volume stacker 200-3*a*. Note that when another sheet processing apparatus 200 is connected between the large-volume stacker 200-3*a* and the printing apparatus 100, the CPU (not shown) provided in that sheet processing apparatus 200 communicates the sensor information of the large-volume stacker 200-3*a* to the controller 205.

FIG. 5 depicts a cross-sectional view illustrating the internal configuration of the glue binding apparatus 200-3*b*.

The glue-binding apparatus 200-3*b* selectively feeds sheets fed from the device located upstream along three feeding paths. The three feeding paths are a cover path 5000, a body path 5001, and a straight path 5002. The glue binding apparatus 200-3*b* also includes an inserter path 5003. The inserter path 5003 is a sheet feeding path that feeds sheets placed in an inserter tray 5004 to the cover path 5000. The straight path 5002 is a sheet feeding path for feeding sheets that do not need to undergo the glue binding process performed by the glue binding apparatus 200-3*b* to the apparatus in the next stage. Meanwhile, the body path 5001 and the cover path 5000 are sheet feeding paths for feeding sheets necessary when creating a case-bound printed material. For example, when a case-bound printed material is created using this glue binding apparatus 200-3*b*, the controller 205 causes the printer unit 203 to print image data for the main text to be printed onto sheets for the main text of the case-bound printed material. Note that the batch of sheets for the main text in this case-binding process is called a "body". The controller 205 performs control so that the sheets that are to become this body printed by the printing apparatus 100 are fed to the body path 5001. When performing a case-binding process, the controller 205 then executes a process for encasing the body printed by the printing apparatus 100 with a cover sheet fed via the cover path 5000. For example, the controller 205 causes a stacker unit 5005 to sequentially stack, via the body path 5001, the sheets that are to become the body and that have been fed from the upstream device. When a number of sheets onto which the main text data has been printed equivalent to a single volume have been stacked by the stacker unit 5005, the controller 205 causes a single cover sheet required by the job to be fed via the cover path 5000. Note that there are cases where the cover sheet is fed from the printing apparatus 100 or from the inserter path 5003, based on instructions from the user.

Parallel to this operation, the controller 205 causes an adhesion process to be performed by an adhesion unit 5006 on the spine of one set's worth of a batch of sheets, which is equivalent to the body that has been stacked by the stacker unit 5005. After this, the spine portion of the body on which the glue binding process has been carried out is joined with the central portion of the cover by the adhesion unit 5006. When the cover is joined with the body, the body is fed so as to push down toward the bottom of the device. Through this, the cover undergoes a folding process that encases the body in a single cover sheet. Then, the single set's worth of a batch of sheets is stacked upon a turn table 5008 using a guide 5007.

After the single set's worth of a batch of sheets has been set in the turn table 5008, the controller 205 executes, using a cutter unit 5009, a three-way cutting process that cuts the three end portions of the single set's worth of a batch of sheets aside from the spine portion. To be more specific, the controller 205 uses the turn table 5008 to rotate the batch of sheets 90 degrees each time the cutting process is executed on an end portion. By performing this cutting process for an end portion a total of three times, the three-way cutting process is completed. After this, the controller 205 uses a shifting unit 5010 to push the batch of sheets that has undergone the three-way cutting process in the direction of a basket 5011, storing the batch of sheets in the basket 5011.

FIG. 6 depicts a cross-sectional view illustrating the configuration of the saddle stitching apparatus 200-3c.

The saddle stitching apparatus 200-3c includes units for selectively executing a stapling process, a cutting process, a punching process, a folding process, a shift discharging process, a saddle stitching process, and the like on the sheets printed by the printing apparatus 100. The saddle stitching apparatus 200-3c does not have a straight path that implements a function for feeding sheets to the device in the next stage. For this reason, in a case that multiple sheet processing apparatuses are connected to the printing apparatus 100, the saddle stitching apparatus is the final device connected, as shown in FIG. 3.

The saddle stitching apparatus 200-3c includes a sample tray 6000 and a stack tray 6001 externally and a booklet tray 6002 internally. The controller 205 causes the sheets printed by the printing apparatus 100 to be sequentially stacked on an internal processing tray 6003 when an instruction for stapling has been received by the saddle stitching apparatus 200-3c. When a single batch of sheets has been stacked on the processing tray 6003, the controller 205 causes a stapler 6004 to execute the stapling. The controller 205 then causes the stapled batch of sheets to be discharged from the processing tray 6003 to the stack tray 6001.

In addition, the controller 205 causes a Z folding unit 6005 to perform a Z-shaped folding process on the sheets printed by the printing apparatus 100, in a case that executing a job in which Z folding by the saddle stitching apparatus 200-3c has been instructed. The controller 205 then performs control that causes the sheets that have undergone the folding process to pass through the saddle stitching apparatus 200-3c and to be discharged to discharge trays such as the stack tray 6001, the sample tray 6000, and so on.

In addition, the controller 205 causes a puncher unit 6006 to execute a punching process on the sheets printed by the printing apparatus 100 in a case that the saddle stitching apparatus 200-3c has been instructed to make punching process settings. The controller 205 then performs control that causes the processed sheets to pass through the saddle stitching apparatus 200-3c and to be discharged to the discharge trays such as the stack tray 6001, the sample tray 6000, and so on.

In addition, the controller 205 causes a saddle stitcher unit 6007 to stitch, in two places, the central potion of a batch of sheets made up of one set's worth of multiple sheets, in a case that executing a job in which a saddle stitching process by the saddle stitching apparatus 200-3c has been instructed. The controller 205 then causes two folds to be made central to the central portion of the sheets, by causing the central portion of the batch of sheets to be gripped by a roller. A booklet, such as a pamphlet, can be created in this manner. The batch of sheets on which the saddle stitcher unit 6007 has thus performed the saddle stitching process is then fed to the booklet tray 6002.

Furthermore, the controller 205 causes the saddle-stitched batch of sheets to be fed from the booklet tray 6002 to a trimmer 6008, in a case that an instruction to perform a cutting process has been received in a job for which a saddle stitching process had been instructed. After this, the controller 205 causes the batch of sheets fed to the trimmer 6008 to be cut by a cutter unit 6009, and then causes the batch of sheets to be held in a booklet holding unit 6010. The saddle stitching apparatus 200-3c is also configured so as to be capable of performing a three-way cutting process on the batch of sheets that have been saddle-stitched.

Note that in the case where the saddle stitching apparatus 200-3c does not have the trimmer 6008, the batch of sheets subjected to binding by the saddle stitcher unit 6007 can be removed from the booklet tray 6002. The saddle stitching apparatus 200-3c is also configured to be capable of attaching a sheet (for example, a pre-printed cover sheet) set in an insert tray 6011 to sheets printed by the printing apparatus 100 and fed from the printing apparatus 100.

Next, the configuration of the console unit 204 shall be described with reference to FIG. 7.

FIG. 7 is an external view of the console unit 204 of the printing apparatus 100 according to the present embodiment.

The console unit 204 includes the touch panel unit 401 and the key input unit 402. The touch panel unit 401 is composed of a liquid-crystal display unit on top of which a transparent electrode is attached, and displays various setting screens for accepting instructions from the user. The touch panel unit 401 therefore includes both a function for displaying various screens and an instruction input function for accepting instructions from the user. The key input unit 402 includes a power key 501, a start key 503, a stop key 502, a user mode key 505, a numerical keypad 506, and so on. The start key 503 is used to cause the printing apparatus 100 to start a copy job, a transmission job, and so on. The numerical keypad 506 is used when making settings that use numerical inputs, such as the number of prints to be made. The controller 205 controls the printing system 1000 to perform various processes based on user instructions accepted through the various screens displayed in the touch panel unit 401, user instructions accepted through the key input unit 402, and so on.

FIG. 8 is a diagram illustrating an example of a setting screen for the user to select the type of sheet process to be executed on the sheets printed by the printing apparatus 100 according to the present embodiment.

The controller 205 causes the screen shown in FIG. 8 to be displayed in the touch panel unit 401 when a sheet process setting key (see FIG. 7) on the screen displayed in the touch panel unit 401 is touched by the user. This screen is a setting screen configured so that the user can select the type of sheet process that can be executed using the sheet processing apparatuses 200 that are present in the printing system 1000. The controller 205 accepts the settings of the sheet processes to be executed in the job that is to be processed from the user via this setting screen, and causes the sheet processes according to those settings to be executed by the sheet processing apparatuses 200.

Meanwhile, FIG. 9 is a diagram illustrating an example of a system setting screen displayed in the console unit.

This is a setting screen for the user to register information for specifying the types, connection order, number of sheet processing apparatuses, and the like, in the case where sheet processing apparatuses 200 are connected to the printing apparatus 100. The controller 205 causes the screen shown in FIG. 9 to be displayed in the touch panel unit 401 when the user mode key 505 has been pressed. Next, descriptions shall be given assuming that the printing system 1000 according to the present embodiment is set according to the system configuration shown in, for example, FIG. 3. In this case, registration information illustrating that three sheet processing apparatuses, or a "large-volume stacker", a "glue binding apparatus", and a "saddle stitching apparatus" are connected to the printing apparatus 100 in order starting with the large-volume stacker, is set, as shown in FIG. 9. The controller 205 stores information of the sheet processing apparatuses 200 set by the user via this setting screen in the RAM 208 as system configuration data, and reads out and refers to the data as appropriate. Through this, the controller 205 can confirm the sheet processes that can be executed by the sheet processing apparatus, as well as the connection order, number, and so on of the sheet processing apparatuses connected to the printing apparatus 100.

Next, it is assumed that in the example shown in FIG. 9, the saddle stitching apparatus 200-3c that does not have a straight path is set so as to be connected in the middle of the multiple sheet processing apparatuses 200. In this case, the controller 205 causes the touch panel unit 401 to display an error indicating that the setting is invalid. In addition, in the example shown in FIG. 9, the controller 205 may also cause guidance information to be displayed in order to notify the user that the saddle stitching apparatus 200-3c is to be connected as the final device, so that settings such as described above are not carried out.

Meanwhile, although in the present embodiment, the console unit 204 provided in the printing apparatus 100 is described as an example of a user interface unit applied in the printing system 1000, another unit may be used instead. For example, the printing system 1000 may be configured so as to be capable of performing processes based on instructions received from a user interface unit provided in an external apparatus such as the server PC 103, the client PC 104, or the like.

Figure 10:
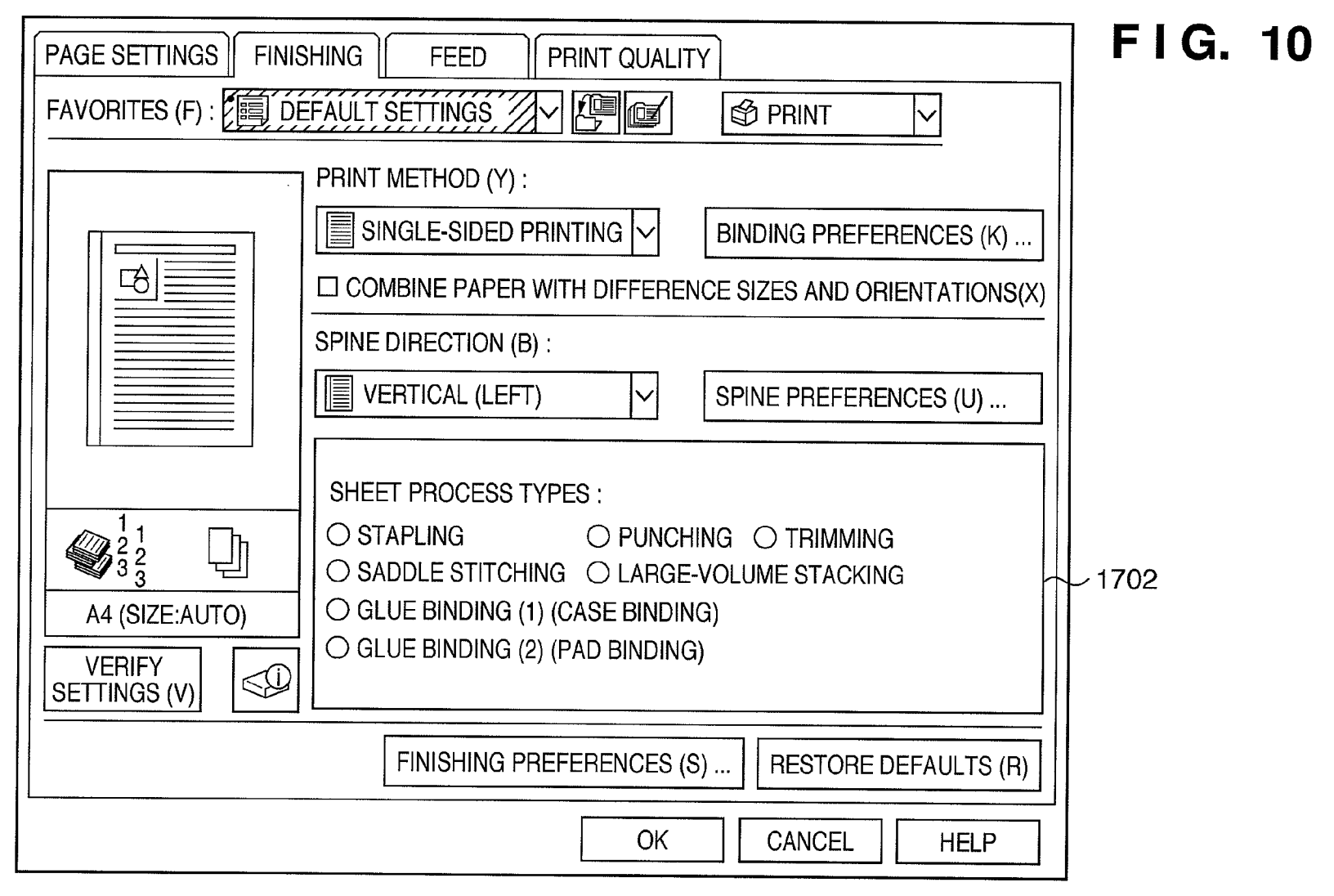

FIG. 10 is a diagram illustrating an example of a setting screen displayed in a display unit of an external apparatus in the case where the printing system 1000 is remotely operated using the external apparatus. Here, the client PC 104 shall be described as an example. Accordingly, FIG. 10 is an example of a screen displayed in a display provided in the client PC 104.

When a print request is accepted from the user, a CPU provided in the client PC 104 displays a screen such as that shown in FIG. 10 in the display, and accepts settings regarding print process conditions from the user of the PC 104 via this screen. For example, the user can specify, from the client PC 104, the type of sheet process to be executed by the sheet processing apparatuses 200 for a print job requested to be executed. Accordingly, when an OK key is specified, the CPU of the client PC 104 recognizes a "type" item for the sheet process that has been checked in a setting field 1702. Through this, the CPU of the client PC 104 associates the print process conditions accepted through this screen with the image data that is to be printed and transmits the two as a single print job to the printing system 1000 via the network 101. Through this, the controller 205 of the printing system 1000 accepts the execution request for this print job via the external interface unit 202, and processes the print job from the client PC 104. In this manner, various units can be used as user interfaces for the printing system 1000. The controller 205 of the printing apparatus 100 according to the present embodiment executes the controls discusses below.

FIG. 11 is a diagram illustrating an example of various programs stored in the ROM 207 of the printing apparatus 100 according to present embodiment as well as data used by those programs. As shown in FIG. 11, programs for implementing various functions provided by the printing system 1000 are stored in the ROM 207.

A boot loader 3101 is a program executed immediately after the printing system 1000 is turned on, and executes various startup sequences necessary for system startup. An operating system 3102 is designed to offer an operating environment for the various programs that implement the functions of the printing system 1000, and mainly provides memory resource management for the printing system 1000, basic input/output control for the various devices shown in FIG. 11, and so on. Note that "memory" as described here refers to the ROM 207, RAM 208, hard disk (HDD) 209, and so on shown in FIG. 2. A data transmission/reception program 3103 performs transmission/reception processing carried out when a data input/output request has occurred via the external interface unit 202. To be more specific, this program includes a protocol stack such as TCP/IP, and carries out communication of various types of data between external devices and the like connected by the network 101 in the POD system 10000 shown in FIG. 1. The communication process carried out here is a process specialized for the transmission/reception level of data packets inputted/outputted between the printing system 1000 and the network 101, HTTP servers, and so on.

A device management program 3104 performs overall management of the connection states, statuses, capabilities, and so on of the various devices managed by the printing system 1000 and used to implement the functions of a multi-function peripheral. Note that "various devices" includes devices and the like that are both removable and non-removable, such as, for example, the printer unit 203, the scanner unit 201, the sheet processing apparatuses 200, and so on. The device management program 3104 is executed by the controller 205 when the controller 205 has been notified of system startup and when the state of a connected device has changed.

A copy program 3105 executes a copy process executed by the controller 205 when the user has instructed copying to be executed using the console unit 204. This copy process can be executed when the printing system has finished its startup process and is in a state in which it is capable of functioning as a multi-function peripheral. In order to execute this copy process, the controller 205 sequentially instructs the device resources of the printing system 1000 to operate in the appropriate order based on the processing order, processing conditions, and so on described in the program. This results in control that ultimately causes the copy process to be executed. Note that the device resources for implementing this copy process include, for example, the scanner unit 201, the printer unit 203, the sheet processing apparatuses 200, the hard disk 209, the codec 210, the RAM 208, and so on.

A scan program 3106 executes a scan process executed by the controller 205 when the user has instructed the scan process to be executed using the console unit 204. This scan process can also be executed when the printing system has finished its startup process and is in a state in which it is capable of functioning as a multi-function peripheral. In order to execute this scan process, the controller 205 sequentially instructs the device resources in the printing system 1000 to operate in the appropriate order based on the processing order, processing conditions, and so on described in the program, resulting in control that ultimately causes the scan process to be executed. Note that the device resources for implementing this scan process include, for example, the scanner unit 201, the hard disk 209, the codec 210, the RAM 208, and so on.

A PDL print program 3107 executes a PDL print process executed by the controller 205 when PDL print job data has been received via the external interface unit 202. This PDL print process can also be executed when the printing system 1000 has finished its startup process and is in a state in which it is capable of functioning as a multi-function peripheral. The controller 205 sequentially instructs the device resources in the printing system 1000 to operate in the appropriate order based on the processing order, processing conditions, and so on described in the program. This results in control that ultimately causes the PDL print process to be executed. The device resources for executing the PDL print process include, for example, the sheet processing apparatuses 200, the printer unit 203, the hard disk 209, the codec 210, the RAM 208, and so on.

A JDF print program 3108 executes a JDF print process executed by the controller 205 when job data including a JDF job ticket is received via the external interface unit 202. This JDF print process can also be executed when the printing system 1000 has finished its startup process and is in a state in which it is capable of functioning as a multi-function peripheral. The controller 205 sequentially instructs the device resources in the printing system 1000 to operate in the appropriate order based on the processing order, processing conditions, and so on described in the program. This results in control that ultimately causes the JDF print process to be executed. The device resources for executing the JDF print process include, for example, the sheet processing apparatuses 200, the printer unit 203, the hard disk 209, the codec 210, the RAM 208, and so on.

A box program 3109 is executed by the controller 205 when the user has instructed the printing system 1000 to execute a box process using the console unit 204. This box process can also be executed when the printing system has finished its startup process and is in a state in which it is capable of functioning as a multi-function peripheral. The controller 205 sequentially instructs the device resources in the printing system 1000 to operate in the appropriate order based on the processing order, processing conditions, and so on described in the program. The box process is executed thereby. The device resources here include, for example, the scanner unit 201, the printer unit 203, the sheet processing apparatuses 200, the hard disk 209, the codec 210, the RAM 208, and so on.

A UI control program 3110 is a control program for the touch panel unit 401 and the key input unit 402 of the console unit 204 that is executed when the printing system has finished its startup process and is in a state in which it is capable of functioning as a multi-function peripheral. The UI control program 3110 identifies details inputted through the console unit 204 by the user of the printing system 1000 and transits to the appropriate screens, and also instructs the controller 205 to make processing requests.

Other control programs 3111 implement functions that do not correspond to any of the abovementioned programs. The details thereof are not of importance here and shall therefore be omitted. A device capability table 3112 is table information that statically holds information of the capabilities of the devices that can be attached to the printing system 1000. The capability information is referred to when the controller 205 of the printing system 1000 executes various jobs and when the controller 205 controls the device itself. This information is stored in the ROM 207, and is referred to when performing a process for, for example, changing the processing content based on the capabilities of the attached device. While the name of this table is "device capability table", it should be noted that the attachable devices are not limited to removable devices such as, for example, the large-volume stacker 200-3a, the glue binding apparatus 200-3b, and the saddle stitching apparatus 200-3c. For example, the printing apparatus 100 itself and the scanner provided in the printing apparatus 100 may be managed in the same table in a special format as an attachable device. In the present embodiment, descriptions are given for a case where information regarding the printing apparatus 100 is also managed in the same table, in the same manner as for removable devices.

FIG. 12 is a diagram illustrating an example of the storage states of various data stored in the HDD 209 and read out or written by the controller 205 of the printing system 1000. The controller 205 uses various data stored in the HDD 209 to perform control so that various processes are performed.

Note that the information stored in the HDD 209 is in a different state than the data in ROM 207 shown in FIG. 11, fluctuating dynamically in accordance with the state of use of the device, the device configuration, the job progress, and so on. For this reason, the state of the data shown in FIG. 12 illustrates the state of the data at a particular point in time while the printing system 1000 is running. Therefore, the state of the data within the ROM 207 is not necessarily always the same as that shown in FIG. 12. For example, there are cases where the blank area shown in FIG. 12 is used up and therefore does not exist when several large-volume print jobs have been received.

Device management data 3301 may or may not be present depending on the connection states of sheet processing apparatuses 200 that can be attached to the printing system 1000 and optional configurations of the printing system 1000; the device management data 3301 stores information regarding the connection states, statuses, and capabilities of devices, and so on. The device management data 3301 is managed by the device management program 3104. The information stored in and managed by the device management data 3301 and the timing and manner of use of the device management data 3301 by the controller 205 shall be described later with reference to FIGS. 15, 16, and so on.

A processing rule table 3302 holds operational specification regarding the operations of a device for when the settings made for a job render the job unable to be executed due to the device configuration, device capabilities, and so on, when the printing system 1000 is to process a JDF print job. The information stored in the processing rule table 3302 and the timing and manner of use of the processing rule table 3302 by the controller 205 shall be described later with reference to FIG. 17 and so on. The execution control of jobs based on the processing rule table 3302 need not be limited to JDF print jobs. For example, a processing rule table can be defined for another type of job, and thus similar processing to that performed for a JDF print job can be carried out when the other type of job is executed. In the present embodiment, descriptions shall be given regarding the JDF print job, for the sake of simplicity.

Stored document data 3303 corresponds to document data held in the printing system 1000 through the box process implemented by the box program 3109. A stored document management table 3304 stores management information for the stored document data 3303.

A spool area 3305 temporarily holds print target data that has been transmitted to the printing system 1000 until the execution of the job that uses the data is complete. Items transmitted due to the PDL print process implemented by the PDL print program 3107 or items transmitted due to the JDF print process implemented by the JDF print program 3108 are included in this print target data. When the execution of this print job is completed, the corresponding print job data is deleted from the spool area 3305, freeing up an area for the next print job. The control for this freeing up of an area in the spool area 3305 after data storage and job completion is controlled by the controller 205 during the execution process of the PDL printing and JDF printing.

A blank area 3306 corresponds to the remaining area in the HDD 209 separate from the abovementioned areas, and the capacity of this area changes depending on the progress of the processing performed by the printing system 1000. There are cases where the blank area 3306 disappears due to the usage load on the HDD 209.

FIG. 13 is a diagram illustrating an example of the structure of job data that is to be processed by a JDF print function implemented by the JDF print function program 3108.

With a JDF print job, the following items are incorporated into a single package using the MIME format, and it is assumed that data encoded in the MIME format is received. "MIME" stands for "Multipurpose Internet Mail Extensions":

content data corresponding to image information to be printed;
a job ticket area that holds only setting information for a job; and
a management area for communication between POD workflows and status management.

The JDF print function according to the present embodiment is also assumed to process job data in the MIME format. The handling of job data in formats other than the MIME package is also discussed in the JDF specifications. However, data packaging specifications do not fall within the scope of the present invention with respect to the effects of the present embodiment, and thus the aforementioned MIME format shall be described as an example. Of course, it goes without saying that a JDF job may be loaded in a different format than the MIME format.

A MIME header 3501 is a header area that is absolutely necessary when multiple parts are incorporated into a single package though the MIME format; MIME management information such as the overall data size of the MIME package is stored in this header. A JMF part 3502 is an area that stores management information for communication between POD workflows and status management, as described above.

A JDF part 3503 is an area that holds the abovementioned job setting information. The JDF job ticket is discussed in the JDF specifications published by CIP4 as a JDF specification regarding in what format a certain type of setting information is to be held. It is assumed that when the JDF print function in the printing system 1000 is implemented, processing is performed based on the items described in the JDF specifications, and thus detailed descriptions thereof shall be omitted. However, overall descriptions shall be given with reference to later diagrams using a specific example of a job ticket, in order to illustrate the most basic specific example to describe the effects of the present embodiment.

PDL files 3504, 3505, and 3506 are the actual content data to be printed. In FIG. 13, these three pieces of content data are included within the MIME package. Note that the specifications do not place any limitation of the number of pieces of PDL content. Furthermore, based on the JDF specifications, the PDL content may be stored in an external file system or the like rather than being included within the MIME package, with only the URL of the files stored in the file system being written in JDF. In this case, the printing system 1000 processes the content data by pulling the files stored in the external file system or the like based on the URLs. However, because the basic operations are the same as when the PDL content is included in the MIME package, detailed descriptions of the operations performed when pulling content files shall be omitted from the present embodiment. Note that the specifications of the MIME format itself are defined in the RFC (Request for Comments) and thus the details thereof shall be omitted here.

FIG. 14 is a diagram illustrating a specific example of JDF written content in the JDF part 3503 included in the MIME package according to the present embodiment. This diagram is nothing more than a specific example of JDF written content based on the JDF specifications, and the JDF written content is of course not limited to this.

The JDF part illustrated in FIG. 14 is broadly configured of the following four parts:

a JDF node 3701 in which JDF management information is stored;
an audit pool 3702 that stores a job history;
a resource link pool 3703 in which is written the relationships between resources and processes defined by JDF; and
a resource pool 3704 that stores setting information for process defined by JDF.

The specific specifications, written content, and schema and so on of each part may be anything as long as it is compliant with the JDF specifications. The JDF specifications are disclosed in the JDF specification and therefore shall not be discussed here.

FIG. 15 is a diagram illustrating a specific example of information stored and managed in the device capability table 3112 according to the present embodiment. The device capability table 3112 is included in the device management data 3301 (see FIG. 12).

The device capability table 3112 is made up of four fields, 3901 to 3904, and the information in these four fields is managed/stored for every connected device.

A device type field 3901 is a field for identifying the type of sheet processing apparatuses 200 attachable to the printing system 1000, the type of removable devices such as a paper tray 319 (see FIG. 3), and so on. Note that the printing apparatus 100 in the present embodiment is managed in the same table as a special device for managerial reasons pertaining to the management of all devices using a single table. If it is necessary to specifically identify and manage the attachable devices and printing apparatus 100, the table shown in FIG. 15 may be divided into two, and the management performed thereby. Hereinafter, the removable devices and the printing apparatus 100 itself shall all be referred to as "devices" in the descriptions of FIG. 15.

A category field 3902 stores categories to which the devices stored in the device type field 3901 belong. The following categories, for example, can be defined as categories stored here, and one of these categories is stored in the category field 3902.

a "printing apparatus" that can carry out a print process onto a sheet
a "tray" only for stocking the media (paper sheets or the like) to be printed
a "stacker" capable of holding a large amount of the outputted printed media
a "finisher" capable of performing a finishing process, such as folding, stitching, punching, or the like, on the various outputted sheets Note that devices that include a feed port and are thus independently capable of feeding sheets without attaching a tray are also present as the printing apparatus 100. For example, the printing system 1000 according to the present embodiment is provided with feed cassettes 317 and 318, as shown in FIG. 3, and can thus independently feed sheets. For table management purposes, this type of device is also is classified not into the category of "tray", but rather as a "printing apparatus". To put it differently, the device capability table 3112 is managed so that each device necessarily corresponds to one of the four types of categories described above.

A function field 3903 stores the types of functions provided in the device. Because the supported functions differ depending on the type of category to which the device belongs, the content of the table in FIG. 15 is structured to reflect those differences. In other words, the device capability table 3112 is managed so that devices belonging to the same category have the same set of function fields.

A supporting status 3904 holds flag information indicating whether or not each device is capable of implementing the function written in the respective function fields 3903. A value (for example, a code) indicating "OK" is stored in the function field 3903 in a case that the function is supported by the device, whereas a value indicating "NG" is stored in the function field 3903 in a case that the function is not supported by the device.

Information regarding five types of devices is stored in the device capability table 3112. The five types of devices are the multi-function peripheral itself, a large-volume paper tray, the large-volume stacker 200-3a, the glue binding apparatus 200-3b, and the saddle stitching apparatus 200-3c. Of these, the glue binding apparatus 200-3b and the saddle stitching apparatus 200-3c belong to the same category of "finisher".

FIG. 16 is a diagram illustrating the content of a device configuration table according to the present embodiment.

This device configuration table is managed by the device management program 3104, and is held in the RAM 208 according to the methods and conditions described with reference to the device management program 3104. The device configuration table registers the connection states of the removable sheet processing apparatuses 200, paper tray 319 (see FIG. 3), and so on that can be attached to the printing system 1000, or subdevices that make up the printing apparatus 100. The device configuration table includes three fields 4101 to 4103. These three fields shall be described below.

A device name field 4101 lists all the devices that can be attached to the printing system 1000. When multiple devices of the same type can be attached, the devices are managed by adding a number to the end of the device name. The printing system 1000 can select the combination of the device configuration table in accordance with the user's needs. Of course, not all combinations are possible, depending on the types of the devices to be combined. However, the device name field 4101 in the device configuration table does not manage the validity of such combinations, and lists all the devices that may be attached to the device. Whether or not the device is actually attached is identified by the value in a different field (a connection status field 4103) within this table, which shall be described later.

A device type field 4102 stores categories of the devices stored in the device name field 4101. Here, the values stored are the same as those stored in the category field 3902 of the device capability table 3112.

The connection status field 4103 stores data indicating whether or not the devices written in the device name field 4101 are actually connected to the printing apparatus 100. Here, when the device written in the device name field 4101 is connected to the printing apparatus 100, data indicating "OK" is stored. However, when the device written in the device name field 4101 is not connected to the printing apparatus 100, data indicating "NG" is stored. The example of the table shown in FIG. 16 indicates that one each of the scanner unit 201 and the large-volume stacker 200-3a are connected to the printing apparatus (multi-function peripheral) 100 in the printing system 1000.

FIG. 17 is a diagram illustrating a detailed example of the content of information stored in the processing rule table 3302 (FIG. 12) according to the present embodiment.

The processing rule table 3302 is made up of three fields, 4301 to 4303. These three fields shall be described hereinafter. A function field 4301 stores types of setting items that can be set through the JDF job ticket for functions necessary when executing a job (these types correspond to the processing conditions specified in the job). In FIG. 17, sixteen different types of setting items are registered. The actual number of setting items that can be processed by an actual JDF print job is higher than as shown in FIG. 17, and is not limited to the example in the present embodiment.

An operation specification field for non-support (non-support operation specification field 4302) holds details of the processing to be employed by the controller 205 when executing a JDF print job loaded into the device in the case where the specified function cannot be executed by the printing system 1000. Values corresponding to operation instruction information that instructs an operation to be carried out when the printing apparatus 100 cannot provide the print function necessary to fulfill the specified print conditions are stored in the non-support operation specification field 4302 on a print function-by-print function basis. The field 4302 can take on the following three types of values:

"default value operation": when the function in question cannot be executed, the value set for that function by the job ticket is changed to the default value specified as a default value 4303, and the job is executed.

"ignore": when the function in question cannot be executed, the setting for that function made by the job ticket is viewed as not having occurred, and the job is executed.

"cancel": when the function in question cannot be executed, the execution itself of the job by the job ticket that has made the setting for that function is cancelled.

The values in the non-support operation specification field 4302 corresponding to the functions written in the function field 4301 are assumed, in the present embodiment, to be pre-set in the system. However, the value in the field 4302 may be changeable by the user. In such a case, the user can change the value of the field 4302 by operating the console unit 204.

A default value field 4303 stores default values selected when the value of the non-support operation specification field 4302 is "operate using default value". Therefore, the default value field 4302 is blank (null) when the value of the non-support operation specification field 4302 is anything but "operate using default value". When the printing system 1000 cannot execute the function in question, the controller 205 can execute the operation specified by the default value as a substitute process without canceling the job. For example, according to the processing rule table 3202 shown in FIG. 17, the following control is performed in the case where an execution request has been received for a job specifying double-sided printing but the printing system 1000 is not provided with a double-sided printing function. The controller 205 changes the double-sided print setting in the job that specifies the double-sided printing to a single-sided print setting, which is the default value, in accordance with the processing rule table 3202, and thus single-sided printing is executed when that job is executed.

FIG. 18 is a diagram illustrating the details of a JDF analysis result table generated upon the completion of analysis of the JDF part 3503 of the job ticket shown in FIG. 13, when a JDF print job has been loaded using the job ticket shown in FIG. 13. The JDF print job is loaded, for example, through the external interface unit 202 based on the JDF print program 3108 stored in the HDD 209 and executed by the controller 205. The JDF analysis result table is made up of three fields, 4501 to 4503. These three fields shall be described hereinafter.

A function field 4501 stores setting types per function found as a result of analyzing the JDF job ticket. It can be said that these setting types are the processing conditions of the job specified to be executed with respect to the JDF print job. An analysis result field 4502 stores the results of analyzing the JDF job ticket, in accordance with the type indicated in the function field 4501. An execution field 4503 stores the result of collation of the analysis result per function with the field of that function in the processing rule table 3302 of FIG. 17, the collation being performed by the controller 205. For example, the controller 205 compares the analysis result per function with the values in the operational specification field 4302 of the processing rule table 3302, and then stores the determination of whether or not to continue the execution of the JDF print job as the result for each setting item. The value is stored in the execution field 4503 after the process for analyzing the JDF part has been completed. The analysis results per function are, for example, stored in the analysis result field 4502, and an example of the processing rule table 3302 is illustrated in FIG. 17. The execution field 4503 can take on the three types of values indicated below.

"OK": indicates that the job can be continued based on the result of comparing the result of analyzing the JDF part for a certain function with the non-support operation specification field 4302 of the processing rule table 3302 shown in FIG. 17 for the same function. The controller 205 recognizes the function set for the job and refers to the function field 4301 in the processing rule table 3302 that corresponds to the recognized function. In the case where "operate using default value" or "ignore" is set as the value in the non-support operation specification field 4302 set for that function in the processing rule table 3202, the controller 205 sets the execution field 4503 to "OK" for that function. The controller 205 also sets the execution field 4503 to "OK" for the function in the case where that function is supported by the printing system 1000.

"NG": indicates that continuation is not possible and that it is necessary to cancel the job based on the result of comparing the result of analyzing the JDF part for a certain function with the non-support operation specification field 4302 of the processing rule table 3302 for the same function. The controller 205 recognizes the function set for the job and refers to the function field 4301 in the processing rule table 3302 that corresponds to the recognized function. In the case where "cancel job" is set as the value in the non-support operation specification field 4302 for that function in the processing rule table 3202, the controller 205 sets the execution field to "NG" for that function.

"N/A": indicates that there is no effect on the determination of whether or not to continue the job, such as in the case where no settings are originally made for the function or the case where the printing system 1000 does not originally support that function.

Descriptions shall now be given using an example in which the results of the job analysis are as shown in FIG. 18. The example shown in FIG. 18 illustrates the content of a JDF analysis result table generated upon analyzing the JDF job ticket illustrated in FIG. 14, when the device configuration table in the printing system 1000 is in the state shown in FIG. 16. With the job ticket in FIG. 14, a middle-fold binding process is instructed to be performed by the saddle stitching apparatus, but according to the device configuration table shown in FIG. 16, a finisher capable of executing the middle-fold binding process is not attached. Here, the non-support operation specification field 4302 for the saddle stitching function in the processing rule table 3302 is referred to in FIG. 17. In this case, the operation specified is "cancel job", and thus the value of the execution field for the saddle stitching function in FIG. 18 is "NG". In other words, the JDF print job including the JDF job ticket shown as an example in FIG. 14 is cancelled rather than being executed in the case where the configuration and status of the printing system 1000 is as shown in FIG. 16.

(Basic Processing)

Next, operations performed by the printing system 1000 according to the present embodiment based on the control of the controller 205 shall be described.

Figure 19:
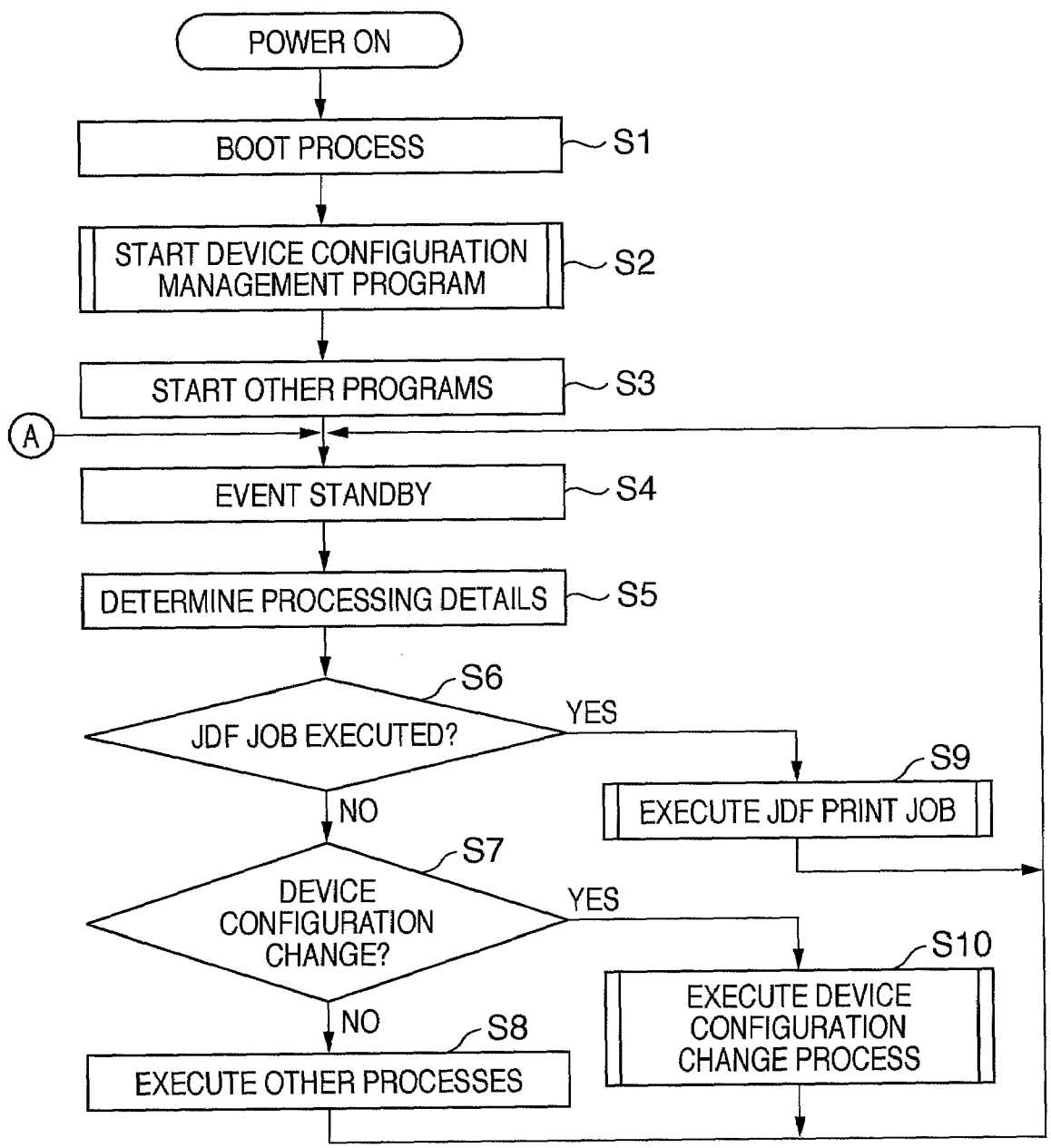
FIG. 19 is a flowchart illustrating processes for overall control of a device serving as a multi-function peripheral, performed after system start-up by a controller of a printing apparatus according to the embodiment of the present invention.

FIG. 19 is a flowchart illustrating processes for overall control of a device serving as a multi-function peripheral, performed after system start-up by the controller 205 of the printing apparatus according to the present embodiment. Note that the programs that execute these processes are stored in the ROM 207 and are executed under the control of the controller 205.

This processing is commenced when the electric power is turned on, and first, in step S1, a boot process is performed. To be more specific, the boot loader 3101 illustrated in FIG. 11 is read out from the ROM 207 by the controller 205, and the read-out program is then executed. The processing carried out in step S1 includes all initialization processes, such as issuing initialization commands to the devices connected to the printing system, the system resources, and so on, as well as cleaning and the like carried out immediately following startup of the devices. A process in which the operating system 3102 (FIG. 11) is read out from the HDD 209 by the controller 205 and the services of the operating system are started is also included in the processing carried out by the boot loader 3101.

The procedure advances to step S2 when the boot process is complete, whereupon the controller 205 reads out and executes the device management program 3104 stored in the ROM 207. Here, using the device management program 3104, the controller 205 surveys the connection states of the devices and creates the device configuration table (FIG. 16) in the RAM 208. Details of the operations performed in this step shall be described later using FIG. 20 and so on.

The procedure then advances to step S3, where the controller 205 reads out and executes the other programs mentioned above from the ROM 207. The programs to be loaded in step S3 are all the programs stored in the ROM 207 shown in FIG. 11 with the exception of the programs already loaded in the abovementioned steps; the details thereof shall be omitted here. Once step S3 has been executed, the printing system 1000 is prepared to function as a multi-function peripheral, and thus shifts to an event standby state in step S4. The "events" indicated here include, for example, the following.

events occurring due to job execution instructions or setting changes made by the user operating the console unit 204.

events occurring due to a print job loaded into the printing system 1000 via the external interface unit 202 from a device external to the printing system 1000.

events occurring due to a JDF print job being received and an execution request for the received job.

requests for processing aside from a job being loaded into the printing system 1000 from a device external to the printing system 1000. An example of this is an event occurring due to a status acquisition from a device, various setting information and management information stored in a device being changed, and so on.

events occurring within the printing system 1000. To be more specific, this includes all events that cause the printing system 1000 to move out of an idle state, such as paper running out, a device status change, and so on.

In step S4, the controller 205 does not advance the procedure to step S5 unless an event has occurred.

When an event has occurred in the printing system 1000 in step S4 and the controller 205 has been notified of that event, the procedure advances to the processing from step S5 and on. Then, the event that has occurred is identified, and the process corresponding to the event that has occurred is executed. For this reason, first, in step S5, the controller 205 determines the type of event that occurred in step S4.

The procedure then advances to step S6, where it is determined, based on the results of the determination of the event in step 5, whether or not the event that occurred is a JDF job execution request. The JDF job execution request is an event issued to the controller 205 upon it being determined that JDF job data has been received by the external interface unit 202 from an external device. If, as a result of the determination in step S6, it is determined that the event that occurred is a JDF job execution request, the procedure advances to step S9. In step S9, the controller 205 executes the print processing of the JDF print job loaded into the printing system 1000 via the external interface unit 202 from a device external to the printing system 1000. Details of the processing performed in step S9 shall be described later with reference to FIG. 21.

However, if it has been determined in step S6 that the event that occurred is not a JDF job execution request, the procedure moves to step S7, where the controller 205 determines whether or not the event that has occurred is due to a change in the device configuration. Here, if it has been determined that the event that has occurred is due to a change in the device configuration, the procedure advances to step S10, and a process for changing the device configuration is executed. Details of the process for changing the device configuration shall be described later with reference to FIG. 23 and so on.

However, if it has been determined, as a result of the determination in step S7, that the event is neither a JDF job execution request nor a process for changing the device configuration, the procedure proceeds to step S8, where a process corresponding to the event that has occurred, or in other words, a process aside from the JDF job execution and the process for changing the device configuration, is executed. Various processes can be considered for the process that is executed here, but the types of individual operations, details on the operations, and so on are not important to the descriptions of the present embodiment. These processes shall therefore be consolidated into a single step. However, it should be made clear that step S8 includes the execution of multiple processes as described above.

In this manner, the procedure returns to step S4 when the controller 205 has finished the processes in steps S8, S9, and S10, and thus the controller 205 once again enters a state of standing by for the next event process.

(Device Configuration Management)

Figure 20:
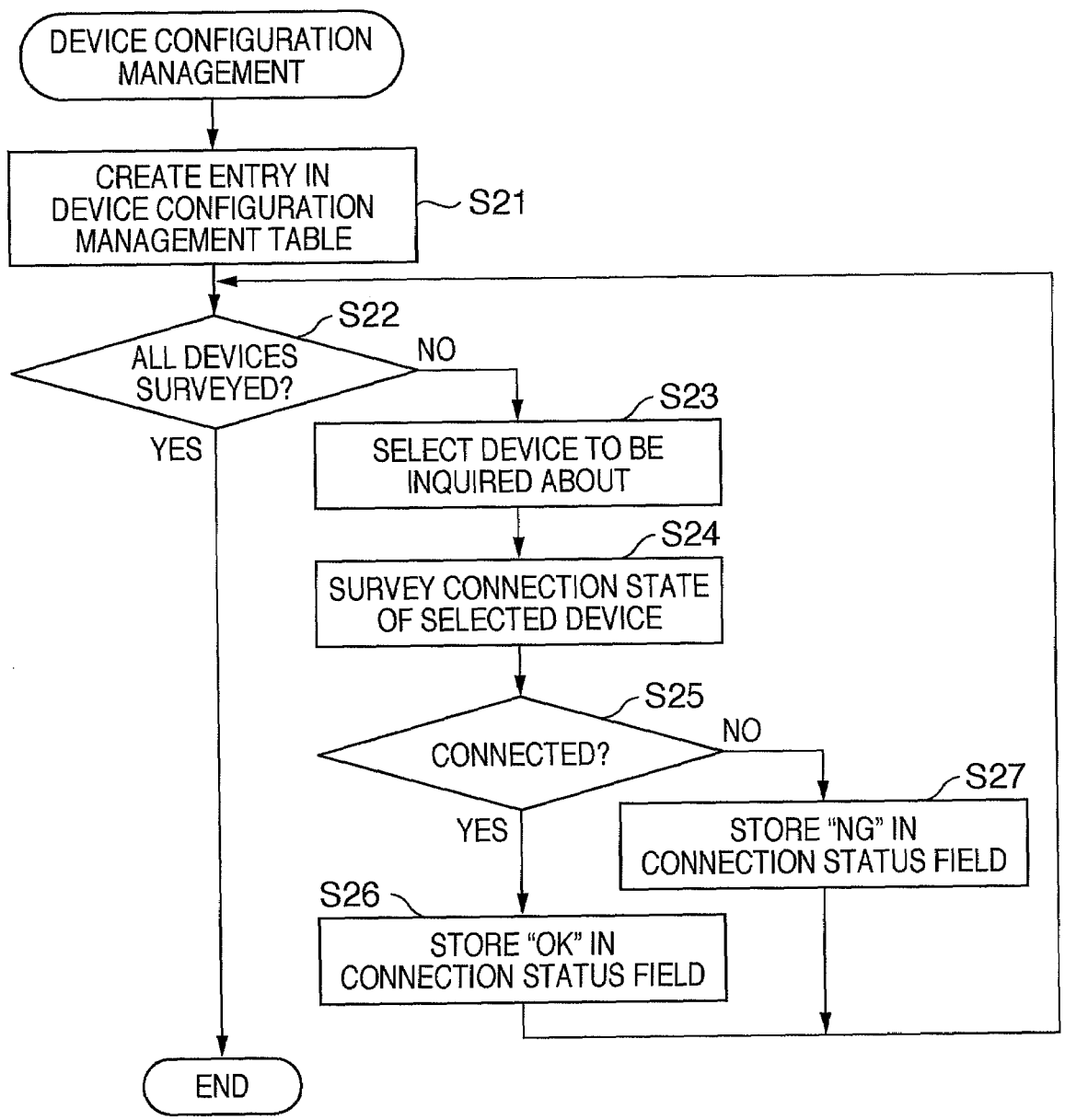
FIG. 20 is a flowchart illustrating detailed operations of a device configuration management program in step S2, executed by a controller of a printing apparatus according to the embodiment of the present invention.

FIG. 20 is a flowchart illustrating detailed operations of a device configuration management program in step S2 (FIG. 19), executed by the controller 205 of the printing apparatus 100 according to the present embodiment.

First, in step S21, an entry for the device configuration table is created in the RAM 208. This device configuration table has been described earlier with reference to FIG. 16, and thus descriptions shall be omitted here. With the device configuration table created here, data is stored only in the device name field 4101 and the device type field 4102, while the connection status field 4103 remains empty. The value of the connection status field 4103 is determined through the following processing. In step S22, it is determined whether surveying has been completed for all devices registered in the device name field 4101 present in the device configuration table. If, as a result of the determination in step S22, there are still devices that are to be surveyed, the procedure advances to step S23, and selects the device to inquire about. The order in which the devices are selected at this time is the order in the device name field 4101 of the device configuration table created in step S21.

The procedure then advances to step S24, where it is determined whether or not the device selected in step S23 is connected to the printing system 1000. The determination process executed at this time is carried out, via an interface unit that electrically connects the devices to one another, according to a specific protocol. In step S24, the connection is checked by, for example, returning a status to the controller 205 if the device inquired about is present. However, if a response to an outputted inquiry is not returned within a set period of time and times out, the device inquired about is considered to be in an unconnected state. The procedure then advances to step S25, where the results of the inquiry made in step S24 are determined. If it has been determined that the device that has been inquired about is connected, the procedure advances to step S26, where the status of the connection status field 4103 for that device is updated to "OK" in the device configuration table. However, if it is determined, as a result of the determination in step S25, that the device that has been inquired about is not connected, the procedure advances to step S27, where the status of the connection status field 4103 for that device is updated to "NG" in the device configuration table.

When the processing in step S26 or S7 is completed, the procedure once again returns to step S22, and the next device is surveyed. Step S22 to step S26 and step S27 is configured as a loop, and these steps are repeatedly executed until all devices written in the device name field 4101 stored in the device configuration table have been surveyed. Then, if it has been determined, as a result of the determination made in step S22, that the connection states of all the devices have been surveyed, the processing flow ends.

(JDF Print Job Printing Process)

FIG. 21 is a flowchart illustrating details of step S9 in FIG. 19, or in other words, of a process executed by the controller 205 when performing a print process for a JDF print job loaded into the printing system 1000.

First, in step S31, the MIME format of the data that makes up the JDF print job is analyzed. To be more specific, the content included within the received MIME data is extracted based on the information in the MIME header 3501, and the extracted content data is stored in the HDD 209. The content extracted from the MIME data here is of three types, or JMF, JDF, and PDL content to be printed, and more than one piece of PDL content is allowed to be present.

Next, the procedure advances to step S32, where an analysis process is performed on a JMF part 3502 extracted from the MIME data in step S31 and stored in the HDD 209. The JMF itself fulfills important operations in the control of a JDF workflow system, mainly including managing communication, statuses, and so on, but this is not important in describing the effects of the present embodiment and thus detailed descriptions shall be omitted.

When the analysis process of the JMF part 3502 in step S32 is completed, the procedure advances to step S33, where an analysis process is performed on a JDF part 3503 extracted from the MIME data in step S31 and stored in the HDD 209. Details of the processing performed in step S33 shall be described later with reference to FIG. 22. It is therefore determined whether or not the received job can be executed, based on the setting information, device capabilities and status stored in the job ticket found through the JDF analysis process performed in step S33.

Next, the procedure advances to step S34, where it is determined whether or not the received job can be executed, based on the setting information, device capabilities and status stored in the job ticket as determined in step S33, and the following processing is set. In other words, if it has been determined in step S34 that the received job can be executed, the procedure advances to step S35. However, if it has been determined in step S34 that the received job cannot be executed, the procedure advances to step S37. In step S35, an analysis process is performed on PDL content to be printed that was extracted from the MIME data in step S31. To be more specific, PDL command analysis and a conversion process for image data are executed in accordance with setting information written in the JDF analyzed in step S33. This is ultimately converted into a printable raster image and stored in the HDD 209. Details of the PDL data analysis process are not an essential part of the present embodiment and thus descriptions thereof shall be omitted.

The procedure then advances to step S36, where the image data developed in step S35 and stored in the HDD 209 is printed in accordance with the setting information written in the JDF analyzed in step S33. In other words, the printing process is carried out based on the JDF analysis result table shown in FIG. 18. Therefore, as a result of the analysis, the printing system 1000 implements the printing functions necessary to fulfill the printing conditions specified in the JDF that can be provided as specified. For the functions that cannot be implemented as specified, operations based on the non-support operation specification field 4302 (FIG. 17) are executed. For this reason, with the configuration according to the present embodiment, the appropriate printing processes can be executed, within the scope of the functions that can be provided by the printing system 1000. When the processing in step S36 is completed, the procedure returns to step S4 in FIG. 19.

Meanwhile, if it is determined, as a result of the determination in step S34, that the received job cannot be executed, the execution of that job is cancelled in step S37. When the processing in step S37 ends, the procedure returns to step S4 (FIG. 19).

(JDF Part Analysis Process)

Figure 22:
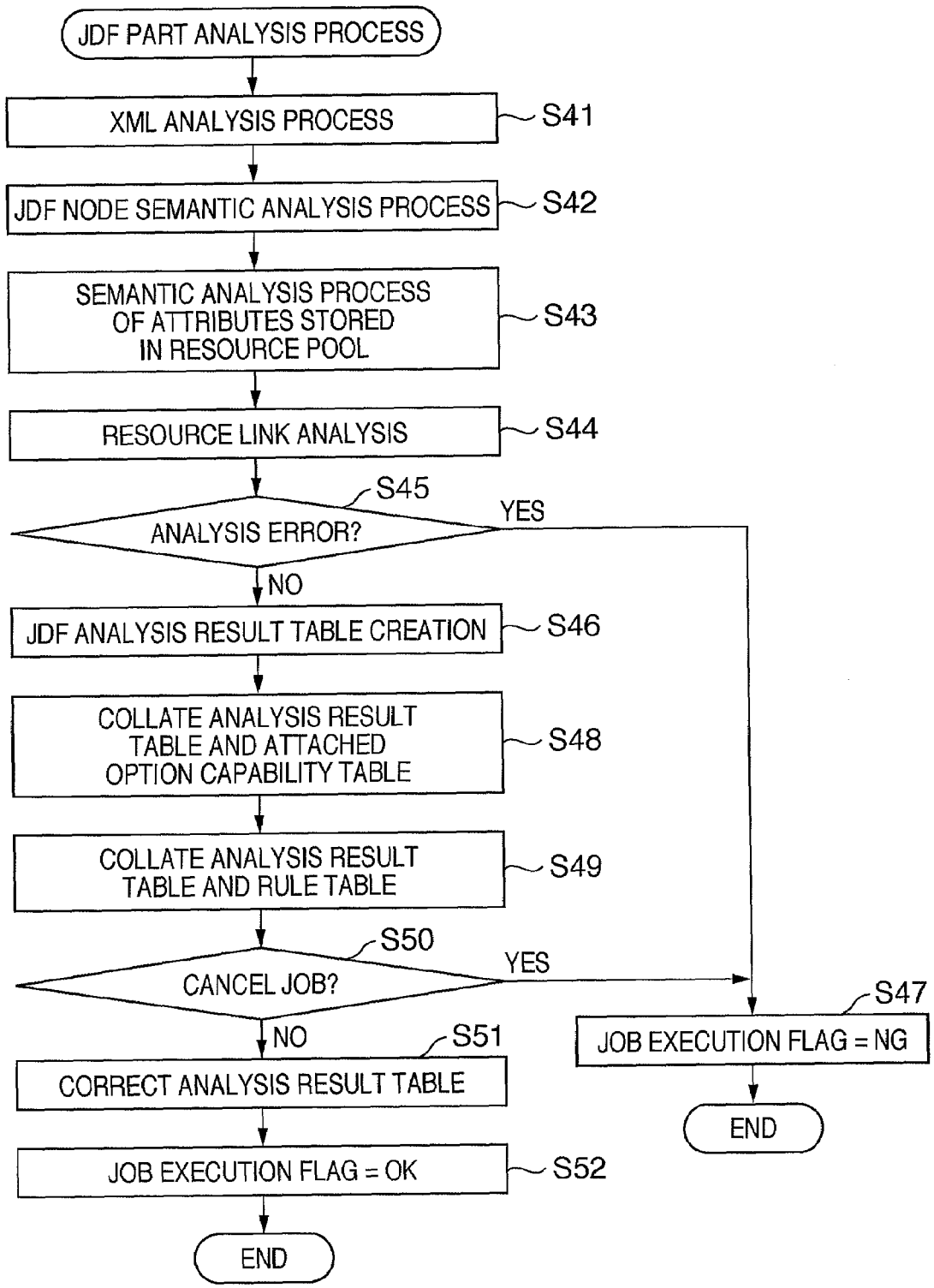
FIG. 22 is a flowchart illustrating details of a JDF part analysis process of step S33 in FIG. 21.

FIG. 22 is a flowchart illustrating details of a JDF part analysis process of step S33 in FIG. 21.

First, in step S41, an XML syntax analysis process is performed, and the elements and attribute information written in the JDF is incorporated into the internal data structure. Then, from step S42 on, a semantic analysis process is executed based on the information obtained from the results of the analysis performed in step S41. In step S42, the semantic analysis process is performed on a JDF node portion, which is the root node of the JDF. In addition to information necessary for job management, information regarding definitions or the like of processes to be processed by this JDF is stored in the JDF node. The procedure then advances to step S43, where the semantic analysis process is executed for the information in a resource table in the JDF, the resource table being the storage location of setting parameters used when a job is executed. Various setting information that is to be applied during image processing processes such as the actual PDL developing process, imposition, and so on, as well as printing processes, finishing processes, and the like, is stored in this resource table.

The procedure then advances to step S44, where it is checked whether link information for the JDF processes and resources is expressed as appropriate and whether or not contradictory link settings have been made. The steps S41 to S44 correspond to syntax analysis and a semantic analysis process for the JDF part. When the processing in step S44 ends, the procedure advances to step S45, where it is determined whether or not an analysis error has occurred during the processing from steps S41 to S44 described above. Here, if it is determined that an analysis error has occurred, the job cannot be executed, and thus the procedure advances to step S47, where a job execution flag is set to "NG". Note that this job execution flag is stored in a special area secured in the RAM 208 by the controller 205 when the controller 205 executes the programs that implement the processes denoted in this flowchart.

Meanwhile, if it is determined in step S45 that an analysis error has not occurred, the procedure advances to step S46, where the JDF analysis result table is created. Details of the JDF analysis result table have been given with reference to FIG. 18 and thus the descriptions thereof shall be omitted here. When the processing in step S46 is completed, the procedure moves to step S48, where the analysis result table created in step S46 is collated with the information in the device capability table (FIG. 15). The functions written in the device capability table that cannot be executed with the present configuration of the printing system 1000 under the settings of the job as stored in the analysis result table are then extracted.

The procedure then advances to step S49, where each function that cannot be executed with the present configuration of the printing system 1000, as extracted in step S48, is collated with the fields for those functions in the processing rule table 3302 shown in FIG. 17. The operational specifications are thus surveyed for each unexecutable setting item. The procedure then advances to step S50, where the processing rule table 3302 (FIG. 17) corresponding to the functions extracted in step S48 is referred to based on the results of the survey carried out in step S49. Here, it is determined whether or not the values in the non-support operation specification field 4302 for those functions are "cancel job". In the case where it has been determined both that job settings that cannot be executed due to the device configuration or capabilities are present and that at least a single function is present that would cause the job to be cancelled if the function was set, the procedure advances from step S50 to step S47. The job is cancelled in step S47.

However, in the case where the results of the determination in step S50 are false, the job does not need to be cancelled due to the job settings even if settings that cannot be executed due to the device configuration or capabilities are present. In other words, this corresponds to a case where the default value is selected in accordance with the details in the processing rule table 3302, but the settings themselves are ignored, making it possible to continue the execution of the job. In this case, the procedure advances to step S51, where the details in the JDF analysis result table (FIG. 18) are corrected in accordance with the details in the processing rule table 3302; the procedure then advances to step S52, where the job execution flag is set to "OK".

(Device Configuration Change Process)

Figure 23:
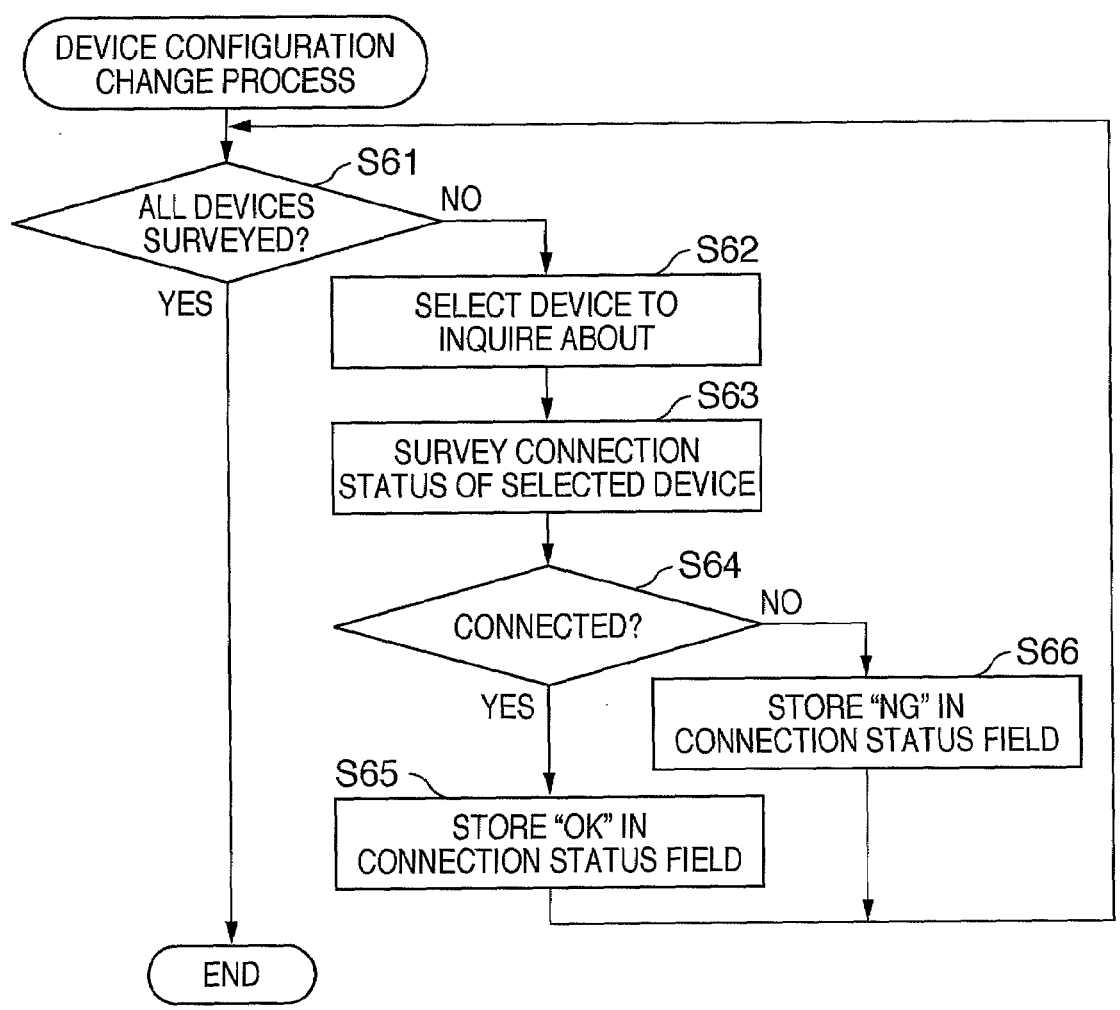
FIG. 23 is a flowchart illustrating details of a device configuration table correction process, performed in step S10 of FIG. 19, in the case where a device configuration has been changed after startup of the printing system.

FIG. 23 is a flowchart illustrating details of a device configuration table (FIG. 16) correction process, performed in step S10 of FIG. 19, in the case where a device configuration has been changed after startup of the printing system 1000.

If, as a result of the determination in step S61, there are still devices that are to be surveyed, the procedure advances to step S62, and selects the device to inquire about. At this time, the devices are selected in the order they appear in the device name field 4101 stored in the device configuration table of FIG. 16. The procedure then advances to step S63, where it is determined whether or not the device selected in step S62 is connected to the printing system 1000. In the determination process executed at this time, the connection states are checked, via the interface unit that electrically connects the devices to one another, according to a specific protocol; however, detailed descriptions thereof shall be omitted. When a device to be inquired about is present, the connection is checked by returning the status of the device to the controller 205. However, if a response to an outputted inquiry is not returned within a set period of time and times out, the device inquired about is considered to be in an unconnected state. In step S64, if it has been determined, based on the results of the inquiry made in step S63, that the device inquired about is connected, the procedure advances to step S65, where the status of the connection status field 4103 for that device is updated to "OK" in the device configuration table (FIG. 16). However, if it is determined in step S64 that the device that has been inquired about is not connected, the procedure advances to step S66, where the status of the connection status field 4103 for that device is updated to "NG" in the device configuration table.

When the processing in step S65 or S66 is completed, the procedure once again returns to step S61, and the next device is surveyed. Step S61 to step S65 and step S66 are configured as a loop, and these steps are repeatedly executed until all devices written in the device name field 4101 stored in the device configuration table have been surveyed. Then, if it has been determined in step S61 that that the connection states of all the devices have been surveyed, the processing flow ends.

According to the configuration of the present embodiment, an easily usable, convenient printing environment can be created that is applicable not only to an office environment but also to a POD environment, for example. Furthermore, actual on-the-job issues arising in printing environments such as the POD environment, such as, for example, the need to operate a system with high productivity, the need to lighten the operational burden on the operator, and so on can be addressed. In particular, the present embodiment has the following effects.

In recent years, situations are being considered in which instructions for the overall printing process performed by printing apparatuses designed for the POD market are made through print data that includes a JDF job ticket, which continues to advance in terms of compatibility. Rather than just for a single device, this case can also be applied to a situation in which instructions are written for a serial operational process that links multiple devices, from the loading process to the delivery process of the printed materials that are the final product. In other words, it is possible to manage a serial workflow composed of multiple steps and that uses multiple devices with a single set of instructions. This provides advantages in terms of linking multiple devices involved in the overall printing process to each other, and in terms of the automation of various devices.

This is effective when creating a printing system capable of processing jobs in many different devices using a common format independent of individual devices. For example, in the case where a digital multi-function peripheral supports JDF, a situation where a JDF job ticket created without knowledge of the device specifications, configuration information, and so on is received and a print process is executed can be considered, unlike when using a conventional printer driver. For example, a case where the user uses a job ticket to instruct job processing can be considered. There are cases where the printing apparatus (printing system) cannot completely execute the instructed processes due to the operating environment (due to the capabilities of the printing apparatus, attached accessories, and so on), even if the user has instructed the printing apparatus (printing system) to process the job using a job ticket. In this case, there are situations where the user desires to cancel the job processing itself. Alternatively, there are situations where the user desires the printed materials to be outputted by the printing apparatus (printing system) even if the some of the settings cannot be applied. However, JDF data is generic, and not only is JDF promising from the standpoint of device automation, device linking, device management, and so on, but it is also not data prepared only for a single device or a specific type of device. For this reason, conventional systems have had a problem that the output results desired by the user as described thus far could not be determined based on the devices themselves.

As opposed to this, the printing system according to the present embodiment analyzes JDF data created using the XML language and that is included in the inputted job, and determines whether or not a print process that fulfills the conditions indicated therein can be executed. If it has been determined that the process can be executed, the print process is carried out based on the instructions made with respect to the inputted job. However, if it has been determined that the process cannot be executed, the print process based on the instructions made with respect to that job is cancelled. For this reason, with the configuration according to the present embodiment, the printing system 1000 can control the processing as appropriate regardless of whether or not the print process can be executed based on the JDF data included in the inputted job. Therefore, the configuration of the present embodiment can provide a technique that makes it possible to perform an appropriate print process while eliminating unnecessary work for the user in a printing system that operates based on printing jobs in which conditions are written in a generic format.

In this manner, it is possible to provide a printing system capable of flexibly addressing a variety of user needs. It is therefore possible to create a convenient and flexible printing environment capable of addressing usage situations and needs that may arise in a POD environment, and possible to provide a variety of schemes with the purpose of actual implementation as a product.

Note that in the above configuration, the controller 205 does not cancel the job in the case where "cancel job" is not specified for all print functions that are necessary to fulfill the printing conditions indicated in the JDF included in the print job and that are not supported. Instead, the controller 205 executes the process with a substitute function in the case where the process can be carried out with the substitute function. When the process is to be executed using a substitute function, log information (a log file) indicating the results of the print process is stored in a predetermined storage device (an HDD, a PAM, or the like). The log information can then be displayed in a display unit in accordance with instructions from the user. According to such a configuration, the user can understand what kind of print process was actually carried out when the print process was carried out using a different printing function than that set in the print job.

Furthermore, in the case where the determination as to whether or not the job can be executed has resulted in the determination that the job cannot be executed, the printing conditions that cannot be executed may be displayed in a display unit, and those printing conditions may be changed in accordance with instructions from the user, and the print process executed. According to such a configuration, the user can change the printing conditions in accordance with the functions that the printing system can provide, and execute the print process.

Furthermore, in the case where it has been determined that the print process cannot be executed and the process for canceling the job is executed, the print job may be stored in a storage device (a job storage unit) such as an HDD. Through this, the print job can be read out from the storage device at a later time and the print process executed once again.

Finally, control may be performed so that the printing conditions of the cancelled print job stored in the storage device are displayed in the display unit, and the printing conditions may be changed in accordance with instructions from the user (a printing condition change), after which the print process is executed based on the changed print job. Through this, it is possible to read out a stored print job, change the printing conditions as appropriate, and execute the appropriate print process, in accordance with instructions from the user.

<Second Embodiment>

In the second embodiment, detailed descriptions shall be given regarding a configuration in which the user can change the details of the processing rule table 3302 (FIG. 17). The system configuration according to the second embodiment is almost identical to the configuration according to the above-described first embodiment, and thus identical elements shall be referred to with identical numerals, and the descriptions hereinafter shall focus on the differences.

Figure 24:
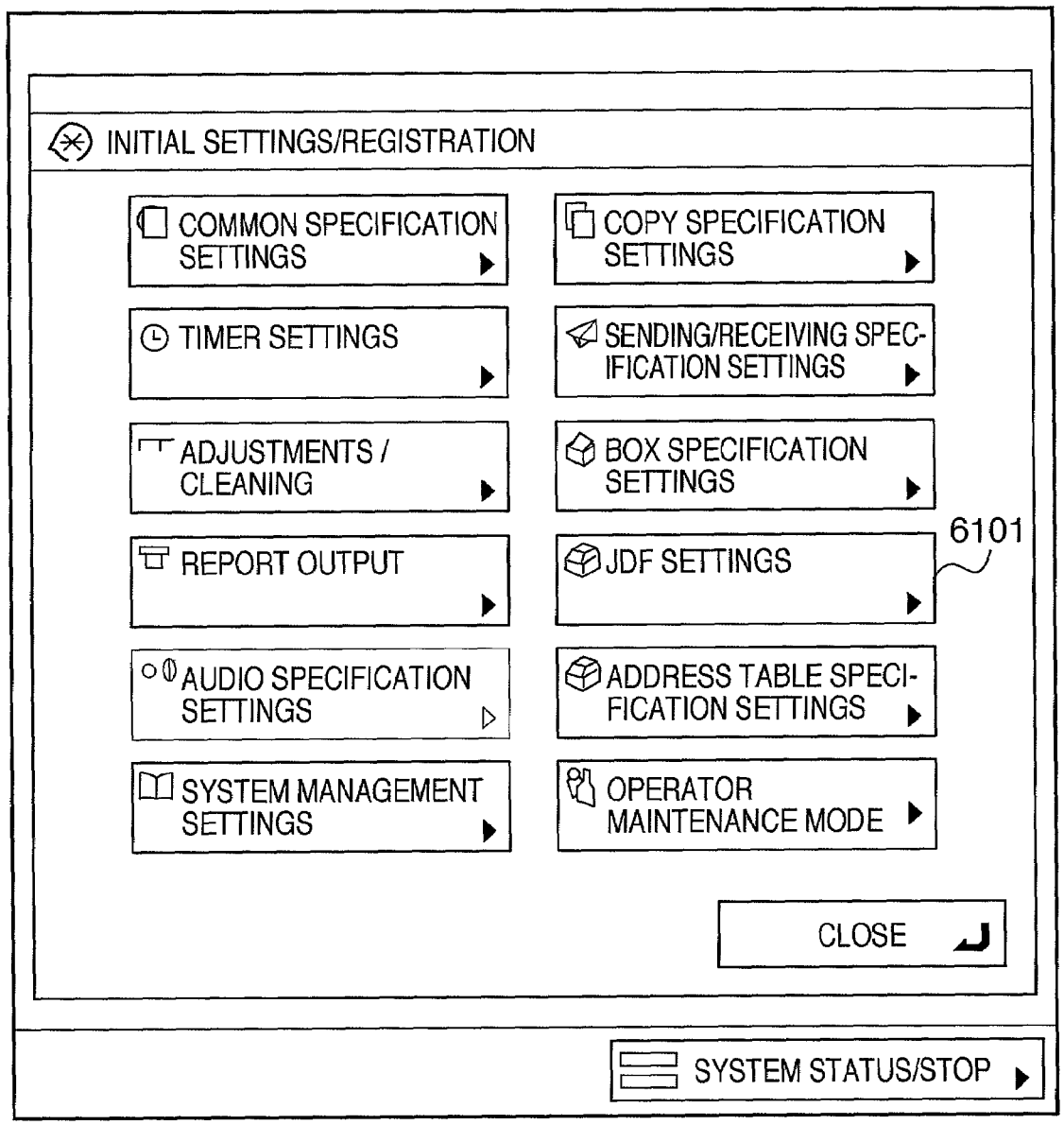
FIG. 24 is a diagram illustrating an example of a system setting screen displayed in a touch panel unit immediately after a user mode key in a console unit of a printing apparatus according to a second embodiment has been depressed.

FIG. 24 is a diagram illustrating an example of a system setting screen displayed in the touch panel unit 401 immediately after the user mode key 505 (FIG. 7) in the console unit 204 of the printing apparatus 100 in the printing system 1000 according to the second embodiment has been depressed. As shown in FIG. 24, buttons corresponding to various system setting functions are displayed in the touch panel unit 401. Here, among multiple system setting function buttons, the role of a JDF setting button 6101 shall be described. The JDF setting button 6101 is used to display an operational screen for performing settings regarding the operation of a JDF print job provided by the printing system 1000. An example of a JDF setting screen displayed in the touch panel unit 401 immediately after this JDF setting button 6101 is touched is illustrated in FIG. 25.

The JDF setting screen in the printing system 1000 according to the second embodiment provides a function that allows the user to select operations in the case where the setting items described in the JDF job ticket cannot be executed due to the device configuration, capabilities, and the like of the printing system 1000. The following two types of modes can be selected by the user in this screen:

a mode, corresponding to a cancel button 6301, that cancels the job in the case where the setting items described in the JDF job ticket cannot be executed due to the device configuration, capabilities, and the like of the printing system 1000; and a mode, corresponding to an ignore button 6302, that ignores the details of the setting items and continues the execution of the job in the case where the setting items described in the JDF job ticket cannot be executed due to the device configuration, capabilities, and the like of the printing system 1000.

Figure 25:
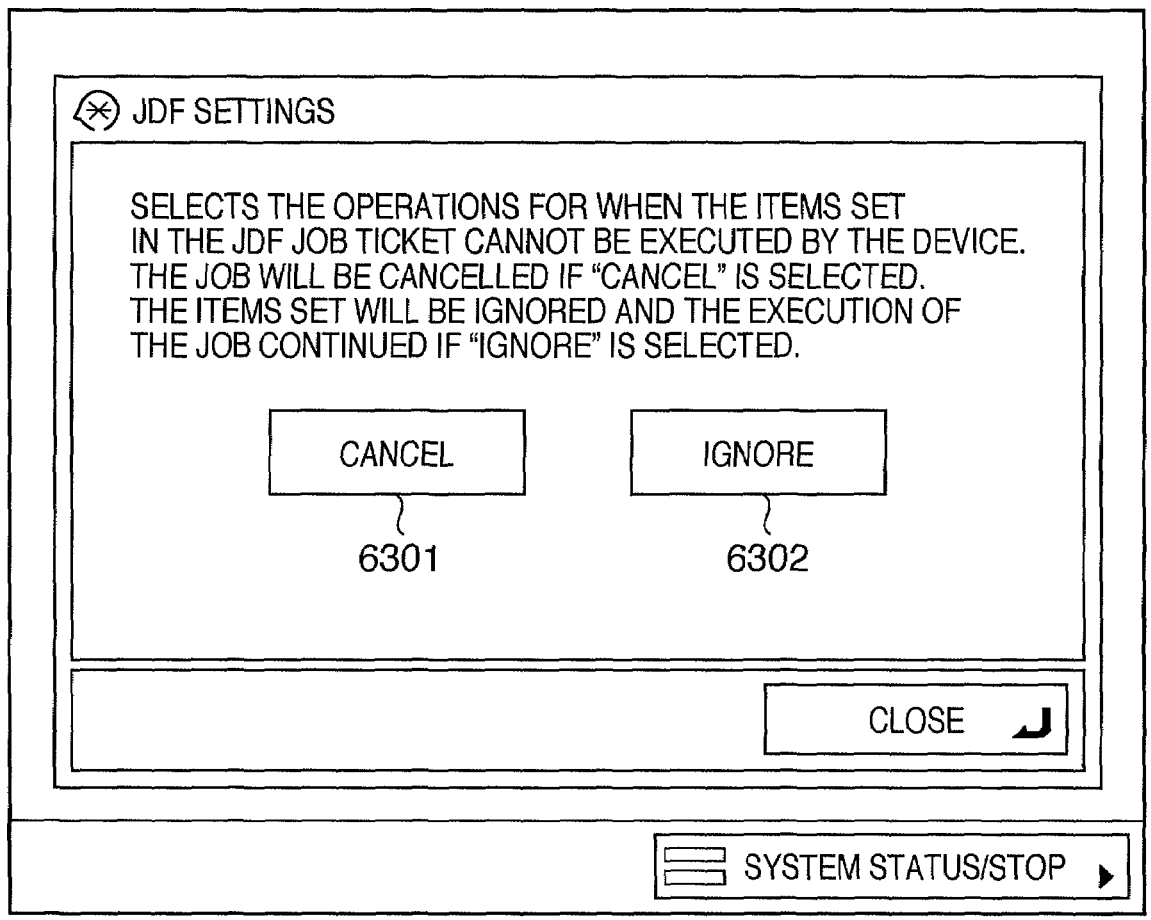
FIG. 25 is a diagram illustrating an example of a JDF setting screen displayed in a touch panel unit.

With the JDF setting screen in FIG. 25, the ignore button 6302 is in a selected state, which changes to a state where the cancel button 6301 is in a selected state by pressing the cancel button 6301. This is performed through the control of the controller 205 of the printing system 1000.

FIG. 26 is a diagram illustrating an example of information stored in the processing rule table 3302 (FIG. 17) corrected through control performed by the controller 205 after the ignore button 6302 has been selected in the JDF setting screen illustrated in FIG. 25.

In FIG. 26, the value of the non-support operation specification field 4302 is changed to "ignore" as an action for the case where the function written in the function field 4301 cannot be executed due to the device configuration, capabilities, and so on of the printing system 1000. When a JDF print job is loaded with instructions for functions that cannot be executed contained in the JDF job ticket portion of the job in the case where the information in the processing rule table 3302 is as shown in FIG. 26, the settings shown in FIG. 26 are ignored and the execution of the job is continued. This is because a process for continuing or canceling the job is performed in accordance with the details written in the processing rule table 3302, as with the first embodiment.

A specific example shall be given. For example, a case can be considered where a JDF job ticket that includes settings for saddle stitching, case binding, or the like is received in a state in which a sheet processing apparatus 200 is not attached to the printing system 1000. In such a case, the settings regarding the sheet processes that cannot be executed are ignored, and the printed materials are generated without those settings being applied. For example, a case is considered in which the saddle stitching apparatus 110, the paper folding apparatus 107, and the like are present in a workflow for the user involving the printing system 1000, as shown in FIG. 1. In this case, the printed materials produced by the printing system 1000 can be processed by causing the printed materials to be set in the saddle stitching apparatus 110 and paper folding apparatus 107, by going through the operator. Accordingly, the final outputted materials can meet the purposes of the user, who is trying to obtain outputted materials that have undergone saddle stitching, case binding, and so on.

FIG. 27 is a diagram illustrating an example of information stored in the processing rule table 3302 (FIG. 17) corrected through control performed by the controller 205 after the cancel button 6301 has been selected in the JDF setting screen illustrated in FIG. 25.

In FIG. 27, the value of the non-support operation specification field 4302 is "cancel job" as an action for the case where the function written in the function field 4301 cannot be executed due to the device configuration, capabilities, and so on of the printing system 1000. For example, a case can be considered where a JDF print job is loaded into the printing system 1000 with instructions for functions that cannot be executed contained in the JDF job ticket portion of the JDF print job when the information stored in the processing rule table 3302 is as shown in FIG. 27. In this case, an operational process for continuing or canceling the job is performed in accordance with the details written in the processing rule table 3302, as with the first embodiment. For this reason, the execution of the job is cancelled when the corresponding settings are present, as written in FIG. 27.

As a specific example, a case can be considered where a JDF job ticket that includes settings for saddle stitching, case binding, or the like is received in a state in which the sheet processing apparatus 200 is not attached to the printing system 1000. In such a case, when settings for a sheet process that cannot be executed are present, the job is cancelled so that the outputted materials are not generated. To be more specific, for example, a case is considered in which the saddle stitching apparatus 110, the paper folding apparatus 107, and the like are not present in a workflow for the user of the printing system 1000, and moreover, a sheet processing apparatus 200 is not provided in the printing system 1000. In this case, if a job that instructs saddle stitching, case binding, and the like for final outputted materials is received, and those settings are ignored and the execution of the job continued, the generated outputted materials will be wrong for the user. Accordingly, it is possible to suppress such output by canceling the job.

(Basic Processing)

Figure 28:
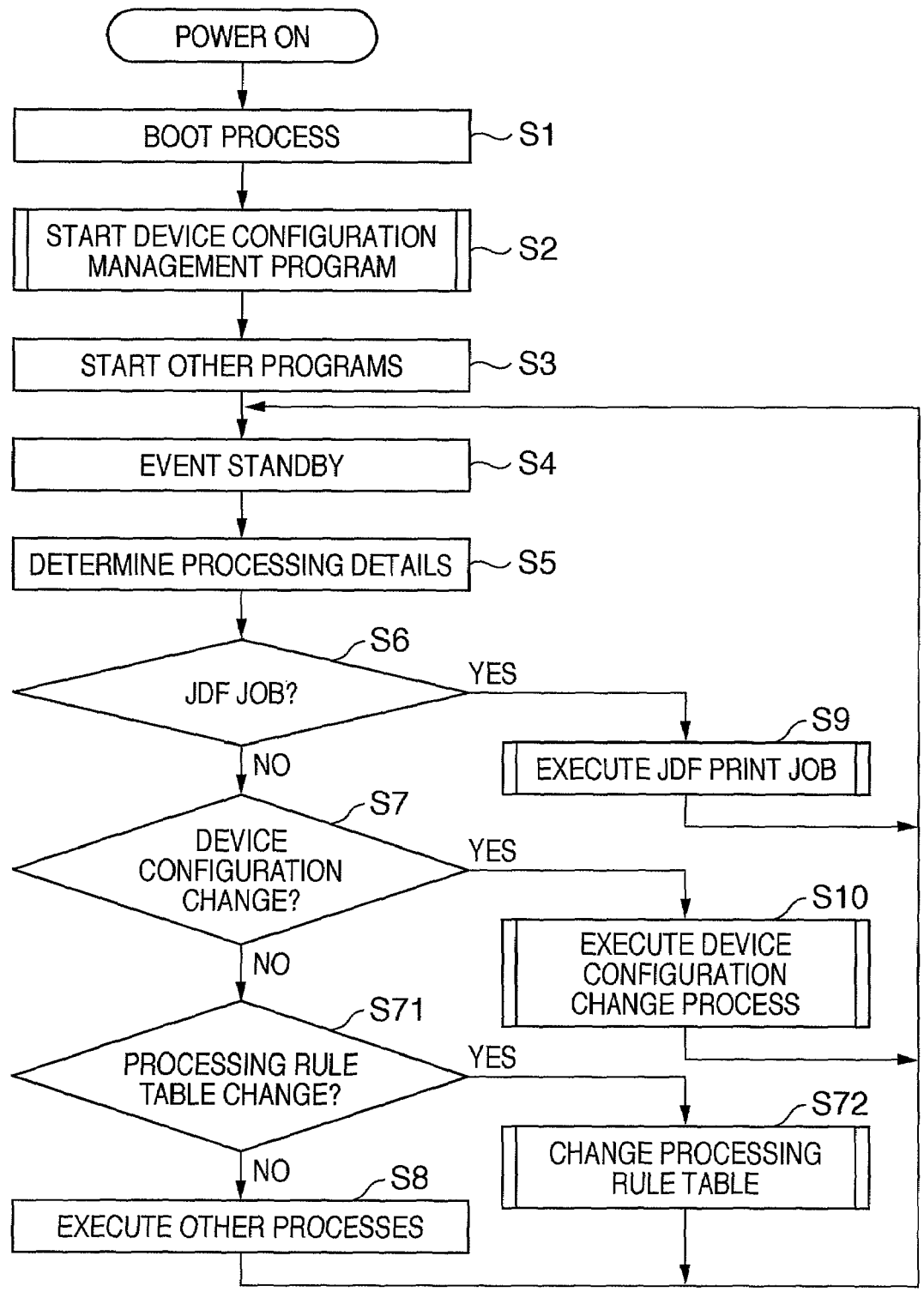
FIG. 28 is a flowchart illustrating processing performed by a controller of the printing system according to the second embodiment.

FIG. 28 is a flowchart illustrating processing performed by the controller 205 of the printing system 1000 according to the second embodiment. This flowchart corresponds to the flowchart shown in FIG. 19 and described in the aforementioned first embodiment. Here, steps that are identical to those in FIG. 19 shall be given the same numerals and descriptions thereof shall be omitted.

Here, if the device configuration has not been changed in step S7, the procedure advances to step S71, where it is determined whether or not the details of the processing request (event) that occurred in step S4 is a change request for the processing rule table 3302. In this second embodiment, the change request for the processing rule table 3302 corresponds to an operation in which the user selects, through the JDF setting screen shown in FIG. 25, the operation to be carried out when the function written in the function field 4301 cannot be executed due to the device configuration, capabilities, and so on of the printing system 1000.

If the change request for the processing rule table 3302 has been determined in step S71, the procedure advances to step S72, where the change process for the processing rule table is executed. When that process is completed, the system enters the event standby state is in step S4. Details of the processing performed in step S72 shall be described later with reference to FIG. 29.

However, if the result of the determination in step S71 is false, the procedure advances to step S8, where a process aside from the JDF job execution, the processing rule table 3302 change, or the process for changing the device configuration, is executed in accordance with the type of event that has occurred.

(Processing Rule Table 3302 Change (Rule Information Update) Process)

Figure 29:
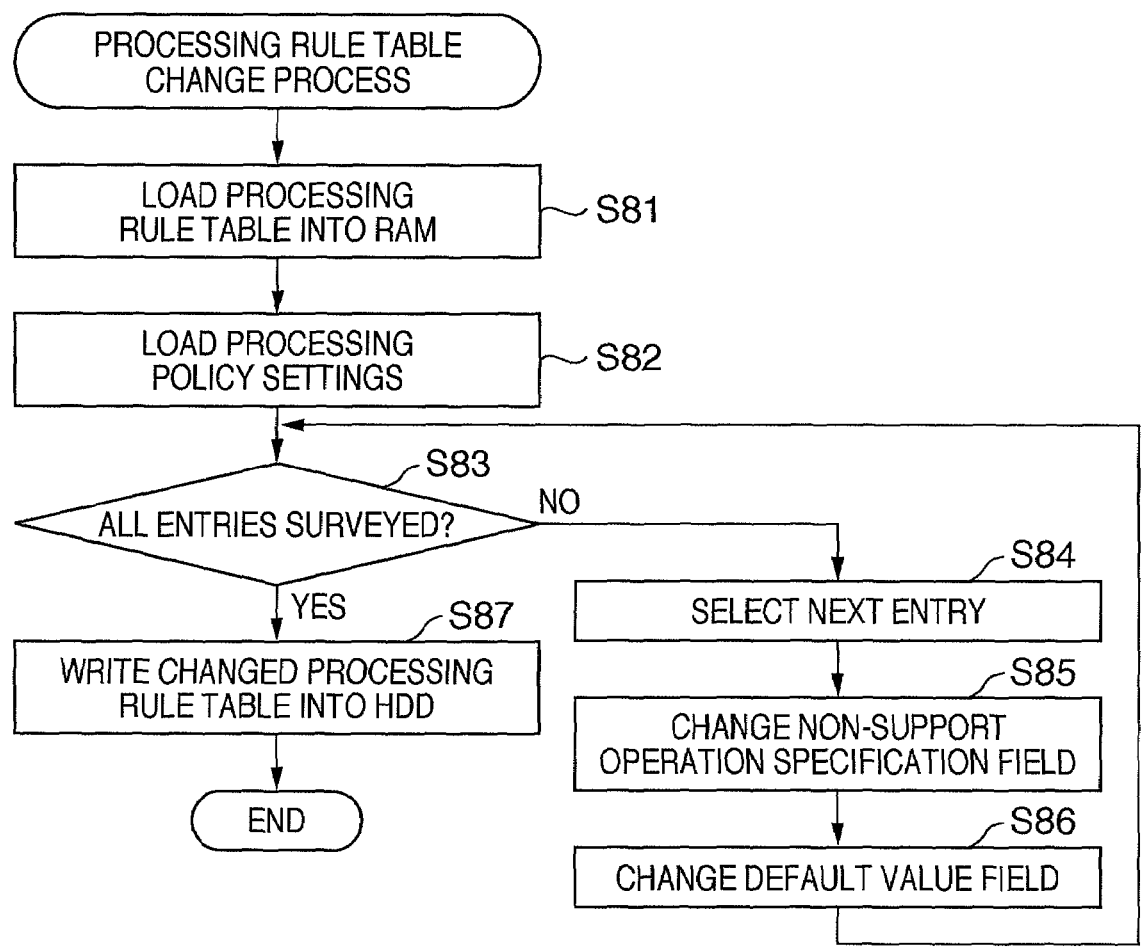
FIG. 29 is a flowchart illustrating details of a process for changing a processing rule table in step S72 of FIG. 27.

FIG. 29 is a flowchart illustrating details of a process for changing the processing rule table 3302 in step S72 of FIG. 28.

First, in step S81, the processing rule table 3302 (FIG. 17) stored in the HDD 209 is loaded into the RAM 208. Next, in step S82, the value of the processing policy selected by the user through the JDF setting screen shown in FIG. 25, or in other words, the value indicating whether to cancel or ignore, is loaded. The value loaded here is stored in the RAM 208 under control of the controller 205 when the JDF setting screen in FIG. 25 is operated, which thereby loads the value. The procedure then advances to step S83, where it is determined whether or not entries that are to be surveyed (items by function, such as double-sided printing, page printing, and so on) still remain in the processing rule table 3302. The procedure advances to step S84 if unprocessed entries remain, where the next entry in the processing rule table 3302 to be processed is selected. The procedure then advances to step S85, where the value read out from the RAM 208 in step S82 is written into the non-support operation specification field 4302 (FIG. 17) for the entry selected in step S84. The procedure then advances to step S86, where a value is written into the default value field 4303 of the processing rule table 3302 (FIG. 17).

In the second embodiment, the only values that can be written into the non-support operation specification field 4302 are "ignore" and "cancel job", and thus explicit settings are not necessary for the default value. Therefore, the operations performed in step S86 in the second embodiment involve writing an initial value or a value indicating that a value is not stored in the field.

When the processing in step S86 ends, the procedure returns to step S83. The steps from step S83 to step S86 are configured as a loop, and the processes in steps S83 to S86 are repeated until all entries in the processing rule table 3302 have been processed. When it is determined, in step S83, that all entries have been processed, the procedure advances to step S87, where the corrected processing rule table 3302 stored in the RAM 208 is written back into the HDD 209, after which the procedure ends.

In this manner, according to the second embodiment, it is possible to accept changes to the processing rule table 3302 from the user. For this reason, appropriate print process settings can be made in accordance with the application, purpose, and so on.

Here, additional descriptions shall be given, including a confirmation on the configurations common in the aforementioned first and second embodiments.

The printing apparatus 100 provided in the printing system 1000 according to the present embodiment is configured so as to be capable of accepting at least two broadly-defined types of jobs as jobs that require printing processing by the printing apparatus 100. For example, the controller 205 controls the printing system 1000 so that the printing apparatus 100 is capable of accepting a "job in which data of the conditions for a series of processes, including the printing conditions during printing by the printer unit 203 and the post-processing conditions, are expressed as JDF format data". In this manner, the printing system 1000 of the present embodiment is capable of accepting jobs in which the various instructions, operational commands, and so on are specified using JDF format data. Note that in the present embodiment, jobs corresponding to this are defined as, for example, "JDF jobs", and are called "type one jobs".

This printing system 1000 is configured so that instructions including instructions for print processing by the printing apparatus 100, instructions for the post-processing performed by the sheet processing apparatus 200, and so on can also be specified using JDF format data. To rephrase, this means that the requests for the printing system 1000 to execute various processes are included as commands in the JDF data. Furthermore, the configuration in the present embodiment is such that jobs can be accepted even when requests for the execution of processes that cannot be executed by the printing system 1000 are included in the JDF data as commands. In other words, it is possible to accept JDF data in which both commands for the printing system 1000 and commands that do not depend on the printing system 1000 are included as the conditions for the series of processes in the job to be processed. In the present embodiment, a job in which various commands are expressed through JDF data, corresponding to a job to be accepted by the printing system 1000, is defined as a "JDF job".

It is assumed, in the above configuration, that the print execution request of the printing apparatus 100 in the printing system 1000 is made by a user via a UI unit (the console unit 204) of the present embodiment, and the job to be processed is a JDF job. Under the condition that the printing system 1000 has accepted the JDF job, the controller 205 executes the control according to the aforementioned first and second embodiments, and controls the printing system 1000 so as to be capable of executing the JDF job.

Next, an example of the reason for and effects of configuring the printing system 1000 to be capable of processing such a JDF job in the present embodiment shall be described.

The present embodiment attempts to achieve the effects, for example, indicated below, by making the printing system 1000 that includes the printing apparatus 100 capable of processing a JDF job. For example, with the printing system 1000, a print editing process, or a "a pre-print process (pre-pressing) corresponding to processing required to be executed in a job to be processed prior to the print process carried out by the printing apparatus 100", is carried out by the PC 104. After this processing, the print process (pressing) is performed by the printing apparatus 100 for the job to be processed. Then, after that process, post-processing (post-pressing) is performed for the job by a sheet processing apparatus 200 as defined in the present embodiment with reference to FIG. 1, a near-line finisher, or the like. This post-pressing corresponds to "a print post-processing corresponding to a process required to be executed in the job to be processed after the print process carried out by the printing apparatus 100".

The POD system 10000 illustrated in FIG. 1 can execute a serial process made up of multiple processes executed one-by-one by multiple independent devices (pre-pressing, pressing, and post-pressing) as a serial workflow (also called a job flow) for completing a job. Multiple devices required for the execution of this serial workflow, from the "pre-pressing" to the "post-pressing", are provided in the present embodiment. Furthermore, the configuration is such that a production management computer for managing these devices (for example, a server computer, or the PC 103) can be connected via the network 101, and the devices can be managed by the PC 103.

In this manner, the POD system 10000 according to the present embodiment is capable of data communication between the printing apparatus 100 and the computer (PC) 104 via the network 101. In addition, data communication between the printing apparatus 100 and a non-offline finisher (sheet processing apparatuses 200 and near-line finishers 108 or 109 and so on) is also possible via the network 101. Furthermore, data communication between the PC 104 and a non-offline finisher (sheet processing apparatuses 200 and near-line finishers 108 or 109 and so on) is also possible via the network 101. The configuration is such that highly-generic digital data (XML) can be used in the data communication between multiple devices that execute differing processes necessary in the creation of printed materials. As described earlier, in the present embodiment, the specific configuration necessary for this has the controller 205 perform control so that the JDF job, serving as a print job that uses XML data, can be processed by the printing apparatus 100.

According to the configuration of the present embodiment, needs that are as yet unaddressed or are difficult to address because, for example, the printing system does not support JDF, can be addressed. The following can be given as examples of such needs:

(1) The efficiency of the individual devices and operating levels has reached its limit, and there is a need to manage the entire process from top to bottom and increase productivity.

(2) Need of preventing wasteful or mistaken transmission of production information.

(3) A work flow in which CTP, printing, and so on are performed in a case where the person in charge of sales took down the order receipt by hand despite the fact that the data itself that is to be printed is electronic data that was created on a client's PC, and the production management and production plan was created based on the hand written order receipt. In other words, there is a need to improve the efficiency of "an unmatched work flow in which some work has been done using paper, other work has been done by computer, resulting in a mix of paper and electronic data".

In order to address such needs that may arise in the POD environment, the JDF job is accepted by the printing apparatus 100 and can then be executed by the printing system 1000. By making the printing system 1000 compliant with the JDF format in such a manner, these various needs can be addressed. In particular, the printing system 1000 can realize advantages that are unique to JDF, such as "the ability to digitize everything used within a publishing company, including the order receipts, work instructions, completion notices, daily reports, and so on", which can be given as an example of such an advantage of JDF that the present invention focuses on. "The ability for the person in charge of sales to understand in detail which devices, such as CTPs, printers, binders, and so on are performing which jobs and which jobs have been completed" can be given as another example of an advantage of JDF jobs. Furthermore, "the ability to make confirmations and instructions through company portals, browsers, PDFs, and so on due to the JDF jobs using XML" is another advantage that can be obtained, and this makes it possible to improve the operational efficiency.

Furthermore, in the present embodiment, a "JDF job" corresponding to a type one job can be accepted as a job to be printed by the printing apparatus 100. Assuming this configuration, in the present embodiment, jobs of a different type than the "JDF job" corresponding to a type one job can also be accepted as a job to be printed by the printing apparatus 100. For example, in order to exploit both the functions provided in the printing apparatus 100 and the functions provided in the sheet processing apparatuses 200 to the maximum limit, execution requests for printing via printer drivers that are unique to the printing system 1000 and are not present in other devices can be accepted. For example, dedicated printer drivers for the printing apparatus 100, created by the manufacturer of the printing apparatus 100, are installed in the PC 103, the PC 104 (an external device), or the like. Furthermore, the CPU of the external device starts up the printer drivers for the printing apparatus 100 and displays a setting screen for the printer drivers in a display unit in response to operations made using a mouse or keyboard of the external device. Further still, the print process conditions and print execution request for the job to be processed is accepted through user operations made via the setting screen of the printer drivers that has been displayed on the display unit of the external device. Through this, the CPU of the external device transmits the data of that job to the printing apparatus 100 via the network 101. At this time, the CPU of the external device transmits the data of the job for which the print process is to be executed by the printing apparatus 100 as, for example, non-JDF data unique to the printing apparatus 100 (for example, PDL data). Accordingly, the printing system 1000 according to the present embodiment can accept non-JDF data as a job to be processed, in addition to a JDF job that corresponds to a type one job.

Note that in the present embodiment, jobs using "non-JDF data" are defined as "non-JDF jobs", and are also called "type two jobs". In the present embodiment, a "non-JDF job" is defined as "a job, acceptable by the printing system 1000, in which the various execution requests for the printing system 1000 are written in a language aside from the XML language". For example, a "PDL job", which is an example of such a "non-JDF job", can be accepted by the printing system 1000 via the external interface unit 202. In this case, the controller 205 causes the processing required by the PDL-format job accepted by the printing system 1000 to be executed by the printing system 1000. In other words, the controller 205 controls the printing system 1000 so that the printing apparatus 100 is capable of accepting a "job in which the data of the conditions for a series of processes, including the printing conditions during printing by the printer unit 203 and the post-processing conditions, are expressed in a data format that is not the JDF format".

Furthermore, jobs to be processed that are requested, by the operator via the UI unit of the present embodiment, to be printed by the printing apparatus 100 of the printing system 1000, are also included in "non-JDF jobs". Accordingly, when a non-JDF job that requires a print process is accepted by the printing system 1000 via, for example, the external interface unit 202, the controller 205 processes the non-JDF job using the printing system 1000, in a manner distinguished from the aforementioned processing of a JDF job. To do so, the controller 205 reads out a computer-readable control program from the HDD 209 and executes that program. The processing based on the non-JDF job can then be executed through control performed in accordance with that program.

For example, it is assumed that a job to be processed, which requests printing, is a JDF job. In this case, when the controller 205 stores the data of that JDF job in the HDD 209, the controller 205 identifies what print process conditions have been set using the XML data in that JDF job. Furthermore, the controller 205 reads out the system configuration data of the printing system 1000 from the HDD 209 and confirms the configuration data. Thereby, the controller 205 determines whether or not all the processes required by the print request in the JDF job can be executed by the printing system 1000.

For example, it is assumed here that the controller 205 has determined that the accepted JDF job is one of the following: "a job in which some of the multiple processes specified in the JDF job cannot be executed by the printing system 1000, but the remaining processes can be executed by the printing system 1000"; or "a job in which none of the multiple processes specified in the JDF job can be executed by the printing system 1000". Note that here, JDF jobs corresponding to either of these shall be defined as "incomplete match-type JDF jobs".

Under the condition that such jobs to be processed are "incomplete match-type JDF jobs", the controller 205 reads out and refers to control rule information for processing JDF jobs pre-stored in the HDD 209 of the printing apparatus 100. The control rule information is managed in the aforementioned management table (rule information storage unit). Here, it is assumed that, for example, settings such as "for jobs corresponding to incomplete match-type JDF jobs, commencing printing is prohibited, and a job canceling process is to be executed in order to end the job process" have been made in the printing system 1000. In this case, the controller 205 prohibits the printer unit 203 from printing the print data for the "incomplete match-type JDF job" accepted via the external interface unit 202. Furthermore, the controller 205 automatically causes that job process to end even if a request to terminate the processing has not been inputted by the operator. Further still, the controller 205 deletes the job data, including the print data that has been held in the HDD 209, from the HDD 209. Such a process for canceling the "incomplete match-type JDF job" is controlled to be automatically executable in accordance with rule information for JDF jobs that has been pre-set in the printing system 1000.

Meanwhile, even if the job is an "incomplete match-type JDF job", items that can be processed by the printing system 1000 are executed by the printing system 1000, and processes than cannot be executed by the printing system 1000 are ignored (no printing is performed), as a result of confirming the control rule information for JDF jobs. In this manner, it is assumed that settings have been made so that "the printing is not prohibited even if the job is an incomplete match-type JDF job, and the execution of the printing process by the printer unit 203 is allowed". In this case, the controller 205 does not prohibit the printer unit 203 from printing the print data for the "incomplete match-type JDF job" accepted via the external interface unit 202, and instead reads out the print data from the HDD 209 and causes the data to be printed. Furthermore, the controller 205 controls the printing system 1000 so as not to execute the processes from the plural processes specified in the JDF job that cannot be executed by the printing system 1000, or controls the printing system 1000 to change the processes to the processes set as defaults that can be executed by the printing system 1000, and execute the processes. In addition, the controller 205 executes, from the plural processes, the processes specified in the JDF job that can be executed by the printing system 1000 as instructed. Such a print process that prohibits the process for canceling the "incomplete match-type JDF job" is controlled to be automatically executable in accordance with rule information for JDF jobs that has been pre-set in the printing system 1000. In the present embodiment, executing a process than can be executed by the printing system 1000 without canceling the processing of an "incomplete match-type JDF job" is called "reduced processing of an incomplete match-type JDF job".

Meanwhile, in the case where the accepted JDF job is "a job in which all of the multiple processes specified by the JDF job can be executed by the printing system 1000", that JDF job is defined as "a processing condition complete match-type JDF job". In this case, the controller 205 executes the print process for the "complete match-type JDF job" accepted via the external interface unit 202 without referring to the rule information. Furthermore, the controller 205 causes the printing system 1000 to execute all the processes requested by that job.

Assuming the above configuration, when, for example, a non-JDF job is accepted via the external interface unit 202 while the printer unit 203 is executing the print process for a JDF job, the controller 205 stores the non-JDF job in the HDD 209 as a job in the print queue. The printing of this non-JDF job is not commenced until the processing of the first JDF job is complete. When it has been confirmed that the processing of the first JDF job is complete, the controller 205 commences the print process for the following non-JDF job using the printer unit 203. Here, when a non-JDF job has been accepted, the controller 205 refers to non-JDF job control rule information managed in advance in the HDD 209; this rule table is different from the control rule information for the first JDF jobs. The controller 205 then controls the processing of this non-JDF job in accordance with the non-JDF job control rule information. In this manner, the control and processing of non-JDF jobs are executed differently from the manner in which the JDF jobs are processed.

For example, it is assumed here that the controller 205 has determined that the non-JDF job accepted by the printing system 1000 is one of the following: "a job in which some of the multiple processes specified in the non-JDF job cannot be executed by the printing system 1000, but the remaining processes can be executed by the printing system 1000"; or "a job in which none of the multiple processes specified in the non-JDF job can be executed by the printing system 1000". Note that here, non-JDF jobs corresponding to either of these shall be defined as "incomplete match-type non-JDF jobs". In this manner, in the case where the job to be processed is an "incomplete match-type non-JDF jobs", the controller 205 reads out and refers to "control rule information for processing non-JDF jobs" held in the HDD 209 of the printing apparatus 100. The controller 205 can then perform the following control based on the results. For example, it is assumed here that referring to the control rule information indicates that settings in which "the printing of a job corresponding to an incomplete match-type non-JDF job is prohibited, and a process for canceling the job, which ends the job process, is executed" are specified. In this case, the controller 205 prohibits the printer unit 203 from printing the print data for the "incomplete match-type non-JDF job". Furthermore, the controller 205 automatically causes that non-JDF job process to end even if a request to terminate the processing has not been inputted by the operator. Further still, the controller 205 deletes the non-JDF job data, including the print data that has been held in the HDD 209, from the HDD 209.

In this manner, the controller 205 can automatically execute the process for canceling the "incomplete match-type non-JDF job" in accordance with rule information for non-JDF jobs that has been pre-set in the printing system 1000.

On the other hand, here, it is assumed that referring to the "control rule information for processing non-JDF jobs" indicates that settings in which processes that can be executed by the printing system 1000 are executed, and processes that cannot be executed are ignored (not executed) are made. Here, it is assumed that settings specifying that printing a non-JDF job is not prohibited, and the execution of the print process by the printer unit 203 is allowed, have been specified in advance in the printing system 1000. In this case, the controller 205 reads out the print data for the "incomplete match-type non-JDF job" from the HDD 209 and prints the print data, without prohibiting printing of the print data by the printer unit 203. Furthermore, the controller 205 performs control so as not to execute the processes from the plural processes specified in the non-JDF job that cannot be executed by the printing system 1000, or control to change the processes to the processes set as defaults that can be executed by the printing system 1000, and execute the processes. In addition, the controller 205 executes, from the plural processes, the processes specified in the non-JDF job that can be executed by the printing system 1000, as per the settings thereof.

In this manner, control is performed so that a print process that prohibits the process for canceling the "incomplete match-type non-JDF job" is automatically executed in accordance with rule information for non-JDF jobs that has been pre-set in the printing system 1000. Note that in the present embodiment, a process that executes the processes of an "incomplete match-type non-JDF job" that can be executed by the printing system 1000 without canceling the processes and completes the printing in such a manner is called "reduced processing of an incomplete match-type non-JDF job".

Furthermore, a non-JDF job determined by the controller 205 to be "a job in which all of the multiple processes specified in the non-JDF job can be executed by the printing system 1000" is defined as "a processing condition complete match-type non-JDF job". In this case, the controller 205 does not refer to the non-JDF job rule information, and instead reads out the print data of the accepted "complete match-type non-JDF job" from the HDD 209 and prints the print data of the job. Furthermore, the controller 205 causes the printing system 1000 to execute all the processes requested by the job. In addition, in the present embodiment, this non-JDF job control can be executed by the printing system 1000 independently of and separate from the abovementioned JDF job control. For example, as a first control example, the controller 205 makes it possible to automatically execute the process for canceling an incomplete match-type non-JDF job in accordance with the non-JDF job rule information pre-set in the printing system 1000.

Furthermore, the control for canceling the non-JDF job performed by the controller 205 may be set so that "the process for canceling an incomplete match-type non-JDF job is automatically executed in accordance with the rule information for the JDF job pre-set in the printing system 1000". In this case, the controller 205 makes it possible for the printing system 1000 to accept a JDF job even during a period in which control is being performed to execute the process for canceling an "incomplete match-type non-JDF job". When a JDF job is accepted during this period, the controller 205 causes the printing system 1000 to execute processing in accordance with the JDF job rule information. For example, under the condition that the JDF job is an "incomplete match-type JDF job", the controller 205 causes the printing system 1000 to execute the process for canceling this JDF job.

Furthermore, as a second control example different from the first control example, the controller 205 makes it possible to, for example, "automatically execute the process for canceling an incomplete match-type non-JDF job in accordance with the non-JDF job rule information pre-set in the printing system 1000". Furthermore, the controller 205 executes the control for canceling the non-JDF job performed even in the case where settings are made so that "the reduced processing for an incomplete match-type JDF job is automatically executed in accordance with the rule information for the JDF job pre-set in the printing system 1000".

In this manner, the printing system 1000 can accept a JDF job even during a period in which the printing system 1000 is being controlled to execute the process for canceling an "incomplete match-type non-JDF job". When a JDF job is accepted during this period, the controller 205 causes the printing system 1000 to execute processing in accordance with the JDF job rule information. For example, in the case where the JDF job is an "incomplete match-type JDF job", the controller 205 causes the printing system 1000 to execute the reduced processing for this JDF job.

Furthermore, as a third control example different from the second control example, the controller 205 makes it possible to, for example, "automatically execute the reduced processing for an incomplete match-type non-JDF job in accordance with the non-JDF job rule information pre-set in the printing system 1000". In the present embodiment, the controller 205 executes the reduced processing for this non-JDF job even in the case where settings are made so that "the reduced processing for an incomplete match-type JDF job is automatically executed in accordance with JDF job rule information pre-set in the printing system 1000".

In this manner, the controller 205 makes it possible for the printing system 1000 to accept a JDF job even during a period in which the printing system 1000 is being controlled to execute the reduced processing for an "incomplete match-type non-JDF job". When a JDF job is accepted during this period, the controller 205 causes the printing system 1000 to execute processing in accordance with the JDF job rule information. For example, in the case where the JDF job is an "incomplete match-type JDF job", the controller 205 causes the printing system 1000 to execute the reduced processing for this JDF job.

Furthermore, as a fourth control example different from the third control example, the controller 205 makes it possible to, for example, "automatically execute the reduced processing for an incomplete match-type non-JDF job in accordance with the non-JDF job rule information pre-set in the printing system 1000". In addition, the controller 205 executes the reduced processing for this non-JDF job even in "the case where the process for canceling an incomplete match-type JDF job can be automatically executed in accordance with JDF job rule information pre-set in the printing system 1000".

In this manner, the controller 205 makes it possible for the printing system 1000 to accept a JDF job even during a period in which the printing system 1000 is being controlled to execute the reduced processing for an "incomplete match-type non-JDF job". When a JDF job is accepted during this period, the controller 205 causes the printing system 1000 to execute processing in accordance with the JDF job rule information. For example, in the case where the JDF job is an "incomplete match-type JDF job", the controller 205 causes the printing system 1000 to execute a process for canceling this JDF job.

As described thus far, in the present embodiment, multiple types of jobs, including a type one job corresponding to a JDF job and a type two job corresponding to a non-JDF job, can be accepted by the printing apparatus 100.

Assuming such a configuration, under the condition that the accepted job to be processed has been confirmed as a JDF job, the controller 205 checks whether or not the JDF job is an incomplete match-type JDF job. As a result, under the condition that the JDF job has been confirmed as an incomplete match-type JDF job, the controller 205 controls the printing system 1000 to execute the processing on that JDF job as described earlier. Then, when the accepted job to be processed has been confirmed as a non-JDF job, the controller 205 checks whether or not the non-JDF job is an incomplete match-type non-JDF job. As a result, if the non-JDF job is confirmed as being an incomplete match-type non-JDF job, the controller 205 controls the printing system 1000 to execute the processing for the non-JDF job. In this manner, the JDF job control and non-JDF-job control can be executed by the printing system 1000 independent of each other.

Furthermore, assuming such a configuration, the controller 205 makes it possible for a processing request for a non-JDF job to be accepted while the printing system 1000 is being caused to execute a print process required by a JDF job. The non-JDF job accepted during the execution of the printing of the JDF job is stored in the HDD 209 as a job in the print queue, and the system stands by for the execution thereof. When the print process for the JDF job is completed by the printing system 1000, the print process for the non-JDF job that is standing by can be executed. Likewise, the controller 205 makes it possible for a processing request for a JDF job to be accepted while the printing system 1000 is being caused to execute a print process required by a non-JDF job. The JDF job accepted during the printing of the non-JDF job is stored by the controller 205 in the HDD 209 as a job in the print queue, and the system stands by to commence the processing thereof. When the print process for the non-JDF job is completed, the controller 205 makes it possible for the printing system 1000 to execute the print process for the non-JDF job that is standing by.

Providing the configurations as described above is also one characteristic of the printing system 1000 according to the present embodiment.

In this manner, the printing system 1000 of the present embodiment is provided with at least a JDF-compliant printing apparatus 100, enabling the use of a digital format common across the entire printing process (instructions or a job ticket).

The merits are as described in the present embodiment, and the following points, for example, are of interest.

For example, the JDF format uses XML, a basic format used for web pages. JDF being able to obtain the advantages with respect to the management of the entire printing process, such as confirming, through a web site, the state of production management, the operational states of various devices such as printing apparatuses, binding devices, and so on, by using these characteristics, is garnering attention. That these advantages can be enjoyed even when using the printing system 1000 is one of the characteristic points of the present embodiment.

In addition, it is possible to write a set of instructions in the JDF format for a serial operational process that links multiple devices, from the loading process to the delivery process of the printed materials that are the final product, and is not limited only to a single device. Using this characteristic, with JDF, it is possible to manage a serial workflow made up of multiple steps using multiple devices using a single set of instructions. JDF provides advantages in terms of such linking of multiple devices involved in the overall printing process to each other, and in terms of the automation of various devices. Furthermore, in addition to the above, the present embodiment can also address the following issues, which have not been addressed as of yet.

Issue (1)

With a printing apparatus or printing system configured simply to be compliant with JDF jobs, if the printed materials cannot be created as per the JDF instructions, it is difficult to address the needs of a user who does not wish the printing apparatus or printing system to execute the print process of that JDF job.

For example, the JDF settings differ from a printer driver provided uniquely for the printing apparatus in that it can be created even without knowing the specifications, configuration information, and so on of the printing apparatus. It can be said that this is a configuration that exploits the advantage of the JDF format, which is a common format independent of individual devices and which aims to enable job processing in as many different devices as possible. However, this also means that there may be cases where, for example, the operations specified in the JDF job cannot be completely executed by the printing apparatus or the printing system due to the execution environment (the capabilities, attachment states, and so on of the printing apparatus or system).

Furthermore, from the standpoint of the user, there may be cases where the user desires to cancel the processing of a job in the case where the printing apparatus (printing system) cannot create the printed materials exactly as instructed, when, for example, printing is instructed using JDF. In particular, a case can be considered where printed materials to be used as products delivered to a client are created by the printing system 1000 in the POD printing environment according to the present embodiment. When creating printed materials to be used as products using the printing system 1000 in such a printing environment, not only is it pointless to create printed materials that the client does not desire, but costs due to failures may also increase as well.

In response to this, the present embodiment can solve the issue (1), and the abovementioned user needs that are specific to the POD environment and that are forecasted in such a printing environment can be addressed.

Issue (2)

With a printing apparatus or printing system configured simply to be compliant with JDF jobs, if the printed materials cannot be created as per the JDF instructions, it is difficult to address the needs of a user who nevertheless wishes to carry out processing using the JDF job.

For example, it is assumed here that finishing that cannot be executed by the sheet processing apparatuses 200 of the printing system 1000 is specified in the JDF job. In this case, the printing system 1000 cannot execute that process. However, it is also assumed here that, for example, a non-inline type finisher such as an offline finisher or an inline finisher has been prepared at the location where the printing system 1000 is installed, such as with the POD system 10000. In this case, it can be assumed that if a non-inline type inline finisher is used, the printed materials for use as products can be created, even if the creation thereof involves processes that cannot be processed with the inline finisher of the printing system 1000. In such a case, for example, the printed materials cannot be completed as instructed by the JDF using only the printing system 1000, but can be completed by using a non-inline type of finisher. Accordingly, with the printing system 1000, even in the case where the printed materials for use as products cannot be completed, processes that can be carried out by the printing system 1000, such as the printing process for the JDF job, are nevertheless desired to be executed by the printing system 1000. Doing so is more efficient because a larger number of print jobs from more clients can be processed. It can be thought that operators at the location of the printing system 1000 in such a POD environment will request such needs, that take into account the overall productivity of multiple jobs, to be addressed.

In this manner, the present embodiment focuses on the fact that users will require certain needs to be addressed in the future in POD printing environments, such as the above-described case, in which the user wishes to process the JDF job even in the case where the printed materials cannot be created by the printing apparatus or system as per the JDF instructions. However, with a printing apparatus or printing system configured simply to be compliant with JDF jobs, it is difficult to address these needs.

The present embodiment can solve this second issue as well, and the abovementioned user needs that are specific to the POD environment and that are forecasted in such a printing environment can be addressed.

As illustrated in the examples above, not only is JDF-format data promising from the standpoint of its genericness, device automation, device linking, device management, and so on, but it is also not data prepared only for a single device or a specific type of device. As a result, cases such as those described above may occur. Accordingly, that the printing system 1000 is configured so as to be able to provide a scheme for providing a printing system and printing apparatus that can flexibly address such user needs as described above is a major characteristic point. Note that the above configurations need not necessarily encompass all configurations. In other words, any configuration is acceptable as long as it is a configuration by which at least one of the effects described in the present embodiment with respect to JDF can be obtained. However, it is preferable for at least the following constituent elements to be included.

The printing system 1000 is configured to be capable of processing multiple types of jobs that require print processing using the printing apparatus 100. As the multiple types of jobs, at least the following can be accepted: a JDF job in which multiple processing conditions are specified using the XML language; and a non-JDF job in which multiple processing conditions are specified using a language aside from the XML language (for example, a PDL job).

Assuming such a configuration, the controller 205 executes the control illustrated below. For example, it is assumed that a job to be processed is a "JDF job, not a non-JDF job". This is taken as condition A. Furthermore, the JDF job is "a JDF job that includes processing conditions that cannot be executed by the printing system 1000". This is taken as condition B. In the case where the conditions A and B are met, the controller 205 controls the printing system 1000 to be capable of canceling the print process for the JDF job.

Meanwhile, assuming the above configuration, the controller 205 also executes the control illustrated below. For example, it is assumed that a job to be processed is a "JDF job, not a non-JDF job" (condition A). Furthermore, the JDF job is "a JDF job that includes processing conditions that cannot be executed by the printing system 1000" (condition B). In other words, in the case where the conditions A and B are met, the controller 205 controls the printing system 1000 to be capable of executing processes capable of being executed by the printing system 1000 from the multiple processes required by the JDF job, without canceling the print process of the JDF job.

Meanwhile, assuming the above configuration, the controller 205 also executes the control illustrated below. For example, it is assumed that a job to be processed is a "JDF job, not a non-JDF job" (condition A). Furthermore, the JDF job is "a JDF job that includes processing conditions that cannot be executed by the printing system 1000" (condition B). In other words, in the case where the conditions A and B are met, the controller 205 controls the print process for that JDF job in the following manner. From among the multiple processes required by the JDF job, a first process that executes a process capable of being executed by the printing system 1000, and a second process that cancels the processing by the printing system 1000, are selectively made executable.

Furthermore, assuming the above configuration, the controller 205 also executes the control illustrated below. For example, it is assumed that a job to be processed is a "JDF job, not a non-JDF job" (condition A). Furthermore, the JDF job is "a JDF job that does not include processing conditions that cannot be executed by the printing system 1000". This is taken as condition C. In the case where the two conditions A and C are met, the controller 205 causes the printing system 1000 to execute the print process for the JDF job.

Meanwhile, assuming the above configuration, the controller 205 also executes the control illustrated below. The controller 205 determines the action to be taken with respect to a JDF job that includes processing conditions that cannot be executed by the printing system 1000 based on JDF job rule information stored in the HDD 209. The process that is to be executed for a JDF job that satisfies the two abovementioned conditions A and B is determined thereby.

Meanwhile, assuming the above configuration, the controller 205 also executes the control illustrated below. The controller 205 makes it possible to accept a non-JDF job while the printing apparatus 100 is executing a print process for a JDF job. Furthermore, in the case where a non-JDF job has been accepted while the printing apparatus 100 is executing a print process for a JDF job, the controller 205 makes the printing system 1000 capable of executing the print process for the non-JDF job after the print process for the JDF job has been completed. Meanwhile, assuming the above configuration, the controller 205 also executes the control illustrated below. The controller 205 executes control for the non-JDF job independent of the stated control for the JDF job.

Assuming the above configuration, the controller 205 also executes the control illustrated below. The controller 205 determines the action to be taken with respect to a non-JDF job that includes processing conditions that cannot be executed by the printing system 1000 in accordance with non-JDF job rule information stored in the HDD 209. Through this, the controller 205 can execute a process for canceling an incomplete match-type non-JDF job or reduced processing for an incomplete match-type non-JDF job in accordance with the non-JDF job rules.

Assuming the above configuration, the controller 205 also executes the control illustrated below. The controller 205 stores, in the HDD 209 in advance, the JDF job rule information for determining the action to be taken with respect to a JDF job that includes processing conditions that cannot be executed by the printing system 1000. Furthermore, the controller 205 also stores, in the HDD 209, the rule information for determining the action to be taken with respect to a non-JDF job that includes processing conditions that cannot be executed by the printing system 1000, in a state in which it is distinguishable from the JDF job rule information. The details of the rule information may be registered as device settings for the printing system 1000 by an operator via a user interface of the present embodiment (for example, the console unit 204). In addition, control is performed so that the print data of the JDF job and the print data of the non-JDF job can be stored in the HDD 209. Furthermore, control is performed so that the print data of the JDF job and the non-JDF job can be read out from the HDD 209 and printed by the printer unit 203 when performing printing using the printing apparatus 100. Such a configuration indicates that at least the configurations illustrated below are provided. For example, the controller 205 makes it possible to determine, via the user interface of the present embodiment, the action to be taken with respect to a JDF job that includes processing conditions that cannot be executed by the printing system 1000. Furthermore, the controller 205 determines whether to cancel or perform reduced processing with respect to the print process of a JDF job that includes processing conditions that cannot be executed by the printing system 1000, based on user settings for determining the action to be taken with respect to the accepted JDF job. A configuration that includes any of the abovementioned configuration requirements is also included in the scope of the present embodiment.

By configuring the system as described above, the present embodiment achieves at least one of the advantages of JDF jobs, and solves issues for JDF jobs that have thus far been difficult to solve. Particularly in POD printing environments that can be forecasted in cases where a printing apparatus or printing system is made compliant with JDF, this can contribute to the actual implementation of products that can address the needs of users that may appear in the future.

<Third Embodiment>

Assuming the configurations described above, the effects of the embodiments can be further improved by additionally providing the printing system 1000 with the configurations illustrated below. For example, in the previous configurations, when a reduced process is used as a JDF job setting in common specification settings, the output of JDF jobs determined by the controller 205 as being incomplete match types upon the execution request for the job being accepted is reduced. With the printing system 1000 of the present embodiment, upon accepting an execution request for a job, the request is registered in a print queue in the HDD 209 as a job to be printed. After this, the controller 205 executes the jobs registered in the print queue in order, and outputs these jobs with reduced output. However, there are cases where an incomplete match-type JDF job is changed to a complete match-type JDF job after the job has been registered in the print queue, due to changes in the configurations or states of the devices. A process performed in such a case for changing an incomplete match-type JDF job that has been registered in the print queue to a complete match-type JDF job under the instructions of the operator shall be described hereinafter. Note that even if the controller 205 has determined a JDF job to be of the complete match type upon the printing request being accepted, the printing system 1000 causes that job to be registered nonetheless in the print queue in the HDD 209 as a job to be printed. Assuming such a configuration, the controller 205 sequentially registers the jobs to be handled as jobs to be printed in the print queue in the HDD 209.

Figure 30:
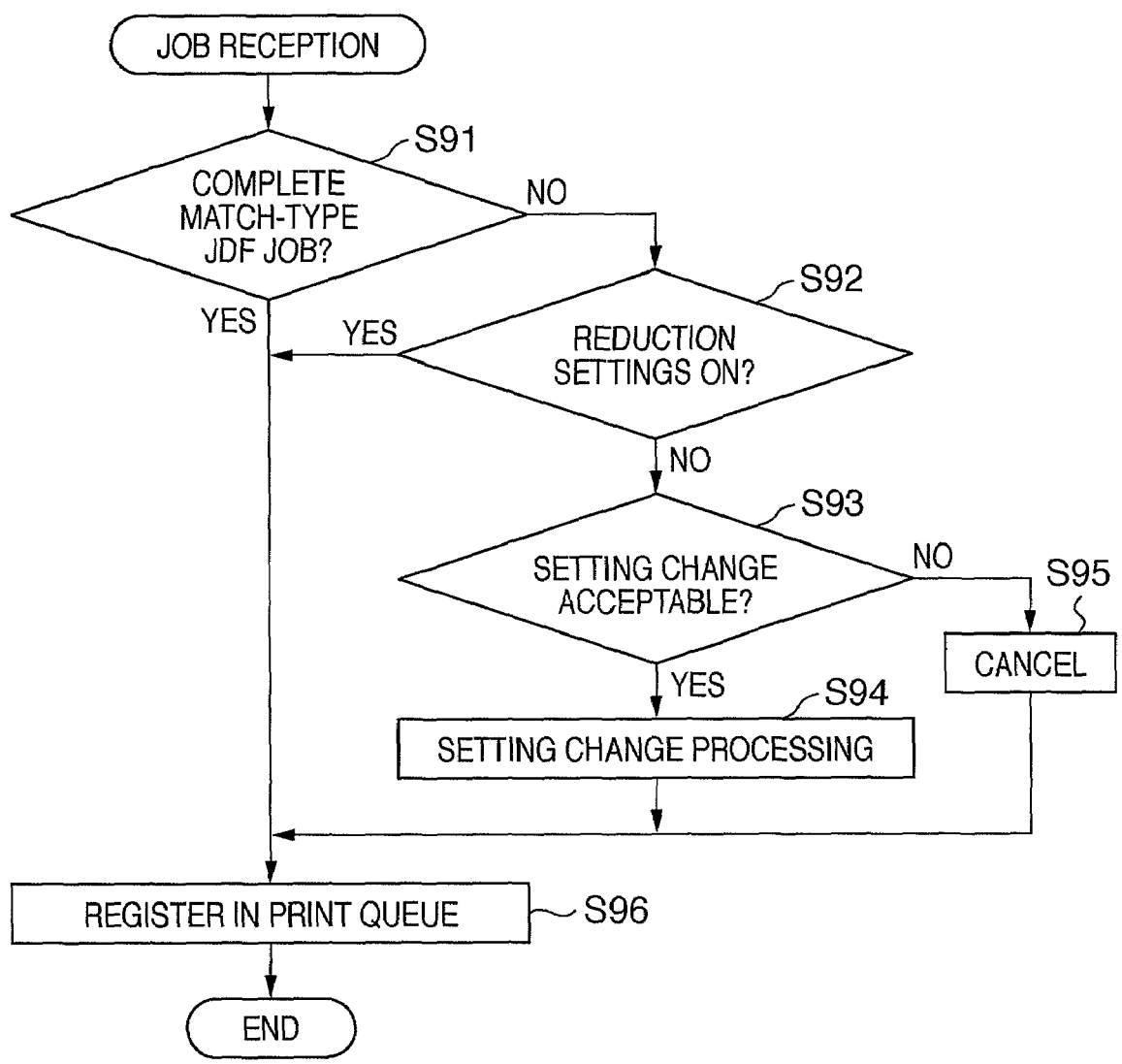
FIG. 30 is a flowchart illustrating details of a process performed in the case where it has been determined in step S6 of FIG. 28 that a JDF job has been received.

FIG. 30 is a flowchart illustrating processing performed by the controller 205 in the case where the printing system according to the third embodiment has accepted a job (step S6 in FIG. 28). Note that the programs that execute these processes are stored in the ROM 207 and are executed under the control of the controller 205.

First, in step S91, the controller 205 analyzes the job information of the accepted job, and determines whether or not the accepted job is a complete match-type JDF job. If the accepted job is a complete match-type JDF job, or if the job is not a JDF job, then the procedure advances to step S96, where the accepted job is stored in the HDD 209 and registered in the print queue.

However, if in step S91 the accepted job is not a complete match-type JDF job, and is rather a incomplete match-type JDF job, the procedure advances to step S92, where it is determined whether or not a reduced setting is valid in the common specification settings. The procedure advances to step S96 in the case where the reduced setting is valid, and the accepted job is stored in the HDD 209 and registered in the print queue.

Figure 35:
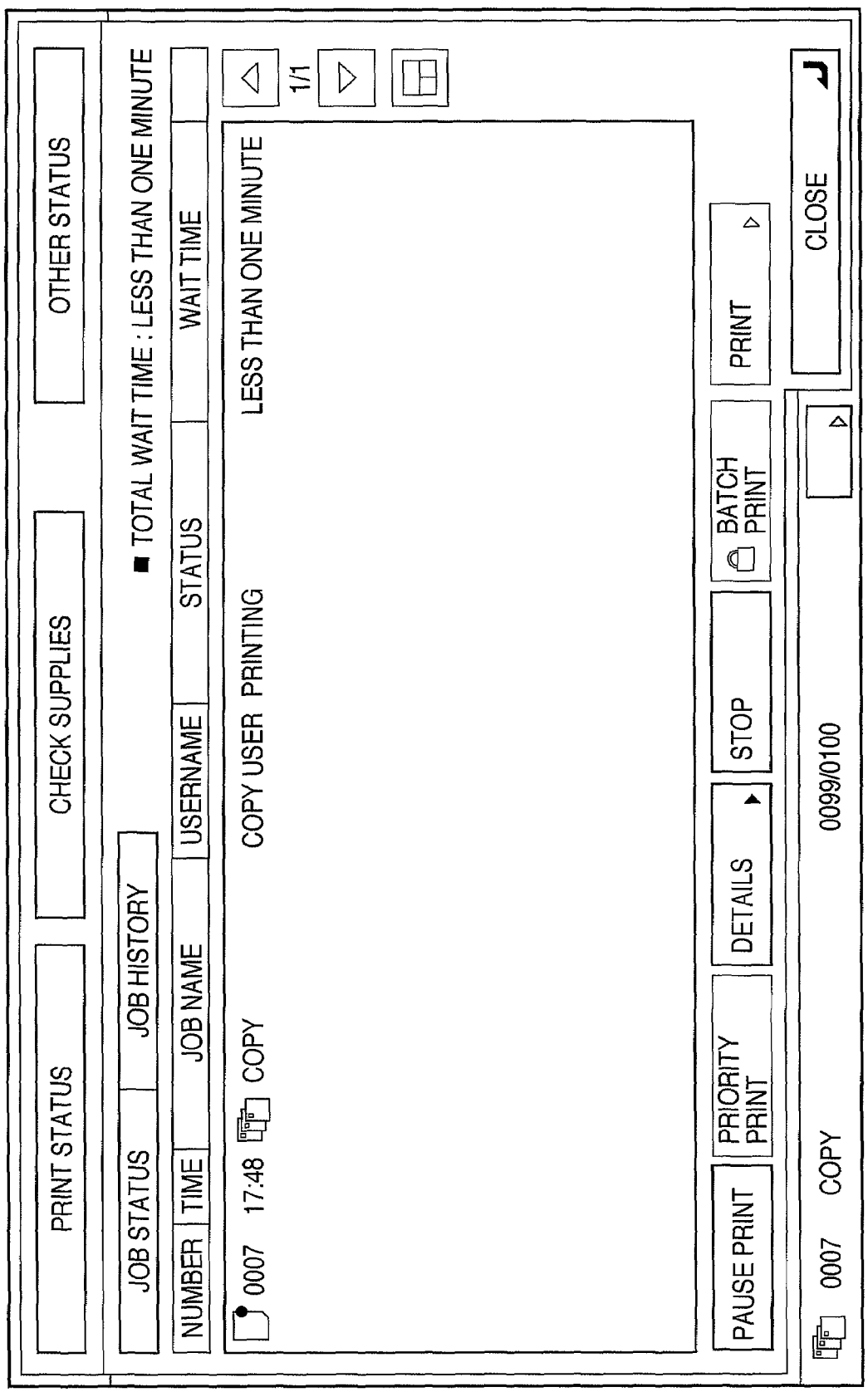
FIG. 35 is a diagram illustrating an example of the display of a job status screen during the execution of a copy process.

FIG. 35 is a diagram illustrating an example of the display of a job status screen during the execution of a copy process.

FIG. 36 is a diagram illustrating an example of the display of a job status screen when an incomplete match-type JDF job is loaded during the printing shown in FIG. 35 and is registered as queued for printing in the HDD 209 as a target for reduction.

If the reduced setting is not valid in the common specification settings in step S92, the procedure advances to step S93, where the UI unit displays the job information and the current device configuration information of the job. It is then determined whether or not a change in settings for the accepted incomplete match-type job can be accepted.

Figure 33:
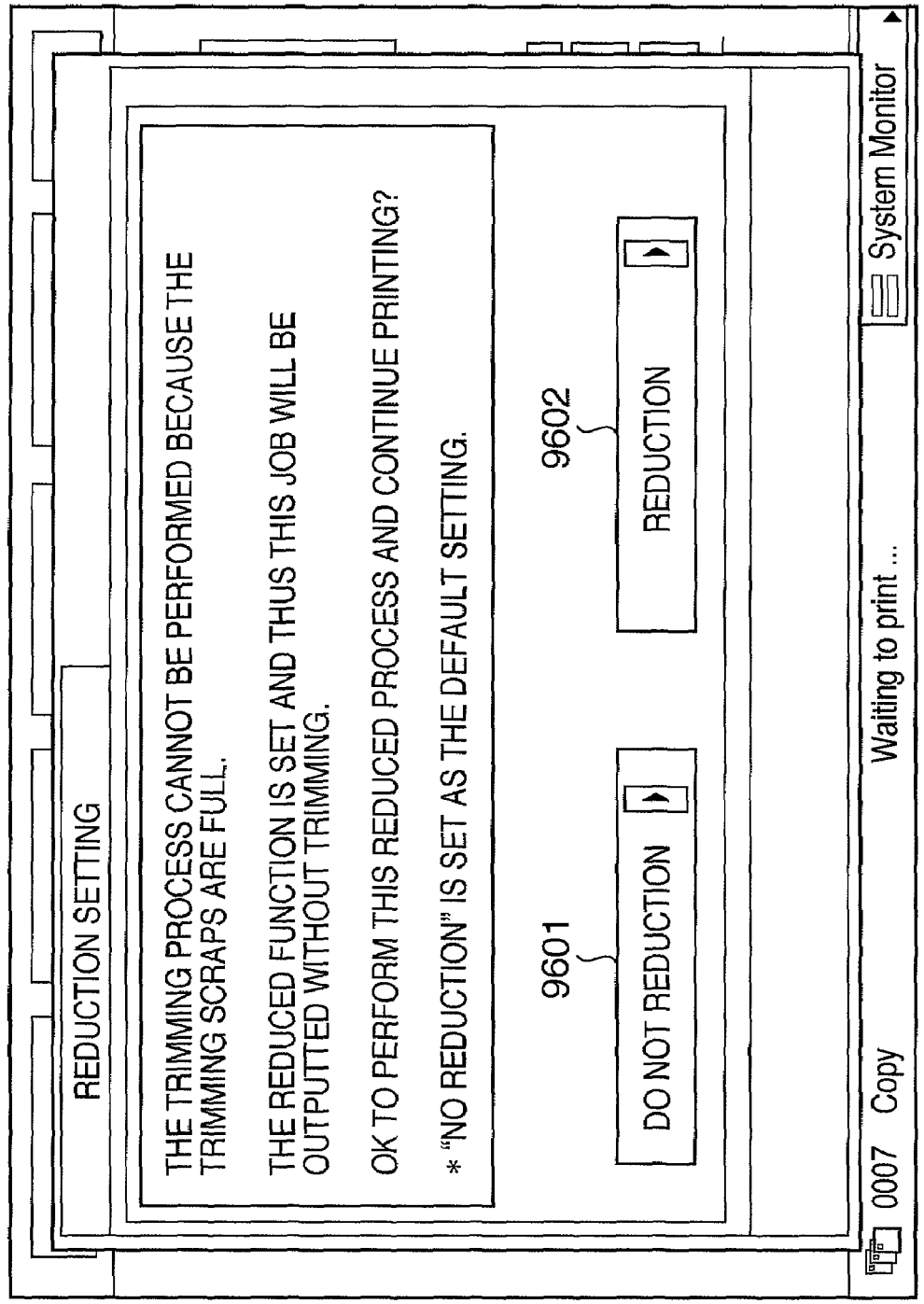
FIG. 33 is a diagram illustrating an example of the display of a setting change reception UI.

FIG. 33 is a diagram illustrating an example of the display made in step S93.

In such a case, where an incomplete match-type job has been loaded, whether or not to accept a change in settings for the job can be selected by allowing a user to select whether or not to perform the reduced process using the screen in FIG. 33. In the case where, for example, the user has specified a reduction execution button 9602 as shown in FIG. 33, a substitute operational process or a skipping operation process stored in advance in the HDD 209 is carried out, and a job setting change process is performed (step S94). Then, the job is registered in the HDD 209 as a job queued for printing, based on the changed job information. Furthermore, in the case where the user has specified a non-reduction button 9601 as shown in FIG. 33, the incomplete match-type job is determined to be unexecutable, and the data thereof is cancelled (step S95).

Figure 31:
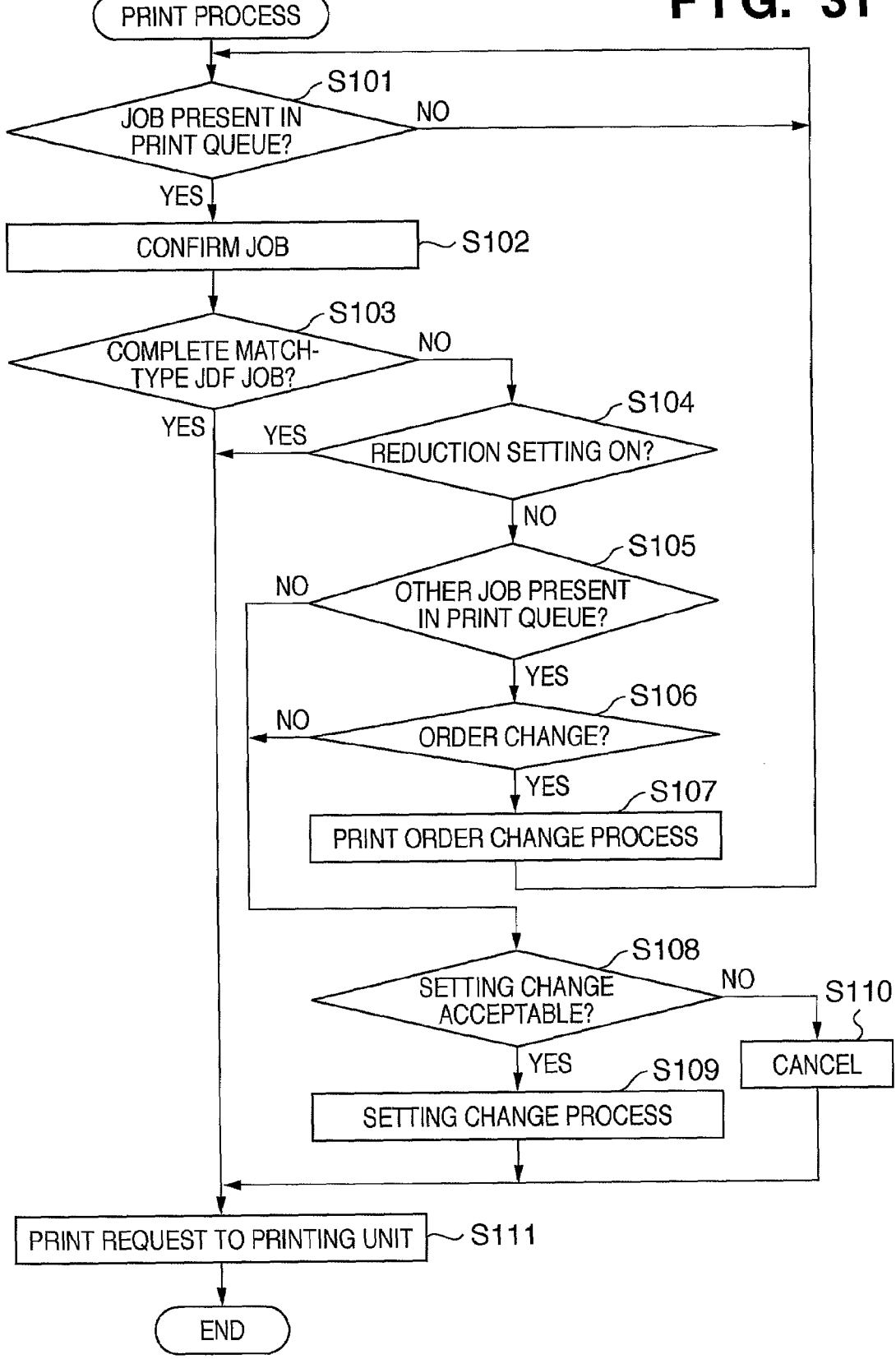
FIG. 31 is a flowchart illustrating a printing process performed by a controller based on a job registered in a print queue saved in an HDD.

FIG. 31 is a flowchart illustrating a printing process performed by the controller 205 based on a job registered in a print queue saved in the HDD 209. Note that the programs that execute these processes are stored in the ROM 207 and are executed under the control of the controller 205.

First, in step S101, the controller 205 determines whether or not there is a job queued for printing registered in the HDD 209, and repeats this process until a job queued for printing has been registered. If it is determined in step S101 that a job queued for printing is registered in the HDD 209, the procedure advances to step S102, where the processing for the job queued for printing is confirmed.

The procedure then advances to step S103, where it is determined whether or not the job is a complete match-type JDF job by comparing it with rule information; if the job is a complete match-type JDF job, the procedure advances to step S111, where the print process is performed by the printer unit 203.

However, if in step S103 it is determined that the job is not the complete match-type JDF job, the procedure advances to step S104, where it is determined whether or not the reduction setting is valid. The procedure advances to step S111 if the reduction setting is valid. In step S111, the processes for the functions in the job information for the incomplete match-type JDF job determined to be incapable of being completely processed are processed with a substitute process pre-set in the HDD 209 or are skipped, and a print request for the print job is made to the printer unit 203.

On the other hand, if in step S104 it is determined that the reduction setting is not valid, then the procedure advances to step S105, where it is determined whether or not a job aside from the incomplete match-type JDF job stored in the HDD 209 is registered as a job queued for printing. Here, if it is determined that another job aside from the incomplete match-type JDF job is registered as a job queued for printing, the procedure advances to step S106. In step S106, it is determined whether or not the print process order of the incomplete match-type JDF job is to be shifted to later and the other job queued for printing determined in step S105 is to be given priority for execution. In step S106, determination based on the standard for determining the order shift is performed by displaying a screen in the UI unit that prompts the user to determine whether or not to shift the print process order of the incomplete match-type JDF job to later. The settings for whether or not to shift the print process to later may also be set in the common specification settings. If it has been determined in step S106 that the print process order for the incomplete match-type JDF job is to be changed, the procedure advances to step S107, where the print order for the job is changed; the procedure then returns to step S101.

However, if in step S105 no other jobs queued for printing are registered in the HDD 209, or it is determined in step S106 that the print order for the incomplete match-type JDF job is not to be changed, the procedure advances to step S108. In step S108, the job information of that job is displayed on the UI unit, and it is then determined whether or not to accept a change in settings for the incomplete match-type job. In the case where no job setting changes are accepted, or in the case where the operator does not carry out the job change settings even if the job information for that job is displayed in the UI unit, the procedure advances to step S110, where it is determined that the incomplete match-type cannot be executed, and the job is cancelled.

On the other hand, if settings are made via the UI unit for accepting the setting change in step S108, the procedure advances to step S109, where the processing information for all processes regarding functions in the incomplete match-type job determined to be not processable is changed, with reference to the rule information. After the incomplete match-type job is changed to a complete match-type job in this manner, the procedure advances to step S111, where the print request for that job is issued to the printing unit 203.

Figure 32:
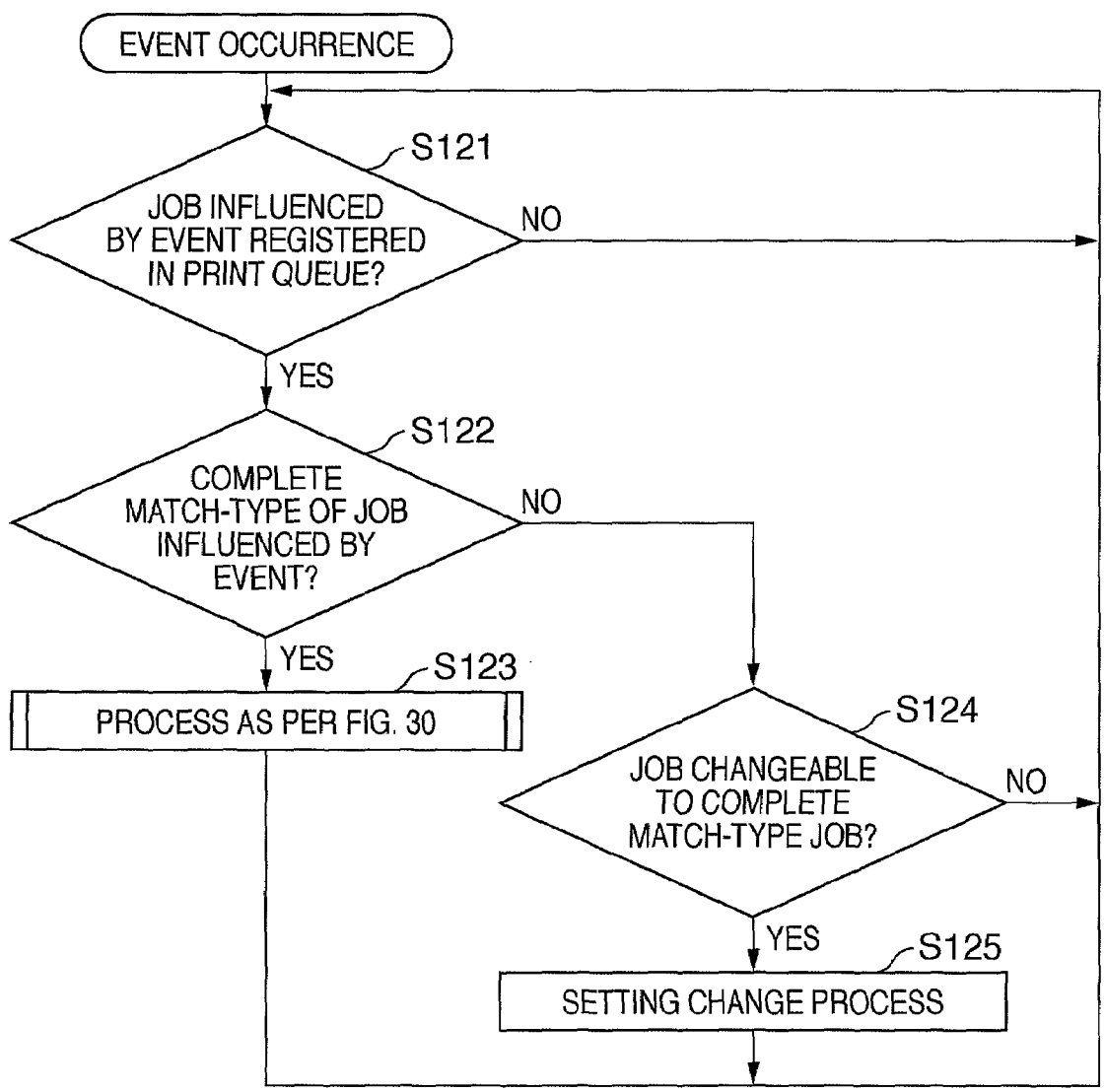
FIG. 32 is a flowchart illustrating a process performed upon the occurrence of an event that influences the device configuration of the printing system according to the embodiment of the present invention.

FIG. 32 is a flowchart illustrating a process performed upon the occurrence of an event that influences the device configuration of the printing system 1000 according to the present embodiment. Note that the programs that execute these processes are stored in the ROM 207 and are executed under the control of the controller 205.

This process is commenced upon the occurrence of an event, and the process advances to step S121 when such an event occurs. Here, it is determined whether or not the event is an event that influences a function for performing a process described in the job information for a print process, and whether or not the job that is influenced is registered in the HDD 209 as a job queued for printing. Here, if it is determined that the job that is influenced is not registered as a job queued for printing, the procedure returns to step S121, and the system once again enters an event standby state.

In step S121, if it is determined that the job that is influenced is registered as a job queued for printing, the procedure advances to step S122, where it is determined whether or not the print job that is influenced and that is registered as a job queued for printing is a complete match-type job. If in step S122 it is determined that the job that is influenced is a complete match-type job, the procedure advances to step S123, where the same process executed when the job is received, as shown in FIG. 30, is performed on the entirety of the complete match-type job. After this process has been performed, the system returns to the beginning of the flow and enters the event occurrence standby state once again.

FIG. 33 is a diagram illustrating an example of the display of a setting change reception UI.

In the example shown in FIG. 33, a trimmer cannot be used due to trim scraps being full, and thus the user is prompted to select whether or not to execute a reduced process for the job that carries out trimming. Here, when the user decides to perform the reduced process, he or she touches the reduction execution button 9602. When the reduction execution button 9602 is touched, the job information of the job that has become an incomplete match-type job is changed, and the print process is continued. However, when the user decides not to execute the reduced process, he or she touches the non-reduction button 9601.

Figure 34:
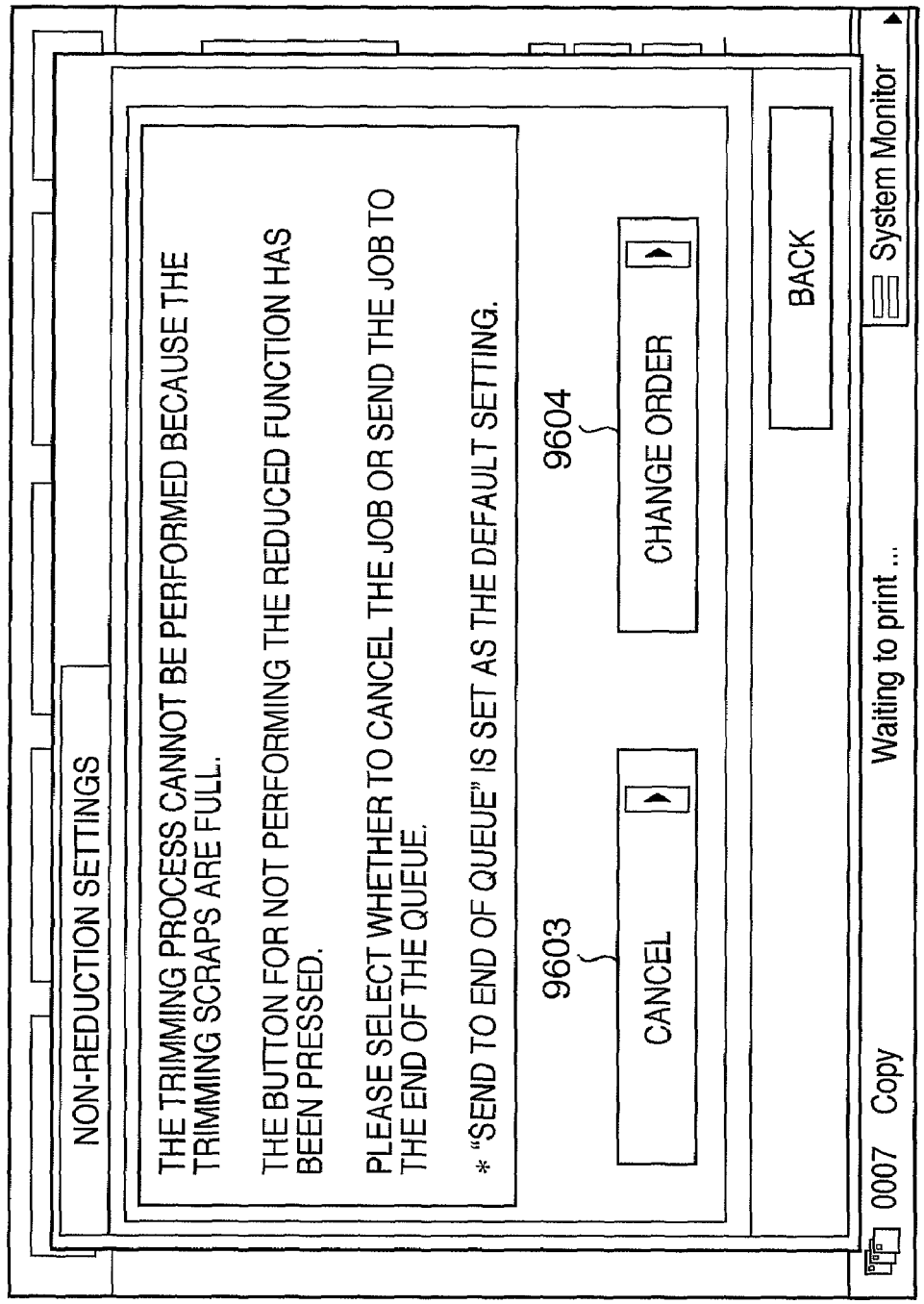
FIG. 34 is a diagram illustrating an example of the display of a UI in the case where a reduced process is not executed.

FIG. 34 is a diagram illustrating an example of the display of the UI in the case where the reduced process is not executed.

Here, a cancel button 9603 can be touched to cancel the processes for the job, or an order change button 9604 can be touched to shift the order of the job to later.

Returning to FIG. 32, if in step S122 it is determined that the job that is influenced and that is registered in the print queue is a non-complete match-type JDF job, the procedure advances to step S124. In step S124, it is determined whether or not the job can be changed to a complete match-type job. When it has been determined that the change is not possible, the procedure advances to event standby (S121). On the other hand, if it has been determined that the change is possible, the procedure advances to step S125, where the job is changed to a complete match-type job.

Figure 38:
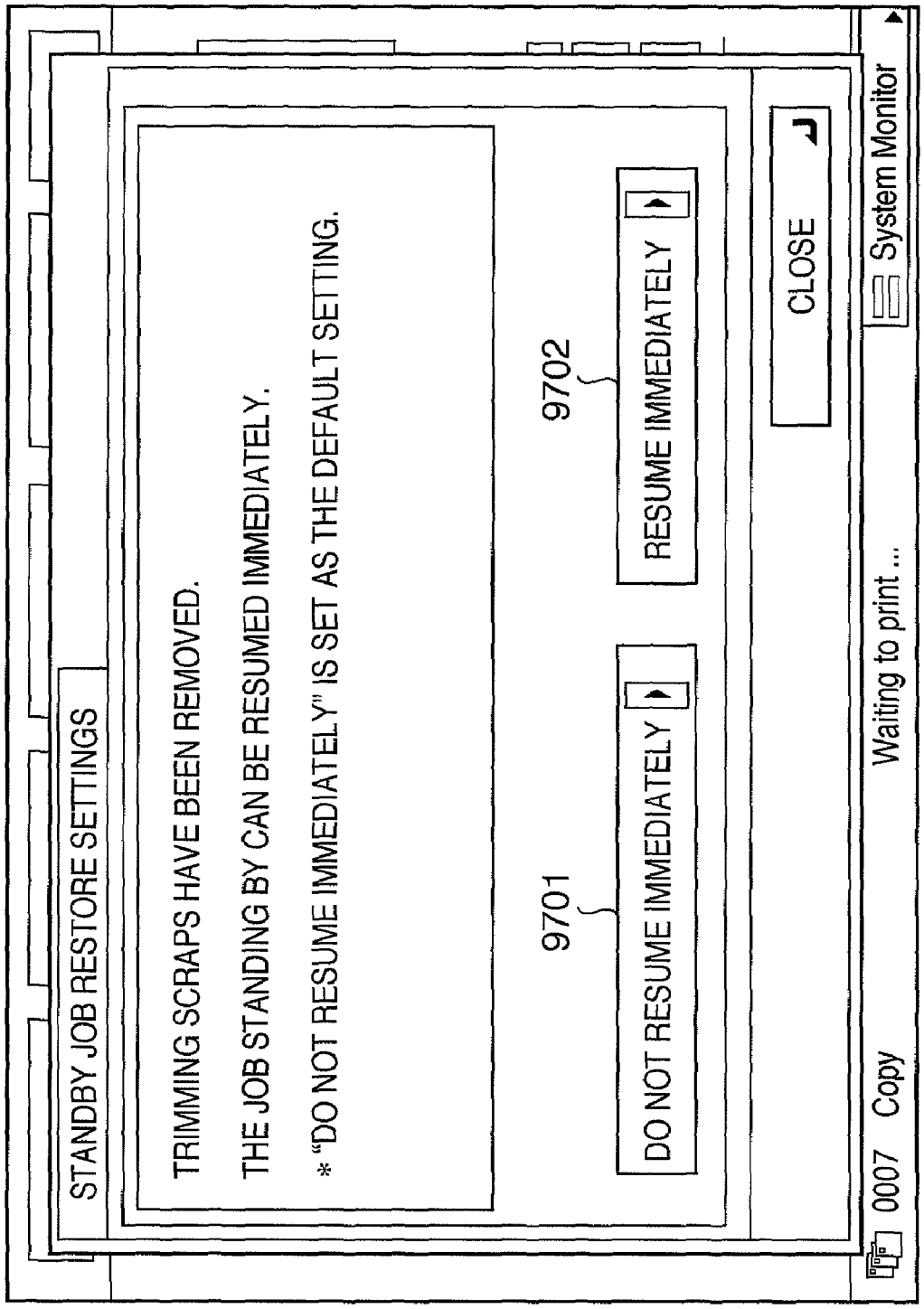
FIG. 38 is a diagram illustrating an example of a screen for carrying out restoration settings for a suspended job.

Descriptions shall now be given regarding the case where a job change is accepted and the job is changed from an incomplete match-type job to a complete match-type job, referring to FIGS. 37, 38, and 39.

FIG. 37 is a diagram illustrating an example of a screen displaying a job status prior to the occurrence of an event that influences an incomplete match-type job.

If an event that influences an incomplete match-type job has occurred in this state and it is determined in step S124 that that job can be changed to a complete match-type job, the procedure advances to step S125, where the process for changing the state of that job is carried out. For example, in the case where the trimming scraps that had been full are removed, enabling trimming, the controller 205 determines that a job for which trimming has been set can be changed to a complete match-type job. At this time, the controller 205 displays the display screen shown in FIG. 38 in the console unit 204.

Here, in the case where there is an incomplete match-type job whose processing order has been shifted to later using the aforementioned order change button 9604 (FIG. 34), it is possible to select whether or not to resume that job immediately. If a "do not resume immediately" button 9701 is touched, control is performed so that job processing is performed according to the same print order from when the order was set using the order change button 9604. However, if a "resume immediately" button 9702 is touched, control is performed so that the currently-printing job is suspended and the printing of the incomplete match-type job whose order was shifted to later using the order change button 9604 is commenced.

Furthermore, in step S125, a change process can be performed on the states of all jobs that correspond to the incomplete match-type job shifted to later.

FIG. 38 is a diagram illustrating an example of a screen for carrying out restoration settings for a suspended job.

Here, the suspended job can be set to be resumed immediately (9702), or not to be resumed immediately (9701).

FIG. 39 is a diagram illustrating an example of a certain job status screen.

For example, in the case of FIG. 39, all related jobs to be reduced are changed to complete match-type jobs and are registered in the print queue, in step S125.

Note that the above example illustrates a case where an event that influences an incomplete match-type job has occurred when the job to be reduced has been shifted to later. However, this can also be applied to the case where an event that influences an incomplete match-type job has occurred when the job to be reduced is not shifted to later, and a substitute process pre-set in the HDD 209 or a skipping process is being performed.

Figure 40:
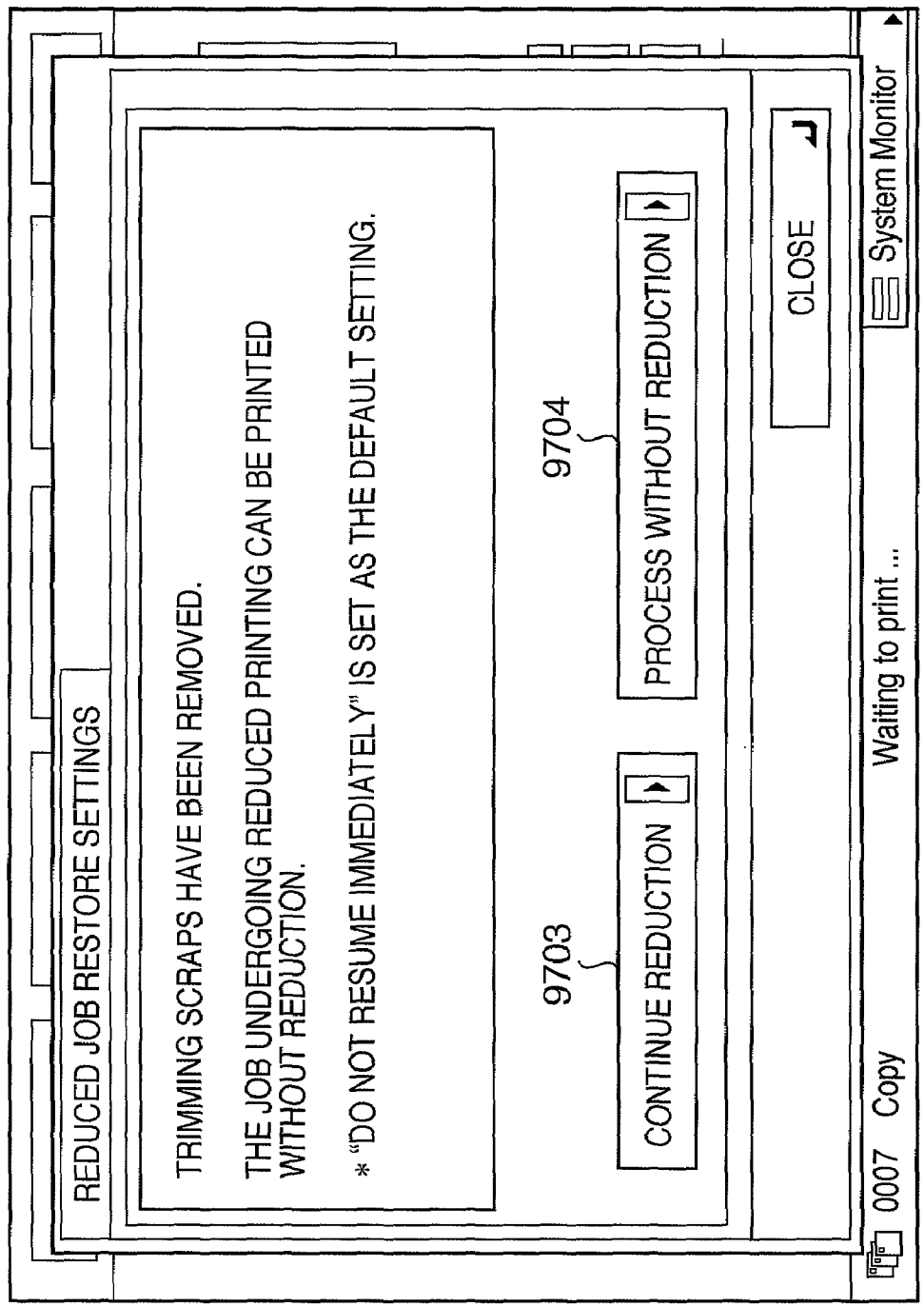
FIG. 40 is a diagram illustrating an example of the display of a reduced job restoration settings screen.

FIG. 40 is a diagram illustrating an example of the display of a reduced job restoration settings screen. Here, in the case where the trimming scraps have been removed and the trimming can be performed by the trimmer, the controller 205 displays a display screen on the console unit 204. This indicates that the job that was an incomplete match-type job because the trimming could not be executed due to the trimming scraps being full can now be changed to a complete match-type job due to the trimming scraps being removed.

Here, if a "resume reduction" button 9703 is touched, control is performed so that the currently-printing job continues to be printed as a reduced job. Through this, the burden placed on the user when the printed materials of the job are set in a different post-processing apparatus (the trimmer 109) and are processed together, which is caused due to the finishing of the printed materials changing partway through the job, is lightened. However, when a non-reduced process button 9704 is touched, control is performed so that the print settings of the incomplete match-type job are changed and the print process executed, without reducing the corresponding function.

(Other Embodiments)

The embodiments of the present invention have been described in detail. Note that the present invention can also be achieved by directly or remotely supplying a program of software that implements the functions of the aforementioned embodiments to a system or apparatus, and reading out and executing the supplied program code by a computer of that system or apparatus. In this case, the form of program is not particularly limited as long as it has the program function.

Therefore, the program code itself installed in a computer to implement the functional processing of the present invention using the computer implements the present invention. That is, the claims of the present invention include the computer program itself for implementing the functional processing of the present invention. In this case, the form of program is not particularly limited, and an object code, a program to be executed by an interpreter, script data to be supplied to an OS, and the like may be used as long as they have the program function.

As a recording medium for supplying the program, various media can be used: for example, a floppy® disk, hard disk, optical disk, magneto-optical disk, MO, CD-ROM, CD-R, CD-RW, magnetic tape, nonvolatile memory card, ROM, DVD (DVD-ROM, DVD-R), and the like.

As another program supply method, a program can be supplied by establishing a connection to a home page on the Internet using a browser on a client computer, and downloading the program from the home page to a recording medium such as a hard disk or the like. In this case, the program to be downloaded may be either the computer program itself of the present invention or a compressed file including an automatic installation function. Furthermore, the program code that configures the program of the present invention may be segmented into a plurality of files, which may be downloaded from different home pages. That is, the claims of the present invention include a WWW server which makes a plurality of users download a program file required to implement the functional processing of the present invention by a computer.

Also, a storage medium such as a CD-ROM or the like, which stores the encrypted program of the present invention, may be delivered to the user. In this case, the user who has cleared a predetermined condition may be allowed to download key information that decrypts the encrypted program from a home page via the Internet, so as to install the encrypted program in a computer in an executable form using that key information.

The functions of the aforementioned embodiments may be implemented by a mode other than that by executing the readout program code by the computer. For example, an OS or the like running on the computer may execute some or all of actual processes on the basis of an instruction of that program, thereby implementing the functions of the aforementioned embodiments.

Furthermore, the program read out from the recording medium may be written in a memory equipped on a function expansion board or a function expansion unit, which is inserted in or connected to the computer. In this case, after the program is written in the memory, a CPU or the like equipped on the function expansion board or unit executes some or all of actual processes based on the instruction of that program, thereby implementing the functions of the aforementioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2007-275671, filed Oct. 23, 2007, which is hereby incorporated by reference herein in its entirety.

What is claimed is:

1. A job processing system for causing a job processing unit to execute a job, the system comprising:
a selection unit configured to enable a user to select one of (a) executing, in a case where a plurality of processes instructed by a job include a process that cannot be executed by the job processing unit, the job without executing the process that cannot be executed by the job processing unit, and (b) executing, in a case where a plurality of processes instructed by a job include a process that cannot be executed by the job processing unit, the job after another job;
a confirmation unit configured to analyze an input job that instructs an execution of a plurality of processes using an XML language and confirm whether or not the plurality of processes instructed by the input job can be executed by the job processing unit; and
a control unit configured to:
in a case where the plurality of processes instructed by the input job includes the process that cannot be executed by the job processing unit and executing a job without executing a process that cannot be executed by the job processing unit is selected by the selection unit, cause the job processing unit to execute the process that can be executed by the job processing unit without executing the process that cannot be executed by the job processing unit, and
in a case where the plurality of processes instructed by the input job includes the process that cannot be executed by the job processing unit and executing a job after another job is selected by the selection unit, change the order of the input job and other job.

2. The system according to claim 1, further comprising a storage unit configured to store rule information indicating the selection made by the user,
wherein the control unit determines an action to be taken with regard to a job that includes a process that cannot be executed by the job processing unit based on the rule information stored in the storage unit.

3. The system according to claim 1, wherein the job processing unit is capable of executing a job that instructs the execution of a plurality of processes using a language aside from the XML language.

4. The system according to claim 1, wherein
the selection unit further enables the user to select cancelling a job in a case where a plurality of processes instructed by the job include a process that cannot be executed by the job processing unit, and
in a case where a plurality of processes instructed by a job include the process that cannot be executed by the job processing unit and cancelling the job is selected by the selection unit, the control unit cancels the input job.

5. The system according to claim 1, wherein
in a case where the plurality of processes instructed by the input job includes the process that cannot be executed by the job processing unit and executing a job without executing the process that cannot be executed by the job processing unit is selected by the selection unit, the control unit changes from the process that cannot be executed by the job processing unit to another process and causes the job processing unit to execute the other process.

6. The system according to claim 1, wherein the job processing unit is a printing apparatus and the input job is a print job.

7. The system according to claim 1, wherein the job processing unit is a sheet processing apparatus and the input job is a print job.

8. A job processing method of causing a job processing unit to execute a job, the method comprising the steps of:
receiving from a user one of an instruction for executing, in a case where a plurality of processes instructed by a job include a process that cannot be executed by the job processing unit, the job without executing the process that cannot be executed by the job processing unit, and an instruction for executing, in a case where a plurality of processes instructed by a job include a process that cannot be executed by the job processing unit, the job after another job;
analyzing an input job that instructs an execution of a plurality of processes using an XML language;
confirming whether or not the plurality of processes instructed by the input job can be executed by the job processing unit;
controlling, in a case where the plurality of processes instructed by the input job include the process that cannot be executed by the job processing unit and executing a job without executing a process that cannot be executed by the job processing unit is selected, the job processing unit to execute the process that can be executed by the job processing unit without executing the process that cannot be executed by the job processing unit; and
changing, in a case where the plurality of processes instructed by the input job include the process that cannot be executed by the job processing unit and executing a job after another job is selected, the order of the input job and other job.

9. The method according to claim 8, wherein the controlling step determines an action to be taken with regard to a job that includes a process that cannot be executed by the job processing unit based on rule information which is stored in a storage unit and indicates the selection made by the user.

10. The method according to claim 8, wherein the job processing unit is capable of executing a job that instructs the execution of a plurality of processes using a language aside from the XML language.

11. A non-transitory computer-readable storage medium on which a computer program for causing a computer to implement the job processing method according to claim 8 is stored.

12. A job processing system for causing a job processing unit to execute a job, the system comprising:
a selection unit configured to enable a user to select one of (a) cancelling a job in a case where a plurality of processes instructed by the job include a process that cannot be executed by the job processing unit, and (b) in a case where a plurality of processes instructed by a job include a process that cannot be executed by the job processing unit, executing the job after another job;
a confirmation unit configured to analyze an input job that instructs an execution of a plurality of processes using an XML language and confirm whether or not the plurality of processes instructed by the input job can be executed by the job processing unit; and a control unit configured to:
in a case where the plurality of processes instructed by the input job include the process that cannot be executed by the job processing unit and cancelling a job is selected by the selection unit, cancel the input job, and
in a case where the plurality of processes instructed by the input job include the process that cannot be executed by the job processing unit and executing a job after another job is selected by the selection unit, change the order of the input job and other job.

13. The system according to claim 12, further comprising a storage unit configured to store rule information indicating the selection made by the user,
wherein the control unit determines an action to be taken with regard to a job that includes a process that cannot be executed by the job processing unit based on the rule information stored in the storage unit.

14. The system according to claim 12, wherein
in a case where the plurality of processes instructed by the input job include the process that cannot be executed by the job processing unit and executing a job without executing the process that cannot be executed by the job processing unit is selected by the selection unit, the control unit changes from the process that cannot be executed by the job processing unit to another process and causes the job processing unit to execute the other process.

15. The system according to claim 12, wherein the job processing unit is a printing apparatus and the input job is a print job.

16. The system according to claim 12, wherein the job processing unit is a sheet processing apparatus and the input job is a print job.

17. A job processing method of causing a job processing unit to execute a job, the method comprising the steps of:
receiving from a user one of an instruction for cancelling a job in a case where a plurality of processes instructed by the job include a process that cannot be executed by the job processing unit, and an instruction for executing, in a case where a plurality of processes instructed by a job include a process that cannot be executed by the job processing unit, the job after another job;
analyzing an input job that instructs an execution of a plurality of processes using an XML language;
confirming whether or not the plurality of processes instructed by the input job can be executed by the job processing unit;
cancelling the input job in a case where the plurality of processes instructed by the input job include the process that cannot be executed by the job processing unit and cancelling a job is selected; and
changing, in a case where the plurality of processes instructed by the input job include the process that cannot be executed by the job processing unit and executing a job after another job is selected, the order of the input job and other job.

18. A non-transitory computer-readable storage medium on which computer program for causing a computer to implement the job processing method according to claim 17 is stored.

* * * * *